United States Patent
Hashimoto et al.

(10) Patent No.: US 9,753,867 B2
(45) Date of Patent: *Sep. 5, 2017

(54) MEMORY MANAGEMENT DEVICE AND NON-TRANSITORY COMPUTER READABLE STORAGE MEDIUM

(71) Applicant: KABUSHIKI KAISHA TOSHIBA, Minato-ku (JP)

(72) Inventors: Mikio Hashimoto, Tokyo (JP); Naoko Yamada, Yokohama (JP); Jun Kanai, Inagi (JP); Ryotaro Hayashi, Hiratsuka (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 172 days.

This patent is subject to a terminal disclaimer.

(21) Appl. No.: 14/744,540

(22) Filed: Jun. 19, 2015

(65) Prior Publication Data
US 2015/0370727 A1   Dec. 24, 2015

(30) Foreign Application Priority Data

Jun. 20, 2014  (JP) .................................. 2014-127601
May 13, 2015  (JP) .................................. 2015-098395

(51) Int. Cl.
*G06F 12/10*   (2016.01)
*G06F 12/14*   (2006.01)
(Continued)

(52) U.S. Cl.
CPC ...... *G06F 12/1416* (2013.01); *G06F 12/1009* (2013.01); *G06F 12/145* (2013.01); *G06F 21/64* (2013.01); *G06F 21/79* (2013.01)

(58) Field of Classification Search
CPC .......... G06F 12/00; G06F 12/08; G06F 12/10; G06F 12/14; G06F 21/64
(Continued)

(56) References Cited

U.S. PATENT DOCUMENTS 4,309,569 A    1/1982  Merkle
7,031,956 B1 *  4/2006  Lee .................. G06F 17/30595
(Continued)

FOREIGN PATENT DOCUMENTS

JP    2006-202270 A   8/2006
JP       4074620 B2   4/2008
(Continued)

OTHER PUBLICATIONS

Ravi Bhargava et al., "Accelerating Two-Dimensional Page Walks for Virtualized Systems,", "ASPLOS Architectural Support for Programming Languages and Operating Systems," Mar. 1-5, 2008, pp. 26-35.

(Continued)

*Primary Examiner* — Tuan Thai
(74) *Attorney, Agent, or Firm* — Oblon, McClelland, Maier & Neustadt, L.L.P.

(57) ABSTRACT

In one embodiment, a device executes reading and writing for a storage unit storing a table tree and verifier tree. The table tree includes a parent table and child table. The verifier tree includes a parent verifier associated with the parent table, and a child verifier associated with the child table. The parent verifier is used for verifying the child table and child verifier. The device stores a secure table tree being a part of the table tree and used for address translation, and a secure verifier tree being a part of the verifier tree, to a secure storage unit. The device executes verification, based on verification information calculated based on a first child table and first child verifier in the storage unit and a first parent verifier in the secure verifier tree.

20 Claims, 50 Drawing Sheets

(51) Int. Cl.
*G06F 21/64* (2013.01)
*G06F 21/79* (2013.01)
*G06F 12/1009* (2016.01)

(58) Field of Classification Search
USPC .............................. 711/100, 154, 162, 163
See application file for complete search history.

(56) References Cited

U.S. PATENT DOCUMENTS

| | | |
|---|---|---|
| 2003/0055835 A1* | 3/2003 | Roth .................. G06F 19/28 |
| 2003/0223338 A1* | 12/2003 | Sasaki ............... G11B 7/00736 |
| | | 369/53.21 |
| 2004/0160875 A1* | 8/2004 | Sasaki ............... G11B 7/00456 |
| | | 369/53.15 |
| 2005/0033973 A1 | 2/2005 | Kamada et al. |
| 2006/0015748 A1 | 1/2006 | Goto et al. |
| 2008/0235064 A1* | 9/2008 | Gulko .................. G06Q 10/087 |
| | | 705/4 |
| 2010/0153732 A1 | 6/2010 | Su |
| 2012/0079283 A1 | 3/2012 | Hashimoto et al. |
| 2013/0212575 A1 | 8/2013 | Ito et al. |
| 2015/0370727 A1 | 12/2015 | Hashimoto et al. |

FOREIGN PATENT DOCUMENTS

| | | |
|---|---|---|
| JP | 2012-68959 | 4/2012 |
| JP | 2012-530983 A | 12/2012 |
| JP | 2013-522702 A | 6/2013 |
| JP | 5316592 B2 | 7/2013 |
| JP | 5260081 B2 | 8/2013 |
| WO | WO 03/104948 A1 | 12/2003 |
| WO | WO 2010/070959 A1 | 6/2010 |
| WO | WO 2012/160760 A1 | 11/2012 |
| WO | WO 2013/100964 A1 | 7/2013 |

OTHER PUBLICATIONS

Xiaoxin Chen et al., "Overshadow: A Virtualization-Based Approach to Retrofitting Protection in Commodity Operating Systems,","ASPLOS Architectural Support for Programming Languages and Operating Systems," Mar. 1-5, 2008, pp. 2-13.

G. Edward Suh et al., "AEGIS :Architecture for Tamper-Evident and Tamper-Resistant Processing", "ICS '03 Proceedings of the 17th annual international conference on Supercomputing", 2003, pp. 1-16.

Siddhartha Chhabra, et al., "SecureME: A Hardware-Software Approach to Full System Security", Proceedings of the International Conference on Supercomputing (ICS'11), May 31, 2011, pp. 108-119.

Ryotaro Hayashi, et al., "Secure Software Development Environment DFITS (Data Flow Isolation Technology for Security)", IPSJ SIG Technical Report (vol. 2009, No. 20), Feb. 26, 2009, pp. 247-252 (with computer generated English translation).

* cited by examiner

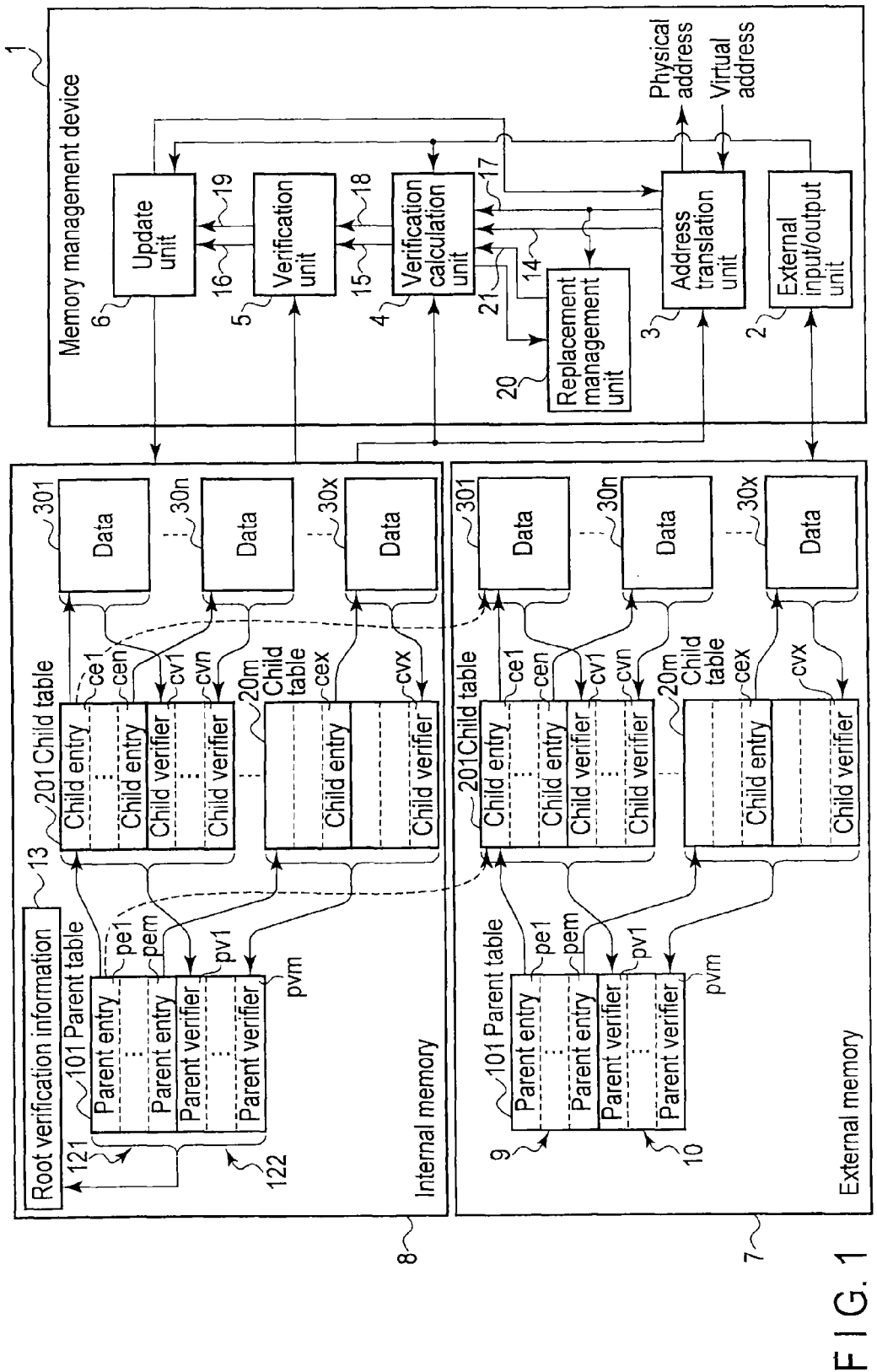
F I G. 1

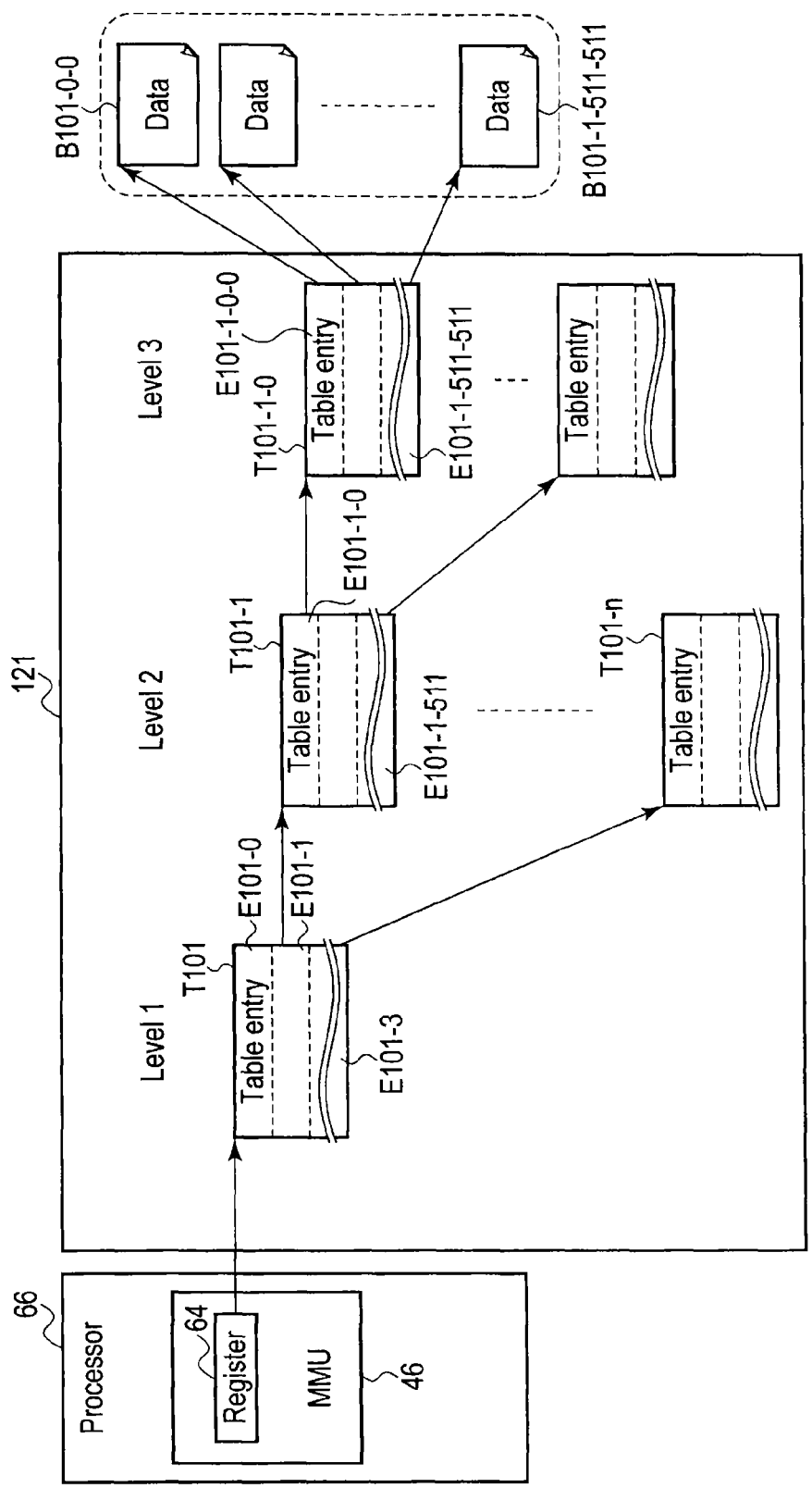
F I G. 4

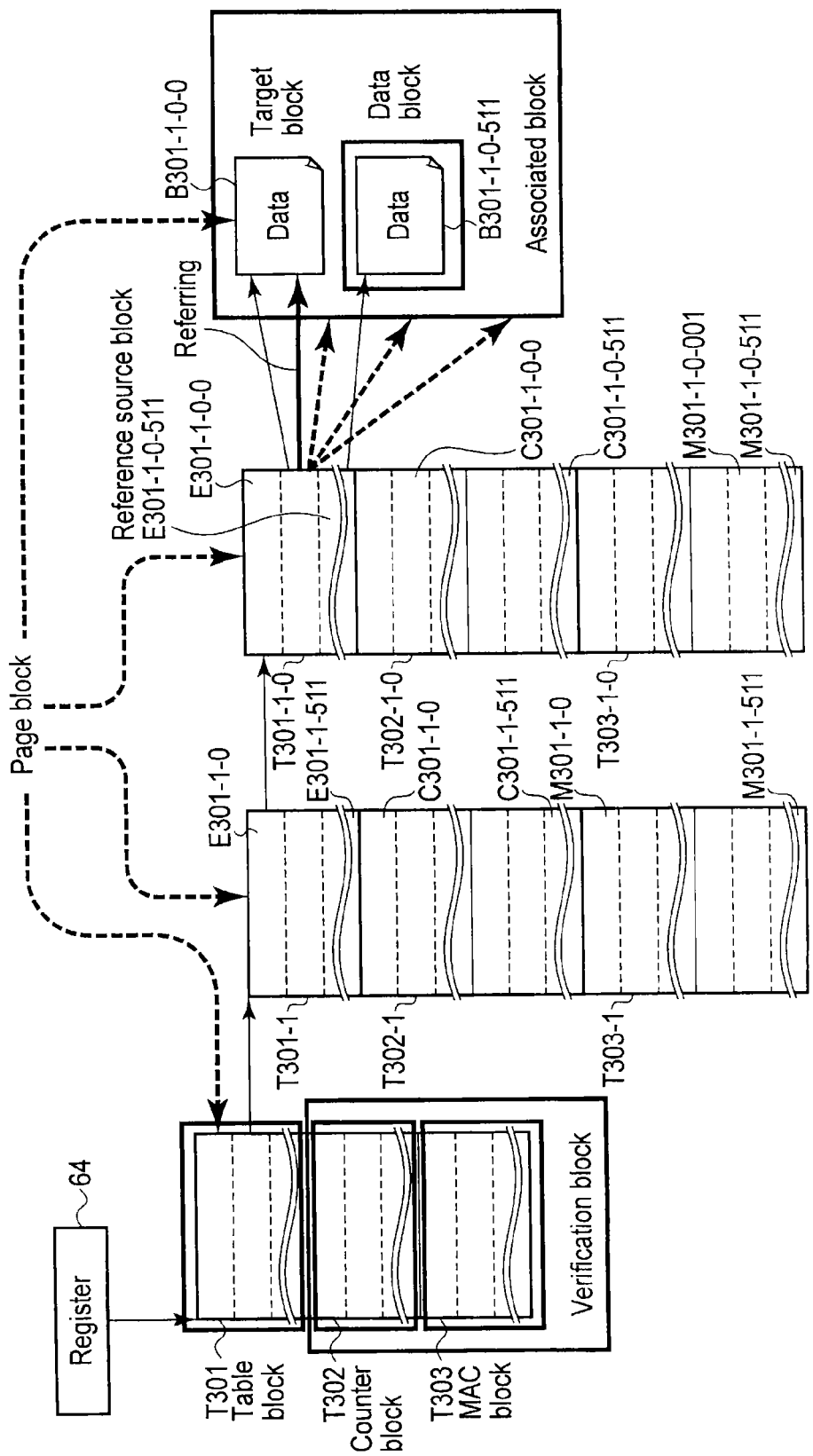
F I G. 5

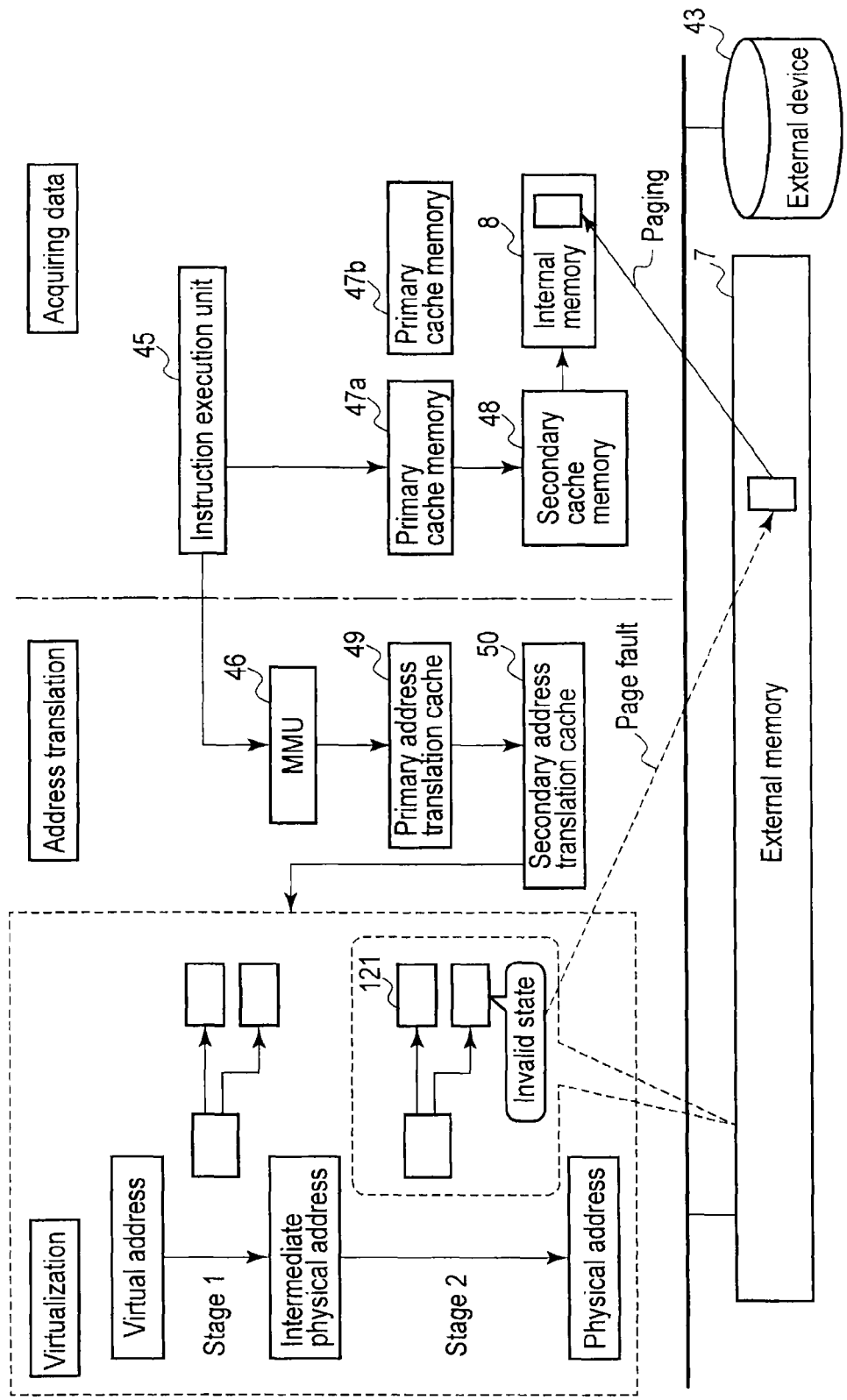
F I G. 6

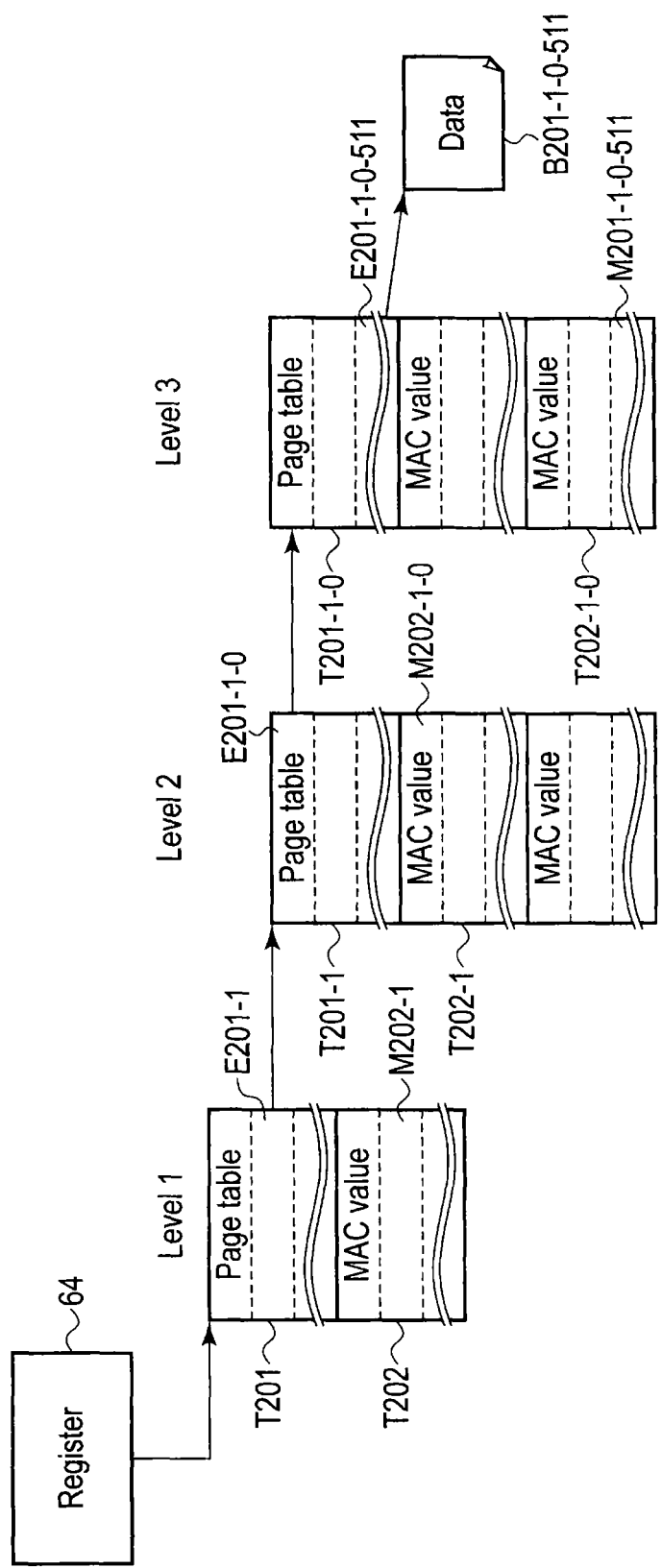
F I G. 8

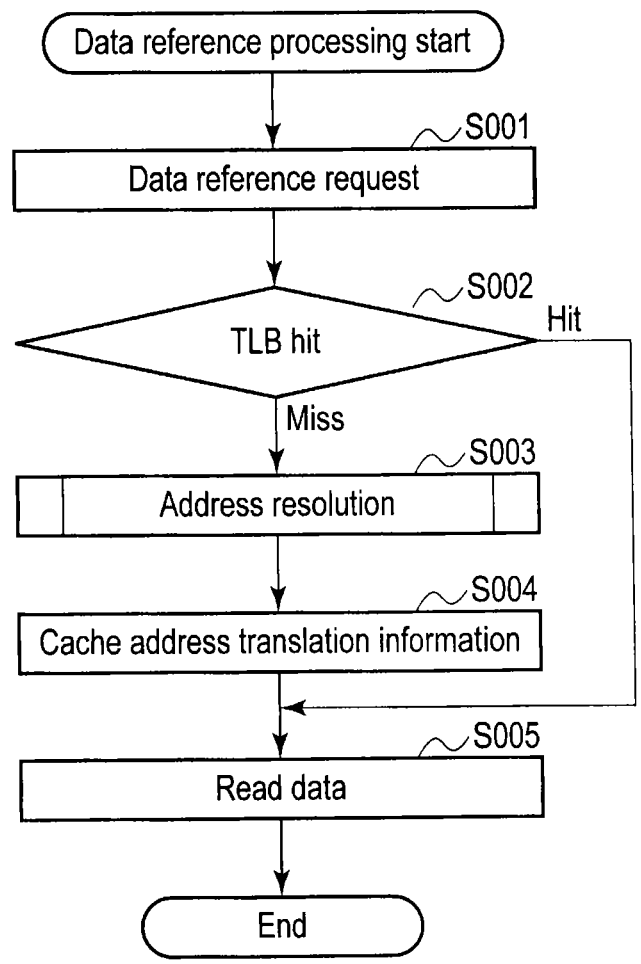
F I G. 11

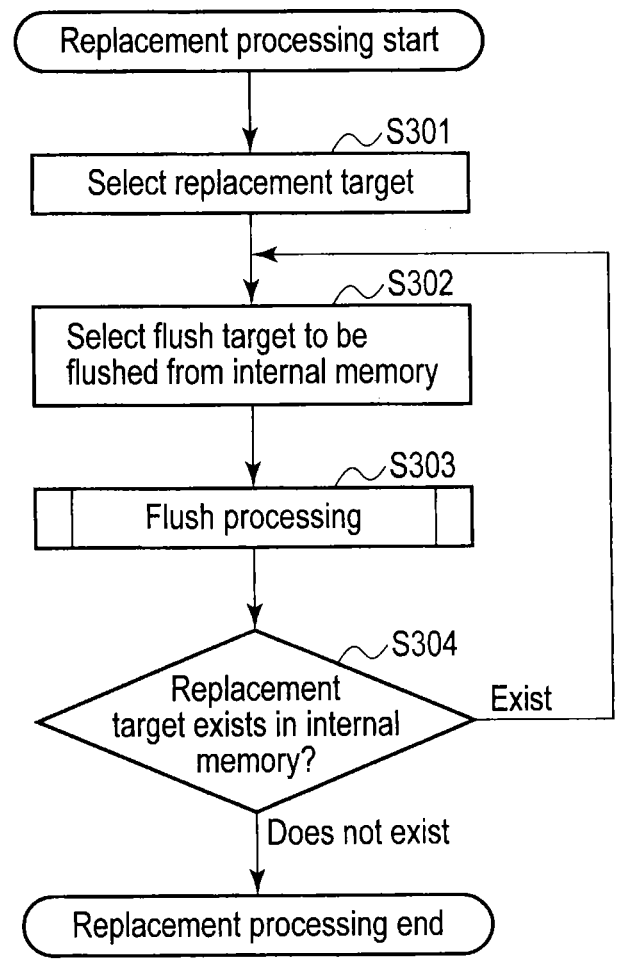
F I G. 15

| HAP [1:0] | Access right |
|---|---|
| 00 | NoAccess |
| 01 | Read-only |
| 10 | Write-only |
| 11 | Read/Write |

F I G. 18

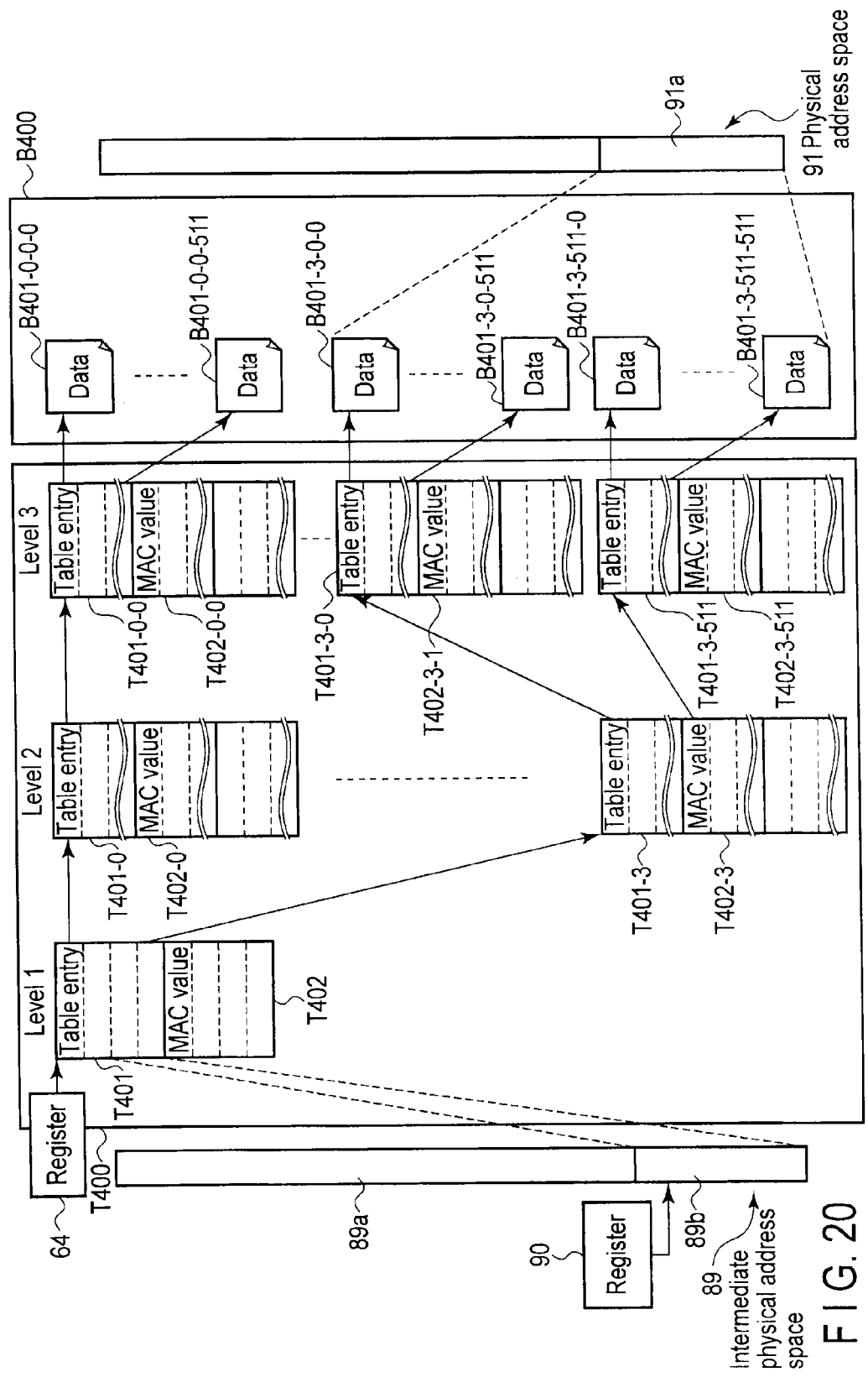
F I G. 20

| Memory map | Memory map symbol | Physical address area | Verification at the time of booting | Page verification | Block symbol in Non-verification state | Size |
|---|---|---|---|---|---|---|
| Internal memory | 8 | 0x00000000 ~ 0x000fffff | — | — | — | 1MB |
| Mask ROM | 69 | 0x00100000 ~ 0x001fffff | — | — | — | 1MB |
| Secure VMM Program area | 701 | 0x00100000 ~ 0x001fffff | ✓ | — | — | 1MB |
| Physical address area Secure OS | 702·704 | 0x02000000 ~ 0x0fffffff | — | ✓ | B401-0-1-0 ~ B401-0-128-511 | 254MB |
| Secure VMM work area Secure VMM MAC area | 705·706 | 0x10000000 ~ 0x1fffffff | — | ✓ | B401-0-129-0 ~ B401-0-256-511 | 256MB |
| Reserved area | 710 | 0x20000000 ~ 0x3fffffff | — | — | B401-0-257-0 ~ B401-0-511-511 | 512MB |
| Non-secure OS area | 75 | 0x40000000 ~ 0x7fffffff | — | — | B401-1-0-0 ~ B401-1-511-511 | 1GB |
| Reserved area | 711 | 0x80000000 ~ 0xbfffffff | — | — | B401-2-0-0 ~ B401-2-511-511 | 1GB |
| Secure OS area | 76 | 0xc0000000 ~ 0xffffffff | — | ✓ | B401-3-0-0 ~ B401-3-511-511 | 1GB |

F I G. 22

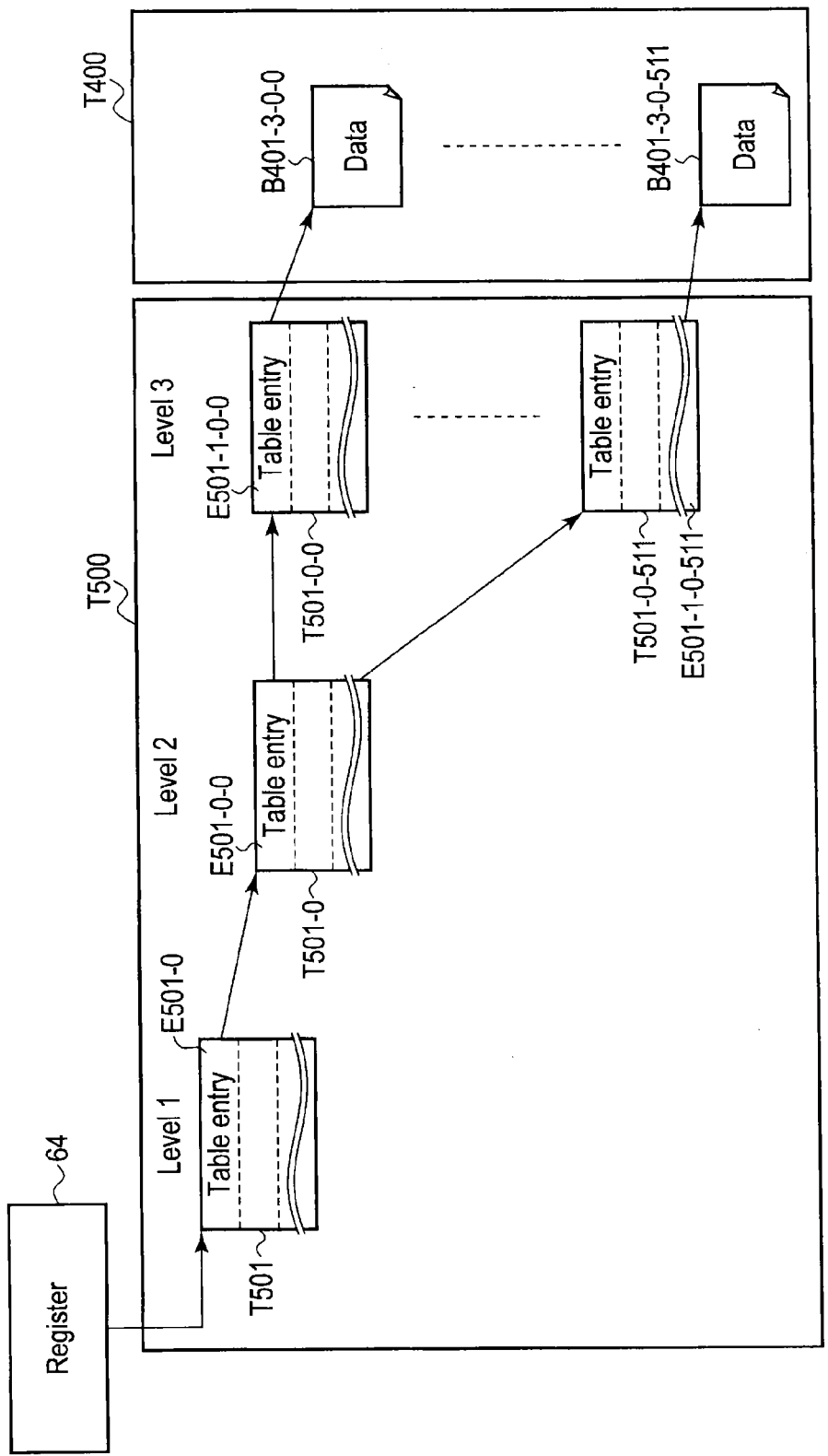
F I G. 23

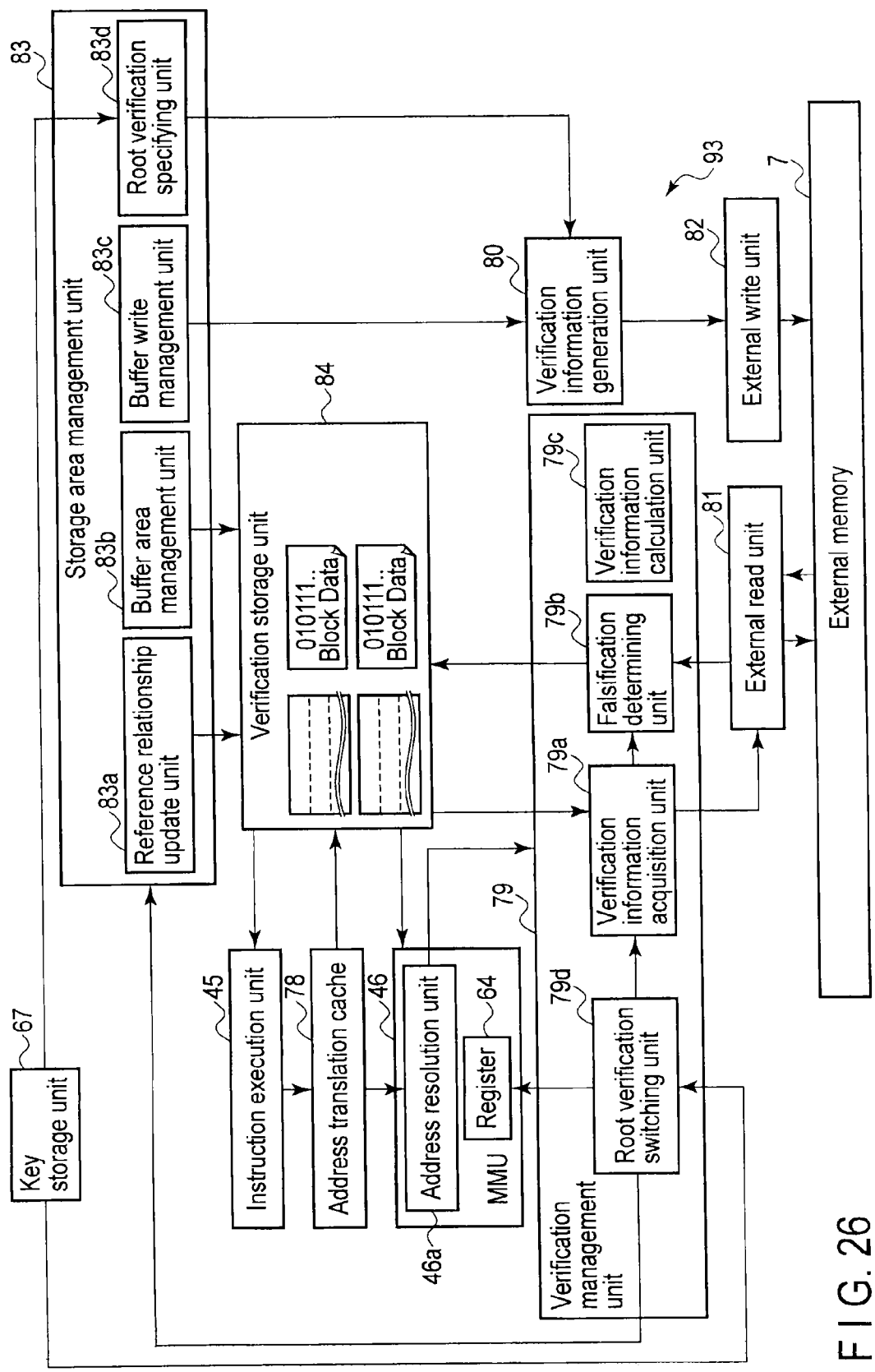
F I G. 26

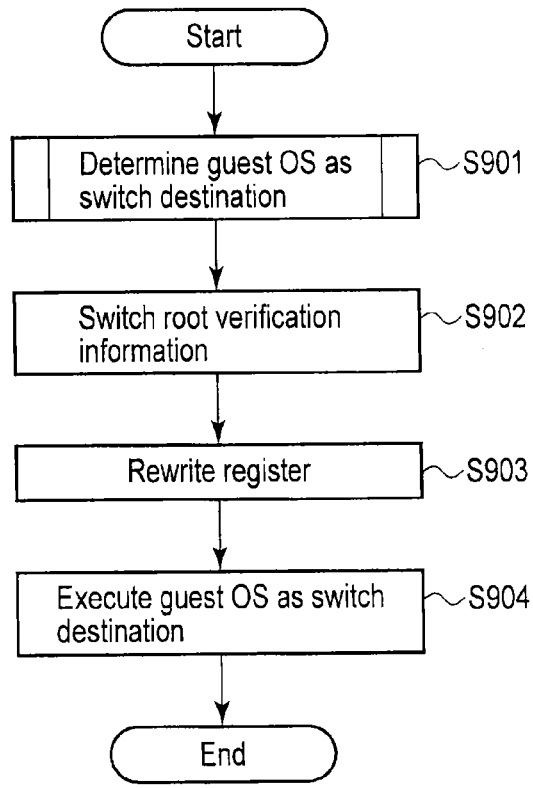
F I G. 29
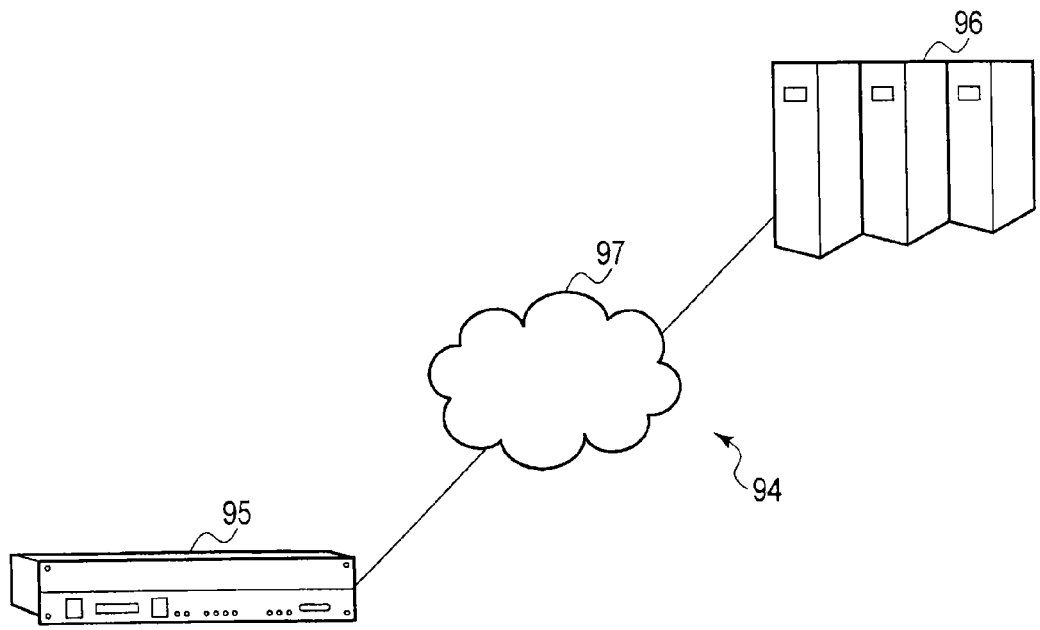
F I G. 30

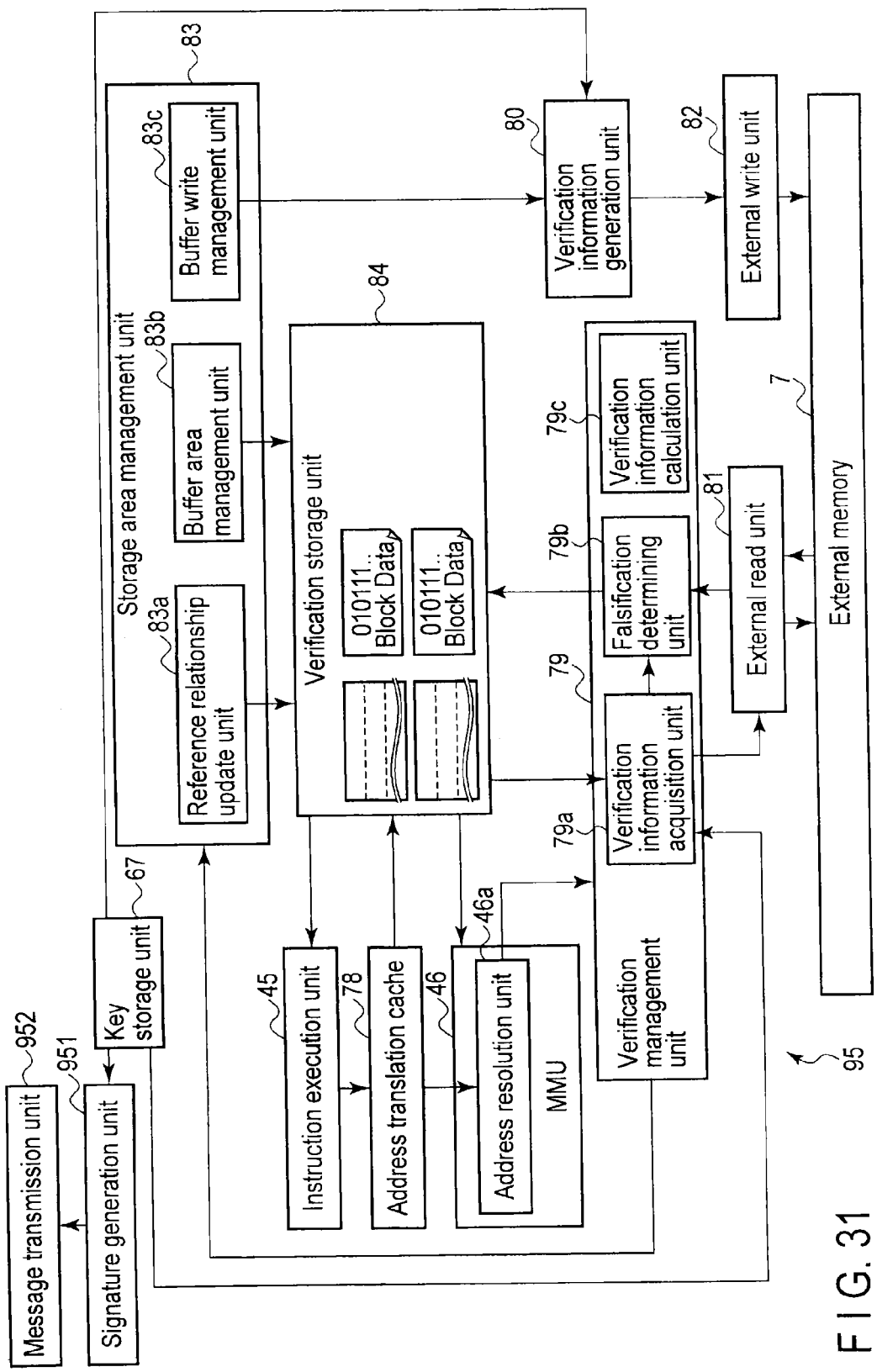
F I G. 31

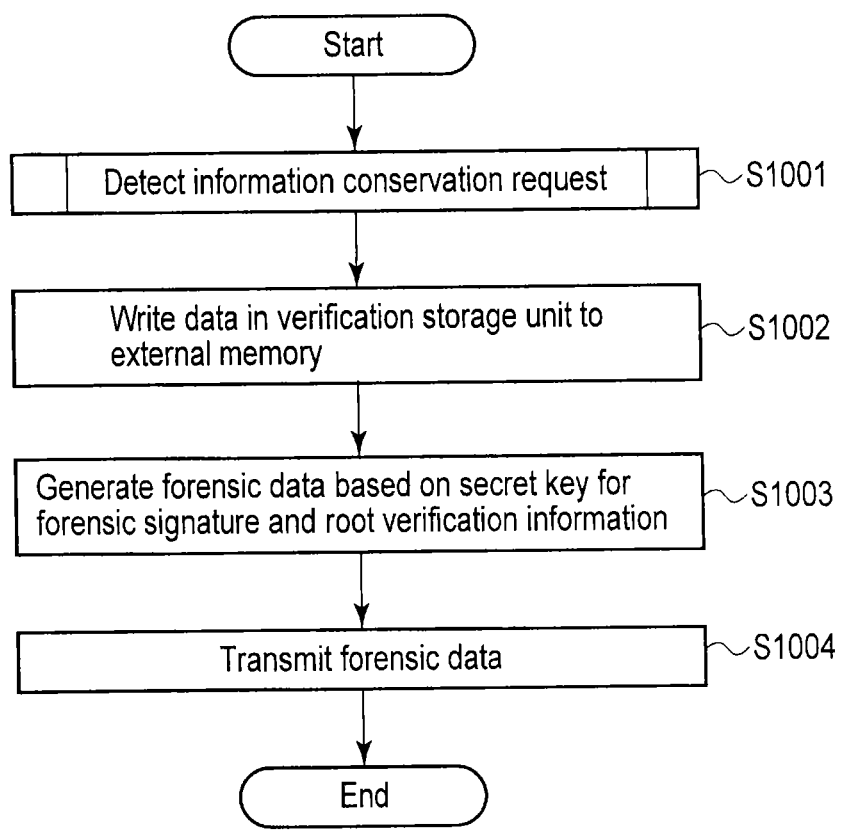
F I G. 32

| PTF | Use-state (In use) | Valid/ Invalid | State of subsequent reference data | Symbol indicating state |
|---|---|---|---|---|
| Each-time verification (ETV) | 0 | 0 | External memory (Unverified data) | ND1 |
| | 1 | 1 | Internal memory (Verified data) | ND2 |
| One-time verification (OTV) | 0 | 0 | External memory (Unverified data) | ND3 |
| | 1 | 1 | External memory (Verified data) | ND4 |
| No verification (NOV) | 1 | 1 | External memory (No verification) | ND5 |

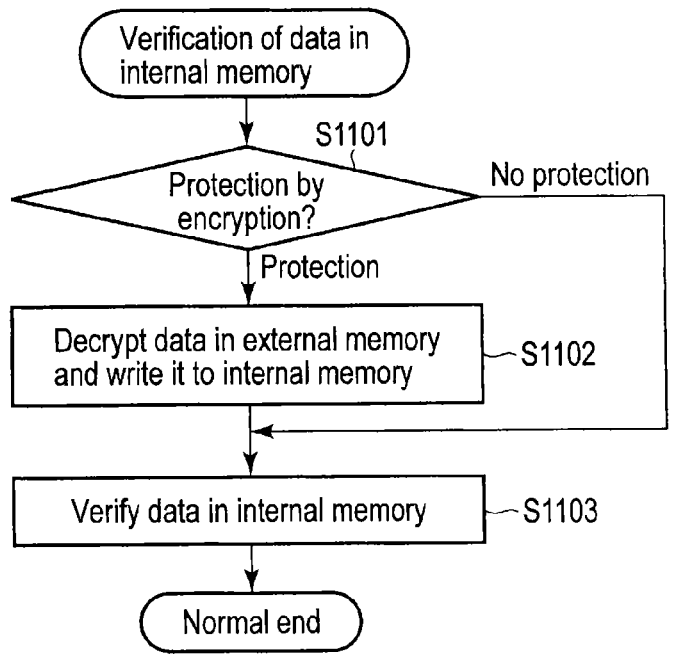
F I G. 37
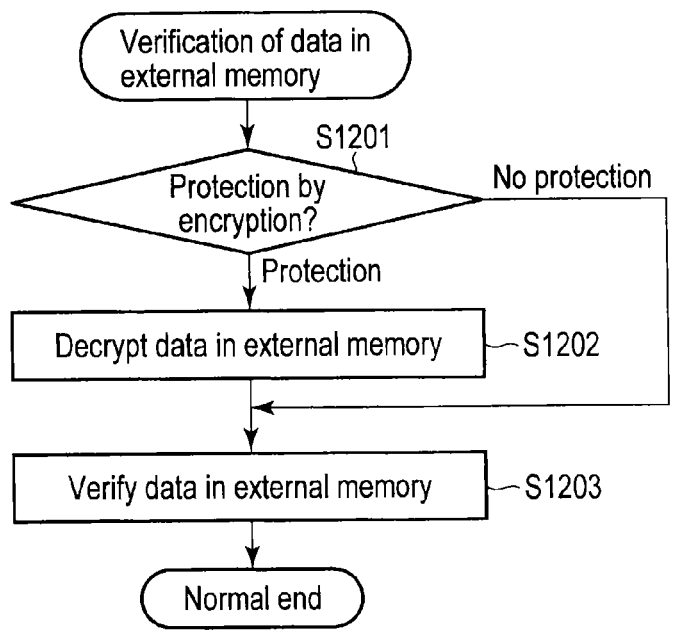
F I G. 38

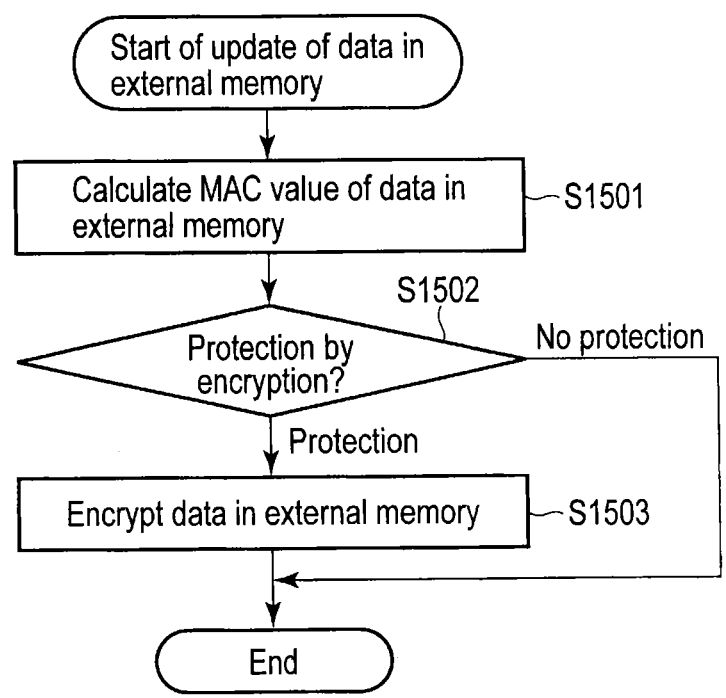
F I G. 41

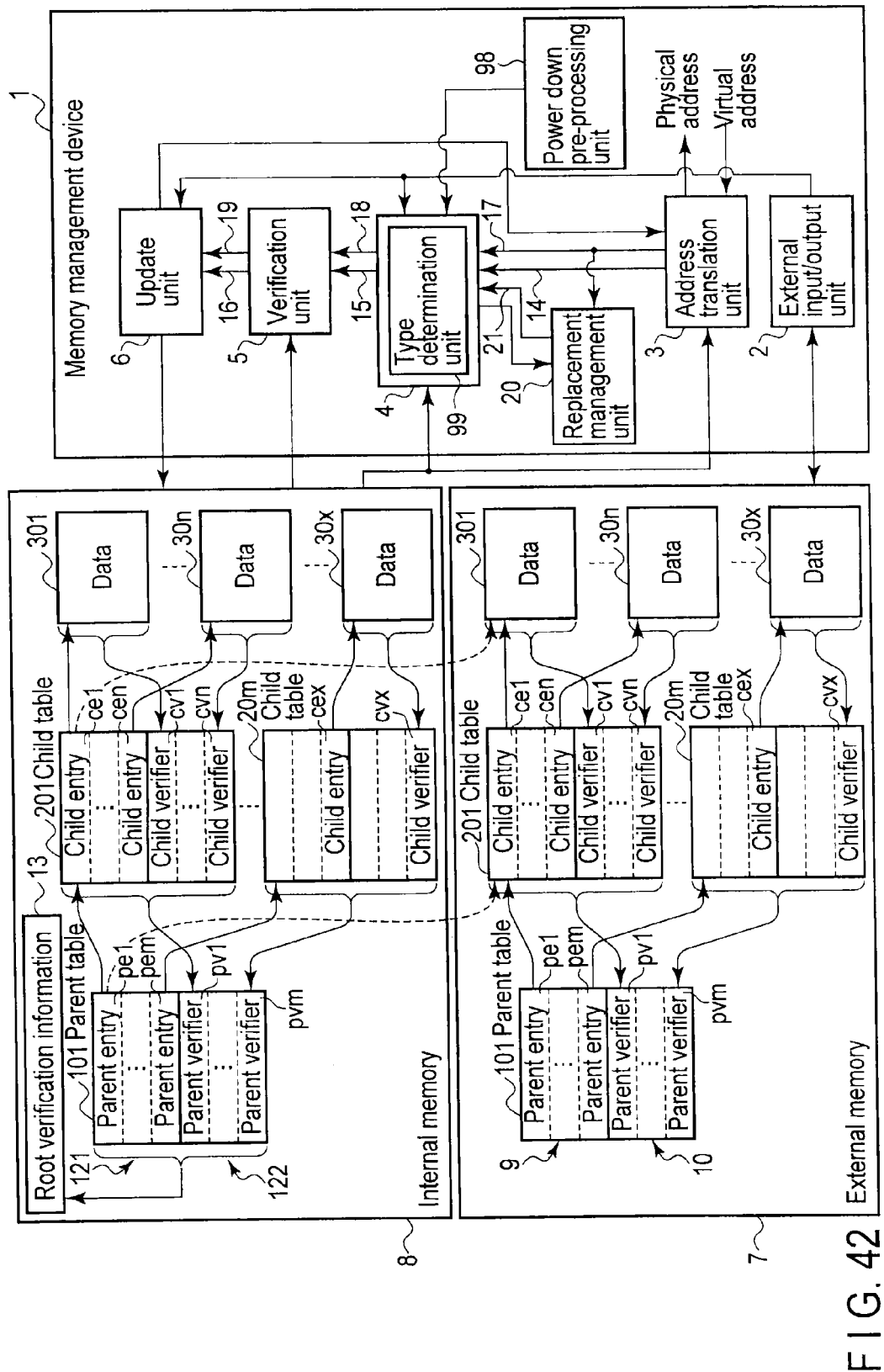
F I G. 42

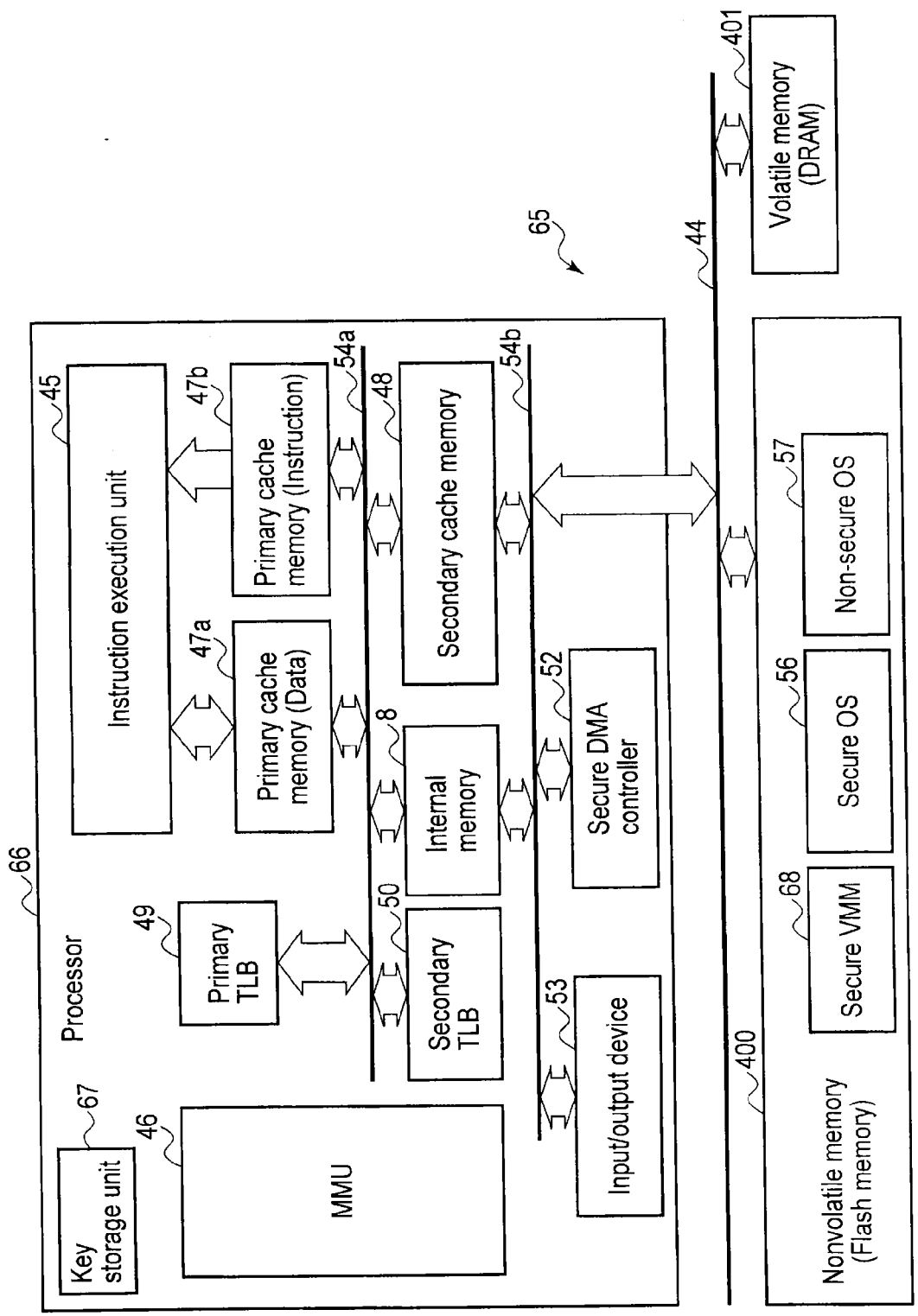
F I G. 43

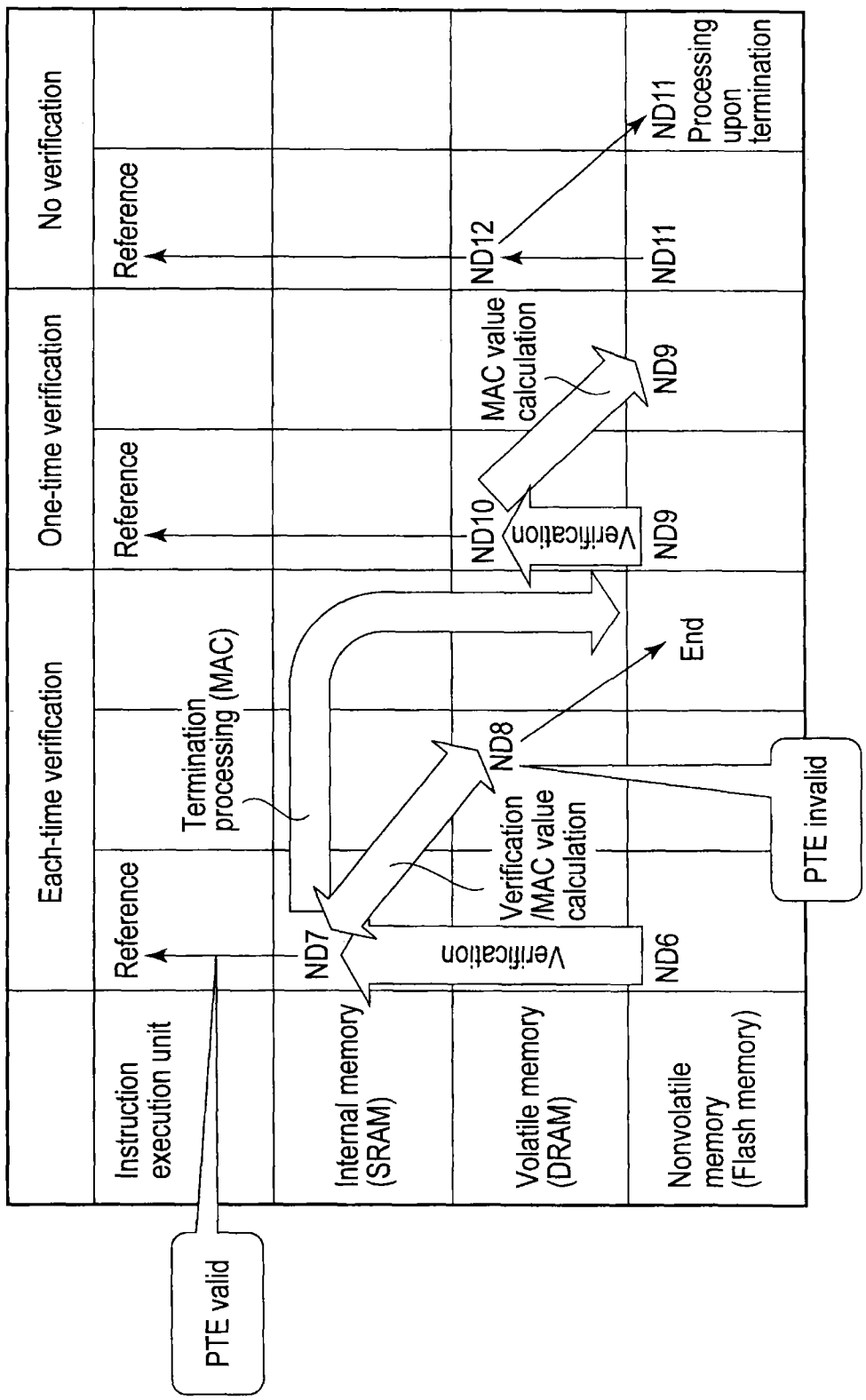
F I G. 45

| PTF | D/F | Valid/Invalid | State of subsequent reference data | Symbol indicating state |
|---|---|---|---|---|
| Each-time verification (ETV) | F | 0 | Flash memory (Unverified data) | ND6 |
| | D | 0 | DRAM (Unverified data) | ND8 |
| | D | 1 | Internal memory (Verified data) | ND7 |
| One-time verification (OTV) | F | 0 | Flash memory (Unverified data) | ND9 |
| | D | 1 | DRAM (Verified data) | ND10 |
| No verification (NOV) | F | 0 | Flash memory (No verification) | ND11 |
| | D | 1 | DRAM (No verification) | ND12 |

FIG. 46

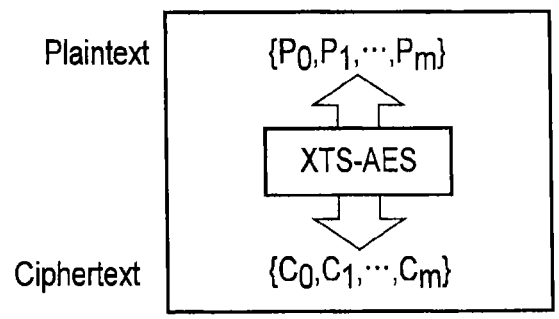
F I G. 52
| | The number of bits | Field | Item | The number of bits |
|---|---|---|---|---|
| i | 128 | Common page index | Common page index | 52 |
| | | | Level | 3 |
| | | Count | | 73 |
| j | 128 | (Count) | | 120(108) |
| | | Sequence number of cipher block | | 8(20) |
F I G. 53

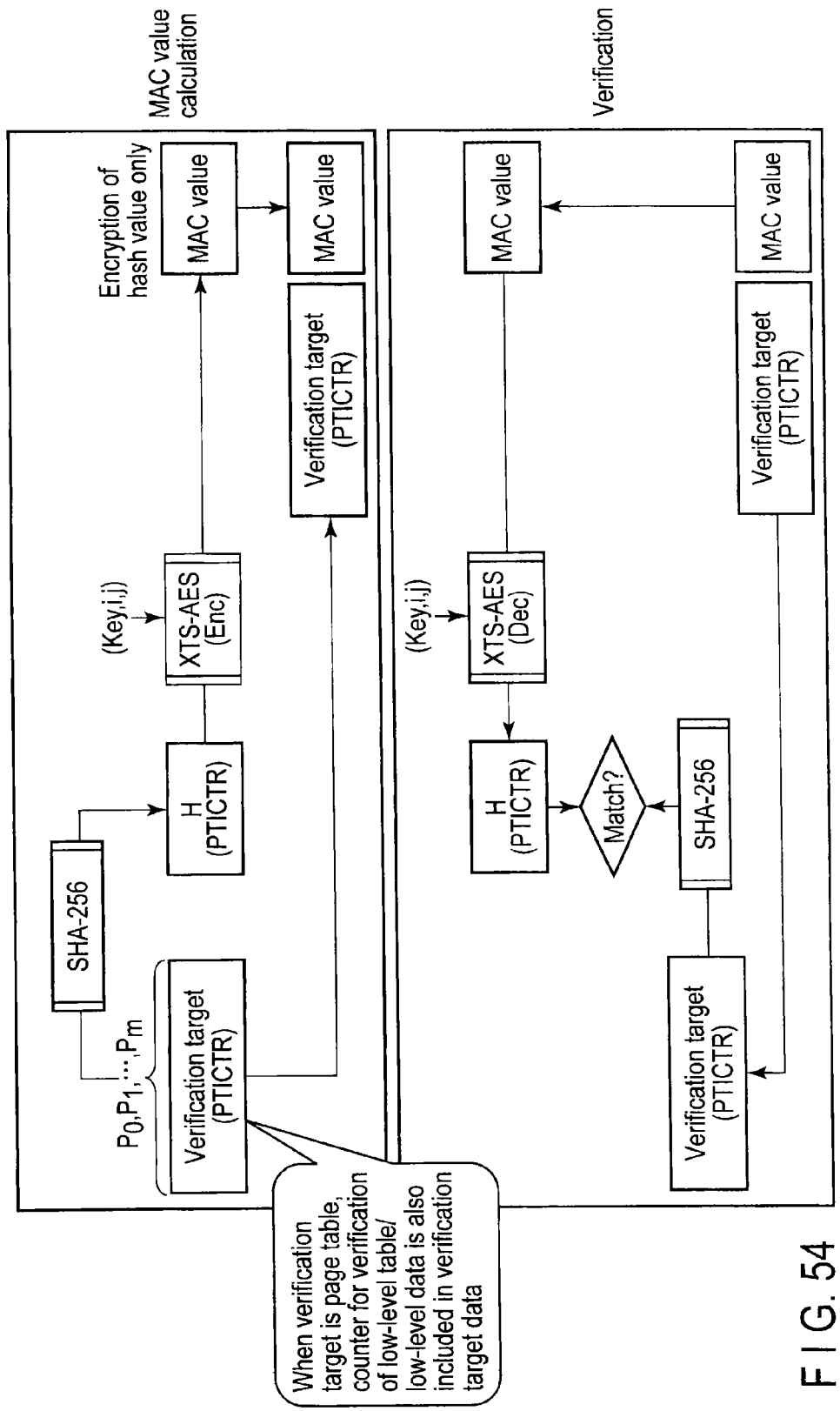
F I G. 54

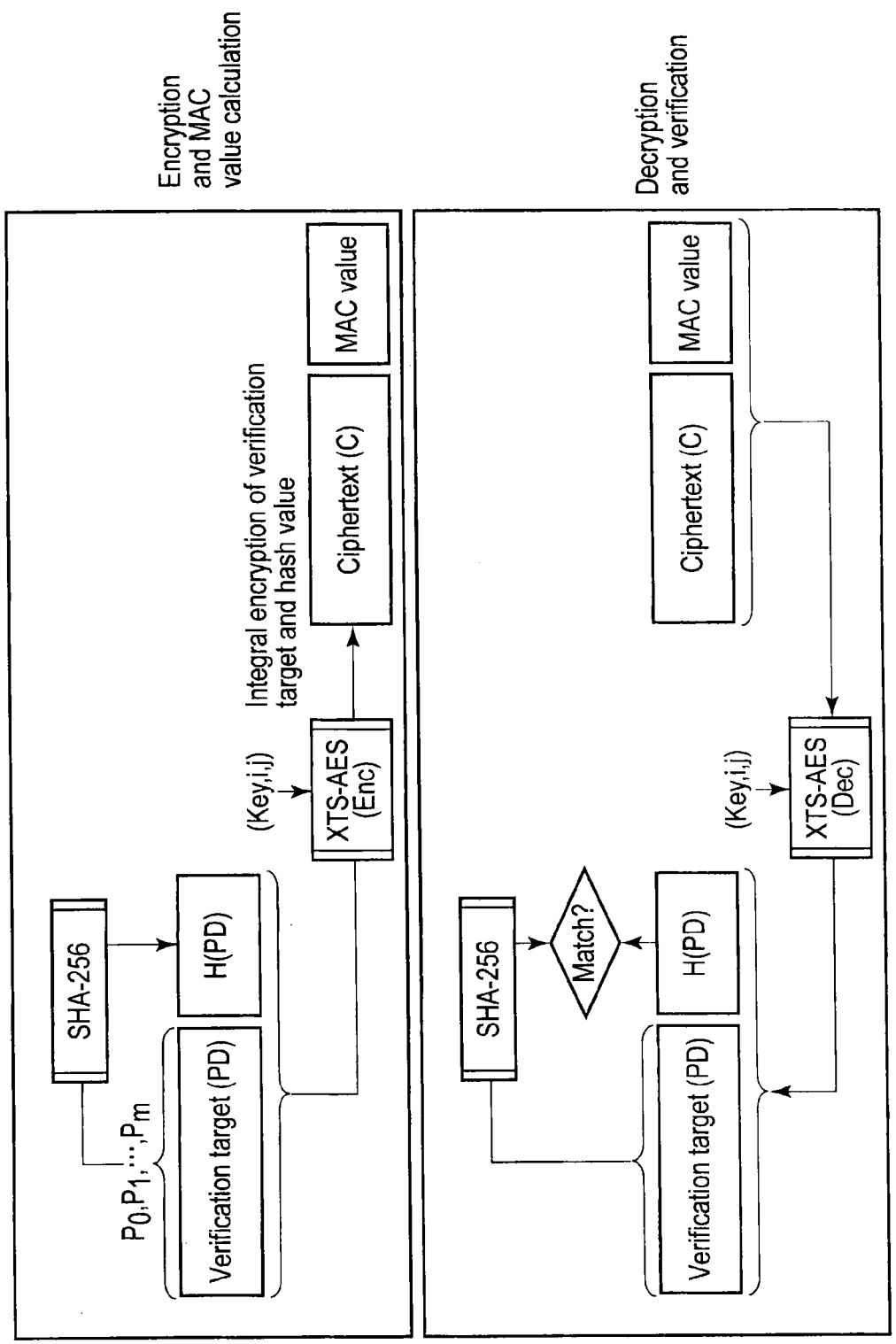
F I G. 55

MEMORY MANAGEMENT DEVICE AND NON-TRANSITORY COMPUTER READABLE STORAGE MEDIUM

CROSS-REFERENCE TO RELATED APPLICATIONS

This application is based upon and claims the benefit of priority from Japanese Patent Applications No. 2014-127601, filed Jun. 20, 2014; and No. 2015-098395, filed May 13, 2015, the entire contents of all of which are incorporated herein by reference.

FIELD

Embodiments described herein relate generally to a memory management device and non-transitory computer readable storage medium.

BACKGROUND

A nonvolatile memory contributes to high-speed boot of an information processing device, and low energy consumption by a normally-off function.

However, in a term of data security, the nonvolatile memory may be attacked in a manner different from an attack on volatile memory.

For instance, when power to currently working information processing device is interrupted, data in the volatile memory of the device will disappear. Therefore, even if the volatile memory is physically accessed after the power down, data stored in the volatile memory before the power down cannot be thieved or falsified.

In contrast, a nonvolatile memory still store data even during power down. Accordingly, it is possible to remove the nonvolatile memory from an information processing device during the power down, thieve or falsify data therein using an external device, then return the nonvolatile memory to the information processing device, and restart the information processing device. As a result, an operation of the information processing device can be illegally changed. Such a memory attack will especially be significant threat to an information processing device used outside or at a location where a person can illegally access it.

As a countermeasure against illegal data falsifying, various verification techniques, such as hashing or Message Authentication Code (MAC), are used. In general, a hash value and a MAC value for verification target data are called verifiers. In data falsifying verification, it is determined whether verification target data is falsified according to whether a first verifier calculated at a first time based on the verification target data matches a second verifier calculated at a second time based on the verification target data. When a verifier is calculated for verification target data and verification is executed based on the verifier, the verification target data itself may be stored in a place where it may be falsified. However, it is necessary to store the verifier and a secret key in a secure place where neither of falsifying and reference is possible.

BRIEF DESCRIPTION OF THE DRAWINGS

FIG. 1 is a block diagram showing an example of a structure of a memory management device according to a first embodiment;

FIG. 4 is a block diagram showing an example of a hardware structure for executing address translation and data reference, and a data structure of a secure page table tree according to the second embodiment;

FIG. 5 is a conceptual diagram showing an example of definitions of blocks according to the second embodiment;

FIG. 6 is a block diagram showing an example of a concept of a data acquisition and address translation by an information processing device according to the second embodiment;

FIG. 8 is a data structure diagram showing an example of a MAC tree structure of a secure page table tree and secure verifier tree according to the second embodiment;

FIG. 11 is a flowchart showing an example of data reference processing according to the second embodiment;

FIG. 15 is a flowchart showing an example of replacement processing according to the second embodiment;

FIG. 18 is a view showing an example of a specification of a HAP field;

FIG. 20 is a block diagram showing an example of a first limitation embodiment of a virtual address area associated with a page table tree and verifier tree according to a third embodiment;

FIG. 22 is a block diagram showing an example of a relationship between an address map and physical address areas;

FIG. 23 is a data structure diagram showing an example of a stage-2 page table tree of a guest OS;

FIG. 26 is a block diagram showing an example of a structure of an information processing device according to a sixth embodiment;

FIG. 29 is a flowchart showing an example of OS switch processing according to the sixth embodiment;

FIG. 30 is a system structure diagram showing an example of an information processing system according to a seventh embodiment;

FIG. 31 is a block diagram showing an example of a structure of the information processing system according to the seventh embodiment;

FIG. 32 is a flowchart showing an example of forensic processing of the information processing system according to the seventh embodiment;

FIG. 37 is a flowchart showing an example of processing of verifying data in an internal memory;

FIG. 38 is a flowchart showing an example of processing of verifying data in an external memory;

FIG. 41 is a flowchart showing an example of update processing for data stored in the external memory according to the eighth embodiment;

FIG. 42 is a block diagram showing an example of a structure of a memory management device according to the eighth embodiment;

FIG. 43 is a block diagram showing an example of a hardware configuration of an information processing device according to a ninth embodiment;

FIG. 45 is a state transition diagram showing an example of a copy state and verification state of data in each data protection type, according to the ninth embodiment;

FIG. 46 is a view showing an example of a relationship between states of a data protection type field in a page table entry, states of a D/F flag, states of a valid/invalid flag, states of subsequent reference data, and symbols designating states of the subsequent reference data, according to data protection types;

FIG. 52 is a conceptual diagram showing an example of XTS-AES;

FIG. 53 is a view showing an example of Tweak and Sequence Number;

FIG. 54 is a conceptual diagram showing an example of MAC value calculation and verification processing when there is no "protection by encryption" for a page table; and FIG. 55 is a conceptual diagram showing an example of MAC value calculation and verification processing when there is "protection by encryption" for a page data.

DETAILED DESCRIPTION

Figure 2:
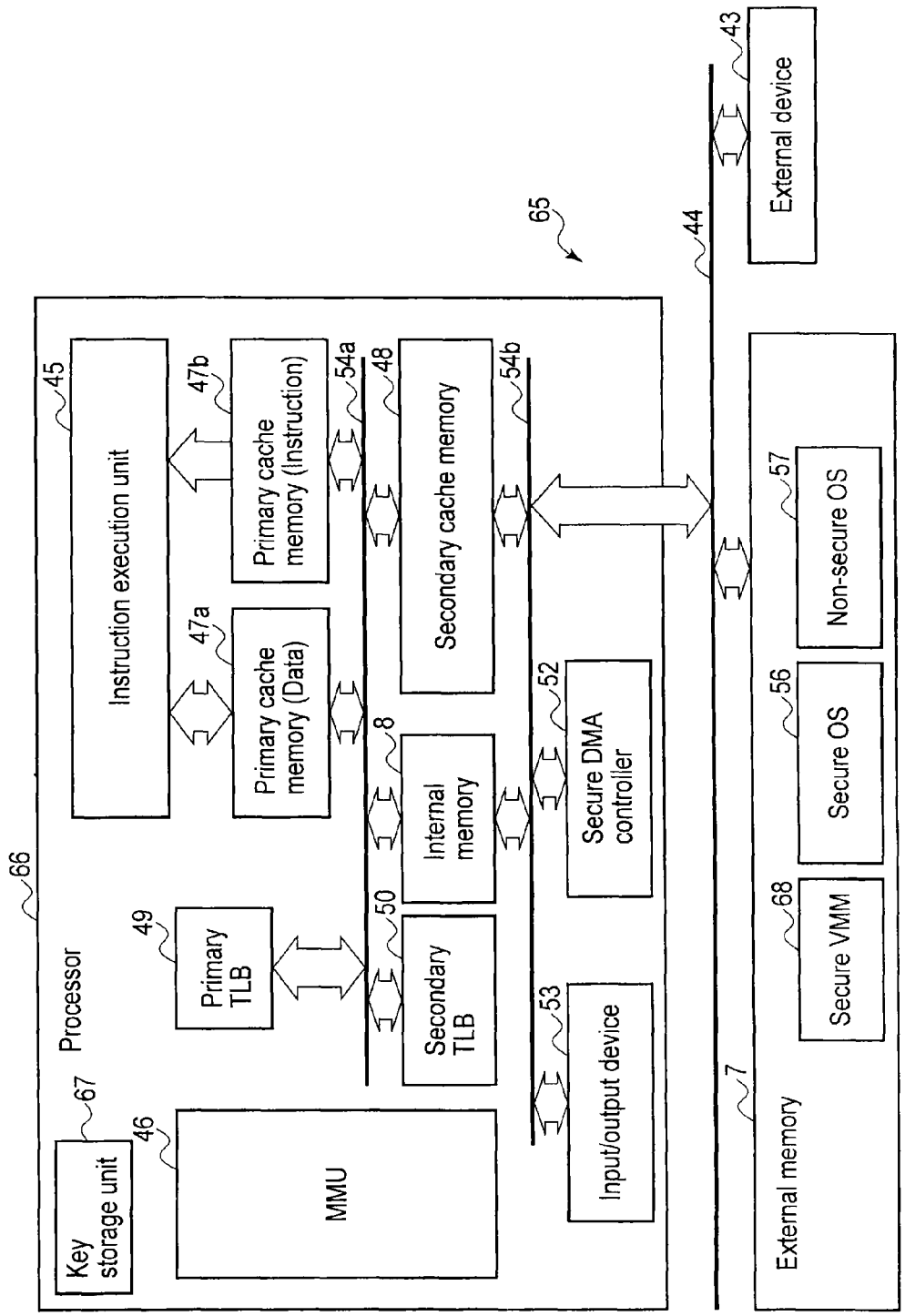
FIG. 2 is a block diagram showing an example of a hardware configuration of the information processing device according to a second embodiment.

In general, according to one embodiment, a memory management device includes an external input/output unit, address translation unit, verification calculation unit, verification unit, and update unit. The external input/output unit executes reading and writing for a first storage unit. The first storage unit stores a table tree including a parent table and a child table and a verifier tree including a parent verifier associated with the parent table and a child verifier associated with the child table. The parent verifier is used for verifying the child table and the child verifier. The address translation unit translates a first address into a second address based on a secure table tree which is a part of the table tree and is stored in a secure second storage unit. The secure second storage unit stores a secure verifier tree which is a part of the verifier tree. The verification calculation unit calculates verification information, when a first child table included in the table tree and needed for translating the first address into the second address is not included in the secure table tree, based on the first child table in the table tree and a first child verifier included in the verifier tree and associated with the first child table. The verification unit executes verification, based on the verification information and a first parent verifier included in the secure verifier tree and associated with a first parent table referring to the first child table. The update unit incorporates the first child table and the first child verifier into the secure table tree and the secure verifier tree, respectively, when a result of the verification designates validity.

Embodiments will be described with reference to the accompanying drawings. In the descriptions below, similar reference numbers denote elements similar in function and structure, and duplicate descriptions will be given only when necessary.

First Embodiment

A present embodiment explains a memory management device which verifies data integrity and prevents falsification of data.

FIG. 1 is a block diagram showing an example of a structure of the memory management device according to the present embodiment. Each structural element of the memory management device 1 may be realized by hardware or a processor controlled by a program.

The memory management device 1 includes an external input/output unit 2, address translation unit 3, verification calculation unit 4, verification unit 5, update unit 6 and replacement management unit 20.

The memory management device 1 executes reading and writing to an external memory 7 as a first storage unit and an internal memory 8 as a second storage unit.

The external memory 7 is, for example, a nonvolatile memory device. More specifically, the external memory 7 may be a nonvolatile semiconductor memory, such as a NAND flash memory, a NOR flash memory, a magnetoresistive random access memory (MRAM), a phase-change random access memory (PRAM), a resistive random access memory (ReRAM) or a ferroelectric random access memory (FeRAM). The external memory 7 may be used as a main storage device, or as an auxiliary storage device, such as a hard disk, or a solid-state drive (SSD).

The external memory 7 stores a page table tree 9 having a hierarchical structure, and a verifier tree 10 having a hierarchical structure. In the present embodiment, the page table tree 9 and the verifier tree 10 each have a two-stage hierarchy. However, it is a matter of course that the page table tree 9 and the verifier tree 10 may each have a three-stage or more hierarchy.

The page table tree 9 is formed by a hierarchical structure including a plurality of page tables. The page table tree 9 includes a parent table 101 and child tables 201 to 20*m*, for translating a virtual address into a physical address. When a table entry E includes address information X, and address information X designates an intermediate table T for determining an access destination of target data D, or data D itself, this means that the table entry E refers to the table T or data D. A reference destination address in the table entry E is the address data X. A reference source of the table T or data D is the table entry E. Parent entries pe1 to pem included in the parent table 101 are used for referring to the child tables 201 to 20*m*. Child entries ce1 to cex included in the child tables 201 to 20*m* are used for referring to data 301 to 30*x*.

In the present embodiment, a description will be given of a typical case where the data 301 is accessed via the parent entry pe1 in the parent table 101 and the child entry ce1 in the child table 201 in the page table tree 9. However, a similar description also applies to a case where data is accessed via another parent entry, another parent table, another child entry, or another child table.

The verifier tree 10 has a hierarchical structure including parent verifiers pv1 to pvm and child verifiers cv1 to cvx. The parent verifiers pv1 to pvm are associated with the parent table 101. The child verifiers cv1 to cvn are associated with the child table 201. A similar description to a relationship between child verifiers cv1 to cvn and the child table 201 also applies to a relationship between other child verifiers and a corresponding child table.

In the present embodiment, the child verifiers cv1 to cvn associated with the child table 201 are used for verifying data 301 to 30*n* referred to by the child entries ce1 to cen included in the child table 201, respectively.

The parent verifier pv1 associated with the parent table 101 is used for verifying the child table 201 referred to by the parent entry pe1 included in the parent table 101, and the child verifiers cv1 to cvn associated with the child table 201. A similar description to a relationship between the parent verifier pv1 and combination of the child table 201 and child verifiers cv1 to cvn also applies to a relationship between another parent verifier and combination of a corresponding child table and corresponding child verifiers.

The internal memory 8 is a storage device that cannot directly be accessed externally and is protected from illegal access. For instance, the internal memory 8 is a storage device in a processor package. Specifically, the internal memory 8 is, for example, hardware integrated with a package of a processor 66 as one body, as is shown in FIG. 2 directed to a second embodiment described below. Data transfer is performed between the internal memory 8 and an external bus 44 via internal bus 54*b*. The data transfer is performed based on a instruction executed by a instruction execution unit 45 in the processor 66. It is supposed that a content of the internal memory 8 cannot directly be read or rewritten via the external bus 44. A memory having a similar feature to that of the internal memory 8 is regarded as a secure memory. In contrast, in the external memory 7, reading and writing for an arbitrary address and rewriting data corresponding to the address are possible via the external bus 44. Therefore, the external memory 7 is not regarded as a secure memory.

The internal memory 8 and the external memory 7 are arranged in a same physical address space. The internal memory 8 can be accessed from software executed by the instruction execution unit 45, like the external memory 7.

The internal memory 8 stores a secure page table tree 121 as a part of the page table tree 9, and a secure verifier tree 122 as a part of the verifier tree 10. The internal memory 8 stores root verification information 13 used for verifying the parent table 101 and parent verifiers pv1 to pvm.

The address translation unit 3 determines physical addresses of the data 301 to 30*x* via the parent entries pe1 to pem in the parent table 101 and child entries ce1 to cex in the child tables 201 to 20*m*, stored in the internal memory 8.

When the parent table 101 is copied (moved or read-in) from the external memory 7 to the internal memory 8, the parent verifiers pv1 to pvm associated with the parent table 101 are also copied from the external memory 7 to the internal memory 8.

In the present embodiment, a page table or data is copied from the external memory 7 to the internal memory 8 that is protected from falsification, and is verified. When a page table or data in the internal memory 8 is changed and then deleted from the internal memory 8, the changed page table or data in the internal memory 8 is written to the external memory 7. When a page table or data in the internal memory 8 is deleted from the internal memory 8 without any change, the page table or data in the internal memory 8 may be written to the external memory 7 or may be directly discarded. In the description below, copy of a page table or data between the external and internal memories 7 and 8 may be expressed as moving, reading-in, or writing-out. For instance, change of a reference destination of a page table to the page table or data copied to the internal memory 8 may be expressed as moving or reading of the page table or data. In this case, the page table or data as a copy source in the external memory 7 may not be deleted.

When the child table 201 is copied from the external memory 7 to the internal memory 8, the child verifiers cv1 to cvn associated with the child table 201 are also copied from the external memory 7 to the internal memory 8.

The external input/output unit 2 executes reading and writing for the page table tree 9 and the verifier tree 10 stored in the external memory 7.

Firstly, a description will be given of a case where the child table 201 and child verifiers cv1 to cvn are copied from the external memory 7 to the internal memory 8.

The address translation unit 3 translates a virtual address into a physical address, based on the secure page table tree 121 stored in the internal memory 8. When the child table 201 needed to translate a virtual address into a physical address is not included in the secure page table tree 121, the address translation unit 3 sends a table-missing notification (fault) 14 to the verification calculation unit 4, and translates the virtual address into the physical address, based on the updated secure page table tree 121.

When the verification calculation unit 4 receives the table-missing notification 14 from the address translation unit 3, the verification calculation unit 4 reads, from the external memory 7 via the external input/output unit 2, the child table 201 in the page table tree 9 and child verifiers cv1 to cvn in the verifier tree 10, calculates verification information 15, based on the read child table 201 and child verifiers cv1 to cvn, and sends the verification information 15 to the verification unit 5.

The verification unit 5 executes verification, that is, determines whether the verification information 15 calculated by the verification calculation unit 4 matches the parent verifier pv1 in the secure page table tree 121 associated with the parent table 101 that includes a reference source entry pe1 in the secure page table tree 121. Subsequently, the verification unit 5 sends a verification result 36 to the update unit 6.

When the update unit 6 receives the verifier result 16 from the verification unit 5 and the verifier result 16 designates validity, the update unit 6 sets the child table 201 in the secure page table tree 121 in the internal memory 8 and sets the child verifiers cv1 to cvn in the secure verifier tree 122 in the internal memory 8. More specifically, assume here that before updating, the parent entry pe1 in the parent table 101 refers to the child table 201 included in the page table tree 9 in the external memory 7. The update unit 6 updates the parent entry pe1 to be updated in the parent table 101 in the secure page table tree 121 to cause it to refer to the child table 201 included in the secure page table tree 121 in the internal memory 8.

In the memory management device 1 according to the present embodiment, for example, the external input/output unit 2 may read, before a confirmation of the verification result 16, the child table 201 and child verifiers cv1 to cvn into the internal memory 8, and set the child table 201 and child verifiers cv1 to cvn in the secure page table tree 121 and the secure verifier tree 122 if the verification result 16 designates validity.

As described above, in the present embodiment, when the child table 201 is not stored in the internal memory 8, and the child table 201 and verifiers cv1 to cvn are copied from the external memory 7 to the internal memory 8, the parent entry pe1 in the parent table 101 refers to the child table 201 in the external memory 7. When the child table 201 is stored in the internal memory 8, the parent entry pe1 in the parent table 101 is updated to refer to the child table 201 in the internal memory 8.

In the present embodiment, when the parent table 101 is not stored in the internal memory 8, and the parent table 101 and parent verifiers pv1 to pvn is copied from the external memory 7 to the internal memory 8, the verification calculation unit 4 generates verification information, based on the parent table 101 and parent verifiers pv1 to pvn read from the external memory 7, and a physical address stored in the parent table 101 in the external memory 7. By generating the verification information using the physical address of the parent table 101 in the external memory 7, a protection from an attack of exchanging the parent table 101, can be realized.

The verification unit 5 executes verification based on the root verification information 13 and the generated verification information. When a verification result designates validity, the update unit 6 sets, in the secure page table tree 121, the parent table 101 read from the external memory 7, and sets, in the secure verifier tree 122, the parent verifiers pv1 to pvn read from the external memory 7.

Secondly, a description will be given of an example case where the data 301 is copied from the external memory 7 to the internal memory 8.

The address translation unit 3 sends a data read notification 17 to the verification calculation unit 4 and replacement management unit 20 when a physical address obtained by translating a virtual address refers to the external memory 7.

For instance, the address translation unit 3 may manage, in advance, the reference-data read state of the internal memory 8 without determining whether a data reference destination is the external memory 7, using a valid/invalid flag in a page table, thereby increasing a speed of determination of the data reference destination. A valid flag is set in a table entry in the secure page table tree 121 that refers to data stored in the internal memory 8. An invalid flag is set in a table entry of the secure page table tree 121 that refers to data stored in the external memory 7. When a page fault associated with address translation is occurred, the address translation unit 3 copies a page table or data in the external memory 7 to the internal memory 8. When reference data is stored in the internal memory 8, the address translation unit 3 can refer to the data at high speed without any page fault.

When the verification calculation unit 4 receives the data read notification 17 from the address translation unit 3, the verification calculation unit 4 reads the data 301, referred to by a physical address, from the external memory 7 via the external input/output unit 2, calculates data verification information 18, based on the read data 301 and the physical address in the external memory 7 corresponding to the data 301, and sends the data verification information 18 to the verification unit 5. By thus generating the data verification information 18 using a physical address of data in the external memory 7, a protection from an attack of exchanging the data 301, can be realized.

The verification unit 5 executes data verification as to whether the data verification information 18 calculated by the verification calculation unit 4 matches the child verifier cv1 associated with the child table 201 as a reference source in the secure page table tree 121, and sends data verification result 19 to the update unit 6.

The update unit 6 receives the data verification result 19 from the verification unit 5, and sets the data 301 in the secure page table tree 121 in the internal memory 8 when the data verification result 19 designates validity. More specifically, assume here that before updating, the child entry ce1 in the child table 201 refers to the data 301 included in the page table tree 9 in the external memory 7. The update unit 6 updates the child entry ce1 to be updated in the child table 201 in the secure page table tree 121 to cause it to refer to the data 301 in the internal memory 8.

In the memory management device 1 according to the present embodiment, for example, the external input/output unit 2 may read, before a confirmation of the data verification result 19, the data 301 into the internal memory 8, and set the data 301 in the secure page table tree 121 when the data verification result 19 designates validity.

As described above, when in the present embodiment, the data 301 is not stored in the internal memory 8, and is copied from the external memory 7 to the internal memory 8, the child entry ce1 in the child table 201 refers to the data 301 in the external memory 7. When the data 301 is stored in the internal memory 8, the child entry ce1 in the child table 201 is updated to refer to the data 301 in the internal memory 8.

A virtual address is translated to a physical address corresponding to the data 301 via the parent entry pe1 in the parent table 101 and child entry ce1 in the child table 201. The data 301 to be referred to is stored in an area in the secure internal memory 8 designated by the physical address. All data and tables to be referred to by such address resolution are determined valid by the verifications, and are arranged in the secure internal memory 8.

Thirdly, a description will be given of a case where the data 301 is copied (written) from the internal memory 8 to the external memory 7.

The verification calculation unit 4 calculates the child verifier (data verification information) cv1, based on the data 301 in the internal memory 8, when the data 301 stored in the internal memory 8 is written to the external memory 7.

The external input/output unit 2 stores the data 301 in the external memory 7.

The update unit 6 updates, to a storage position in the data 301 in the external memory 7, a reference destination (physical address) of the child entry ce1 in the child table 201 in the secure page table tree 121. Further, the update unit 6 relates the child verifier cv1 calculated by the verification calculation unit 4 to the child table 201 in the secure page table tree 121, and sets, to the secure verifier tree 122, the child verifier cv1. For instance, the update unit 6 sets the child entry ce1 in the child table 201 invalid, when the data 301 in the internal memory 8 is not referred to by the secure page table tree 121. Then, when the data 301 is referred to, a page fault occurs, whereby the data 301 in the external memory 7 is verified and copied to the internal memory 8 as described above.

In the present embodiment, the update unit 6 sets the parent entry pe1 in the parent table 101 invalid when the secure page table tree 121 does not include the child table 201, and sets the parent entry pe1 in the parent table 101 valid when the child table 201 is incorporated in the secure page table tree 121.

The update unit 6 sets the child entry ce1 in the child table 201 invalid when the internal memory 8 does not store the data 301, and sets the child entry ce1 in the child table 201 valid when the internal memory 8 stores the data 301.

In the above-described first and second cases, the replacement management unit 20 confirms a capacity of a free area in the internal memory 8, when a table or data is to be stored in the internal memory 8, for example, when the data read notification 17 is received from the address translation unit 3. When the capacity of the free area in the internal memory 8 is not enough, the replacement management unit 20 sends, to the verification calculation unit 4, a verification information request 21 for a table or data in the internal memory 8 selected to be deleted. In a response to the verification information request 21, the replacement management unit 20 receives, from the verification calculation unit 4, a verifier corresponding to the selected table or data in the internal memory 8. Then, the replacement management unit 20 writes the selected table or data in the internal memory 8 and its verifier to the external memory 7 via the external input/output unit 2, thereby releasing an area of the selected table or data in the internal memory 8 to increase the free area in the internal memory 8.

In the above-described embodiment, any necessary portion of the page table tree 9, verifier tree 10 and data 301 to 30x stored in the external memory 7 can be verified, and the verified necessary portion can be stored in the internal memory 8 smaller in capacity than the external memory 7. As a result, a physical attack against the external memory 7 can be detected, and data integrity can be verified to thereby prevent falsification of data. In the present embodiment, falsification of the page table tree 9, verifier tree 10 and data 301 to 30x can be detected by falsification verification, thereby enhancing a security level of the information processing device.

Verification according to the present embodiment is applicable to a virtualization technique, and can be easily applied without changing a guest operating system (OS) and application by referring to the secure page table tree 121 and the secure verifier tree 122 stored in the internal memory 8.

In the present embodiment, the page tables coincide with the verifiers in hierarchical structure, and the page tables and verifiers are verified as one body. In other words, the page table tree 9 and the verifier tree 10 have the same graph structure. As a result, even if a verifier is a paging target, it is not necessary to resolve a destination address of the verifier. Further, since the page tables and the verifiers are managed using a hierarchical structure, the secure page table tree 121, the secure verifier tree 122, the page table tree 9 and the verifier tree 10 can be arranged in memory areas of a discontinuous address space. This enables efficient memory use. In the present embodiment, management of verifiers using a hierarchical structure enables efficient management.

In the present embodiment, a non-verified page table and non-verified data are detected by a page fault of an existing address translation mechanism. Therefore, it is not necessary to add new hardware. Further, in the present embodiment, each page table and a corresponding verifier are copied not separately but integrally between the external memory 7 and the internal memory 8. Accordingly, even when a page fault has occurred, increase in overhead can be suppressed.

In the present embodiment, whether a page table and data are stored in the internal memory 8 is managed depending upon whether an entry in the upper-level page table corresponding to the page table and data is valid. As a result, it can be determined efficiently whether the page table and data are stored in the internal memory 8, using an address translation mechanism as general-purpose hardware.

Second Embodiment

In a present embodiment, an information processing device including the memory management device 1 according to the first embodiment will be described in detail. This information processing device may be a computer system.

FIG. 2 is a block diagram showing an example of a hardware structure of the information processing device according to the present embodiment.

An information processing device 65 includes a processor 66, the external memory 7, an external device 43 and an external bus 44. The processor 66, the external memory 7 and the external device 43 can transmit and receive data, signal or instruction therebetween via the external bus 44.

A virtualization assisting mechanism included in the information processing device 65 executes address translation in two stages, for example.

The processor 66 includes a instruction execution unit (processor core) 45, a memory management unit (MMU) 46, primary cache memories 47a and 47b, a secondary cache memory 48, a primary address translation cache (TLB: Translation Look-aside Buffer) 49, a secondary address translation cache 50, the internal memory 8, a secure direct memory access (DMA) controller 52, an input/output device 53, a key storage unit 67, and internal buses 54a and 54b. The structural elements 8, 45 to 53 and 67 of the processor 66 can transmit and receive data, signal or instruction therebetween via the internal buses 54a and 54b.

The external memory 7 stores a secure Virtual Machine Monitor (VMM) 68, a secure OS 56 and a non-secure OS 57.

In the present embodiment, the secure OS 56 and the non-secure OS 57 are guest OSs managed by the secure VMM 68.

The external device 43 is a nonvolatile memory device, such as a hard disk.

The instruction execution unit 45 of the processor 66 executes data reference, using primary cache memories 47a and 47b and the secondary cache memory 48 that have a hierarchical structure. In a following explanation, data reference executed after address translation will be described firstly, and then the address translation will be described.

The primary cache memory 47a is a primary cache memory for data. The primary cache memory 47b is a primary cache memory for data and instruction. The second cache memory 48 is a secondary cache memory for data and instruction.

The instruction execution unit 45 can refer to the data or instruction stored in the secondary cache memory 48 more quickly than to those stored in the internal memory 8 or external memory 7. Further, the instruction execution unit 45 can access the primary cache memories 47a and 47b quicker than the secondary cache memory 48.

The instruction execution unit 45 reads data or instruction from the primary cache memory 47a or 47b, the secondary cache memory 48, or the internal memory 8, and executes processing.

When reference target data is stored in the primary cache memory 47a or 47b, data reference to the secondary cache memory 48 or the internal memory 8 is not performed.

When reference target data is not stored in the primary cache memory 47a or 47b, and is stored in the secondary cache memory 48, data reference to the internal memory 8 is not performed. This enables the data reference to be performed in a short time.

The data read from the internal memory 8 may be stored to the primary cache memory 47a or 47b not through the secondary cache memory 48.

The key storage unit 67 stores the root verification information 13, and key information used for an encryption or verification in the information processing device 65.

The secure DMA controller 52 executes data transfer between various structural elements. The secure DMA controller 52 may be realized by, for example, hardware and execute MAC-value calculation. However, the MAC-value calculation may be carried out by software.

The information processing device 65 executes virtual storage management in cooperation with memory verification processing. In the present embodiment, a nonvolatile semiconductor memory is used as a main storage device. In the present embodiment, the page table tree 9 having a hierarchical structure and the verifier tree 10 having a hierarchical structure are generated. The page table tree 9 and the verifier tree 10 match each other in the hierarchical structure. The page table tree 9 and the verifier tree 10 are stored in the nonvolatile external memory 7, and portions of the trees are stored in the internal memory 8 when necessary. Since the external memory 7 is a nonvolatile storage device, the external memory 7 maintains a storage state before power is turned off, when the power is turned off and then again turned on.

For instance, in integrated hardware realized by integrating a package of a processor, such as a central processing unit (CPU) or a micro-processing unit (MPU), and a main storage device, it is difficult to perform the above-mentioned data theft, falsification, and physical attack. However, the integrated hardware is generally expensive, and hence there is a demand for a technique of realizing secure processing by combination of a general-purpose processor package and a general-purpose memory.

In the present embodiment, it is supposed that the internal memory 8 provided within a package of the processor 66 is protected from a physical attack. However, it is also supposed that an attack of causing data to be illegally output from the internal memory 8, using illegal software, is possible. It is further supposed that an attacker against the information processing device 65 can freely renew an arbitrary area at an arbitrary time in the external memory 7.

In the present embodiment, a memory area protected from data falsification, and an encrypted memory area, are referred to as protected memory areas.

In order to prevent an attack against the main storage device of the information processing device 65 and eliminate a threat, following first to fifth conditions must be satisfied in view of security and system configuration:

The first condition relates to a security. As the first condition, data falsification including a replay attack must be perfectly detectable.

The second condition relates to a hardware configuration. As the second condition, dedicated hardware does not have to be required. More specifically, as the second condition, it is required that hardware dedicated to verification of memory falsification is not needed. The second condition requires that an attack is prevented and a threat is eliminated, based on an address translation mechanism, a virtualization assisting mechanism, a general-purpose internal memory in a processor, a speed-up auxiliary mechanism, and/or, a high-speed encryption engine that cooperates with a DMA controller, included in a large number of processors. The second condition requires that processing based on software, such as firmware, is possible. The second condition requires that the hardware configuration is easily compatible with a virtualization technique. The second condition requires that the hardware configuration is operable even if a memory size of the secure internal memory 8 is small such as approximately one megabyte.

The third condition relates to a memory. The third condition requires that a large-capacity memory, such as a memory having a 32-bit address space or more, is usable. The third condition requires that a memory verification target area is selectable. The third condition requires that memory areas as protection targets can be arranged in some discontinuous areas in a memory map, and that only a necessary portion of the memory can be set as a falsification verification target. The third condition requires that data itself, which defines an area of the memory selected as the falsification verification target, can also be protected from an attack. The third condition requires that even when memory areas as protection targets are discontinuous, only selected area can be verified, and a memory area dedicated to a verifier is not required in an area other than the selected area, thereby enabling the memory to be used efficiently.

The fourth condition relates to a software configuration and security. The fourth condition requires that entire OS can be set as a protection target. The fourth condition requires that hardware, which is dedicated to communication with an external device and does not need falsification verification, can be excluded from a falsification verification target and can be set as a non-selected area. The fourth condition requires that the software configuration has transparency, namely, the OS and application do not have to be modified. The fourth condition requires that if an OS is malfunctioned and an illegal instruction is executed, a memory falsification verification function is security and sturdy against a verification detour or damage of control information although the damage of the OS itself and an erroneous operation of the OS are permitted.

The fifth condition relates to efficiency of processing. The fifth condition requires that efficiency of processing should be increased by executing frequently occurring processing, such as determination as to whether falsification verification should be executed for each memory access, using hardware as far as possible.

The present embodiment realizes an information processing device 65, in which a nonvolatile main storage device is supposed to be used, verification is executed based on the secure verifier tree 122, multi-stage address translation is executed based on the secure page table tree 121, a virtualization technique is supposed to be employed, and the above-mentioned first to fifth conditions are satisfied.

The present embodiment has two important points. The first important point will firstly be described.

The first point relates to securing of address transparency, and provision of a detection function of non-verified data reference. More specifically, when reference to data by a guest OS is occurred, the secure VMM 68 confirms a page table entry, and stores data in the external memory 7 to a buffer memory dynamically secured in the internal memory 8 when verification via the internal memory 8 is needed.

When the verification via the internal memory 8 is succeeded, the secure VMM 68 rewrites a managed secure page table tree 121 (for example, state-2 page table tree) so that data in a physical memory as data reference destination of the guest OS is changed from an original data in the external memory 7 to data of a destination address in the internal memory 8.

The guest OS does not have to recognize change of the reference destination. Accordingly, even when the verification according to the present embodiment is introduced, the guest OS does not have to be changed, and hence the transparency of the guest OS can be obtained.

The unit of writing in the internal memory 8 is a page. However, in order to reduce the unit of writing to enhance memory-use efficiency of entire processor 66 including cache memories, when the instruction execution unit 45 acquires data from the external memory 7 via primary cache memory 47*a* or 47*b*, or the secondary cache memory 48, verification may be executed without changing the reference destination of a page table entry, upon copying data from the external memory 7 to primary cache memory 47*a* or 47*b*, or the secondary cache memory 48. In this case, a hardware mechanism for causing reading from a cache memory and verification processing to cooperate with each other is needed.

To prevent falsification, detection of reference to the external memory 7, an execution of verification, and copying of verified data to the secure internal memory 8 are needed. When a hardware cache is used, change of a reference destination corresponding to reading to the secondary cache memory 48 is executed by a dedicated hardware mechanism without any software, which guarantees address transparency to the guest OS. In contrast, in verification using firmware, an allocated destination of verified data differs from an address of original data. Since thus, the guest OS must be changed unless change of a reference destination is hidden from the guest OS in some way. Namely, address transparency to the guest OS is not guaranteed.

In order to protect verified data from an attack, such as falsification, and to hide copying of data to the internal memory 8 from the guest OS, the present embodiment uses a virtualization assisting mechanism in which two-stage address translation is performed, whereby the address transparency to the guest OS is realized by changing a data reference destination in the secure page table tree 121 after writing data from the external memory 7 to the internal memory 8.

Further, in the present embodiment, reference to non-verified data is detected. Then, in the present embodiment, an entry in the secure page table tree 121 is set "invalid" in an initial state, and the entry in the secure page table tree 121 is set "valid" when verification and reading-in of a page table or data corresponding to the entry is succeeded. This enables a non-read page table or non-read data to be efficiently detected using the address translation mechanism as general-purpose hardware.

The second point of the present embodiment will then be described.

The second point relates to a technique of matching the hierarchical structure of the secure page table tree 121 with the hierarchical structure of the secure verifier tree 122. In the present embodiment, to enable verification of large-scale data, a state of writing from the external memory 7 to the internal memory 8 is managed. In the present embodiment, to realize transparent falsification verification by firmware processing, the address translation mechanism is used. When an operation of the address translation mechanism is interrupted, and such an illegal operation as in which the external memory 7 is erroneously accessed instead of access to the internal memory 8 is performed, the above-described verification and protection of reading data cannot correctly be executed. In view of this, in the present embodiment, the operation of the address translation mechanism is protected from an attack.

The address translation mechanism executes referring to a page table, and address translation. The page table is provided in the internal memory 8, and is definition information for translating a virtual address into a physical address. When the address space is enlarged, a large memory size is needed for storing a page table. For instance, when entire address space of one page table is simply stored, a memory size of 2 gigabytes is needed, assuming that a memory of one terabytes should be protected. Then, simply securing the address space of each page table in a physical memory in a fixed manner imposes a heavy load on the information processing device. There are two methods for reducing the address space of a page table. In a first method, page tables are hierarchized, the resultant hierarchical page tables in the internal memory 8 are referred to, and each page table itself is set as a paging target. A second method relates to hierarchization in the first method. In the second method, a table definition state of a portion in the memory space in the internal memory 8, to which no reference is needed, is maintained undefined, and a discontinuous memory space definition is permitted to thereby reduce a data amount of a table.

The address translation mechanism is a general-purpose mechanism employed in many processors. However, unlimited permission of a paging or undefined state of a page table may induce attacks, such as replacement of a legitimate page table or data with an illegitimate page table or data during paging, or re-initialization after rewriting a defined page table or data to an undefined one. In particular, in a non-volatile memory system, data of all memories other than the internal memory 8 may be falsified. Therefore, all page tables or data to be referred to by an MMU need to be arranged in the internal memory 8 after they are verified. As mentioned above, the data size of the page table is large. The internal memory 8 of the processor requires, for example, several hundreds kilobytes to several tens megabytes. Accordingly, paging processing including verification of page tables is needed. If page tables are hierarchized, state management associated with determination to determine up to a page table of which level, verification and reading-in is completed, and state management associated with a reference frequency to each page table, are needed.

Further, for verification processing of each page table or data, the internal memory 8 of a limited capacitance must be used as a work area. It is possible to use, as a simple verification method, a method of providing a verifier dedicated to a page table aside from a verifier for data. However, the hierarchical page tables are defined based on a reference relationship on the memory, and are not always allocated in a continuous address area. For instance, in view of a specification, it is possible that a first entry of a page table is located in a position with a lowest address number in an address space, a second entry is located in a position with a highest address number, and the first and second entries have a reference relationship. It is inefficient to apply, to a discontinuous page table, verifiers stored in a continuous address area. In addition, when the verifiers have a hierarchical structure like the page tables, it is necessary to detect up to what stage of the verifiers verification is completed, and to perform state management for reusing verified ones of the verifiers.

In view of the above, in the present embodiment, the hierarchical structure of the page tables are made to match the hierarchical structure of the verifiers as the second point. By matching the hierarchical structure of the page tables with that of the verifiers, a page table and a verifier corresponding thereto are protected by other verifier. In the present embodiment, since the page tables match in hierarchical structure with the verifiers, a read-in state and a verification state of the page tables and the verifiers are managed in common, thereby reducing a processing load required for data management of a hierarchical structure. The information processing device 65 efficiently allocates verifiers to widely and discontinuously defined address areas, and manages them in secure.

For instance, the three-stage secure page table tree 121, which stores 512 entries in one page table, has a three-stage graph structure having 512 branches. The secure verifier tree 122 corresponding to the secure page table tree 121 is made to have the same graph structure as the secure page table tree 121, i.e., has a three-stage graph structure having 512 branches, thereby matching both the table trees in structure. As a result, the secure page table tree 121 and the secure verifier tree 122 match each other in the unit of management for reading-in and verification.

In processing of a VMM, if reference, by the external memory 7, to not-read page table or data in the internal memory 8, and reference, by the external memory 7, to not-read verifier in the internal memory 8, are detected separately, switching from a guest OS to the VMM is performed whenever reference to a page table or data and reference to a verifier occur, which increases a switching overhead. In the embodiment, the page table and the verifier are matched in hierarchical structure, whereby reference to two types of control data, i.e., a non-read page table and a non-read verifier, is simultaneously detected. This control reduces the number of times of switching from a guest OS to the secure VMM 68, and hence reduces the processing load.

(Two-Stage Address Translation)

Figure 3:
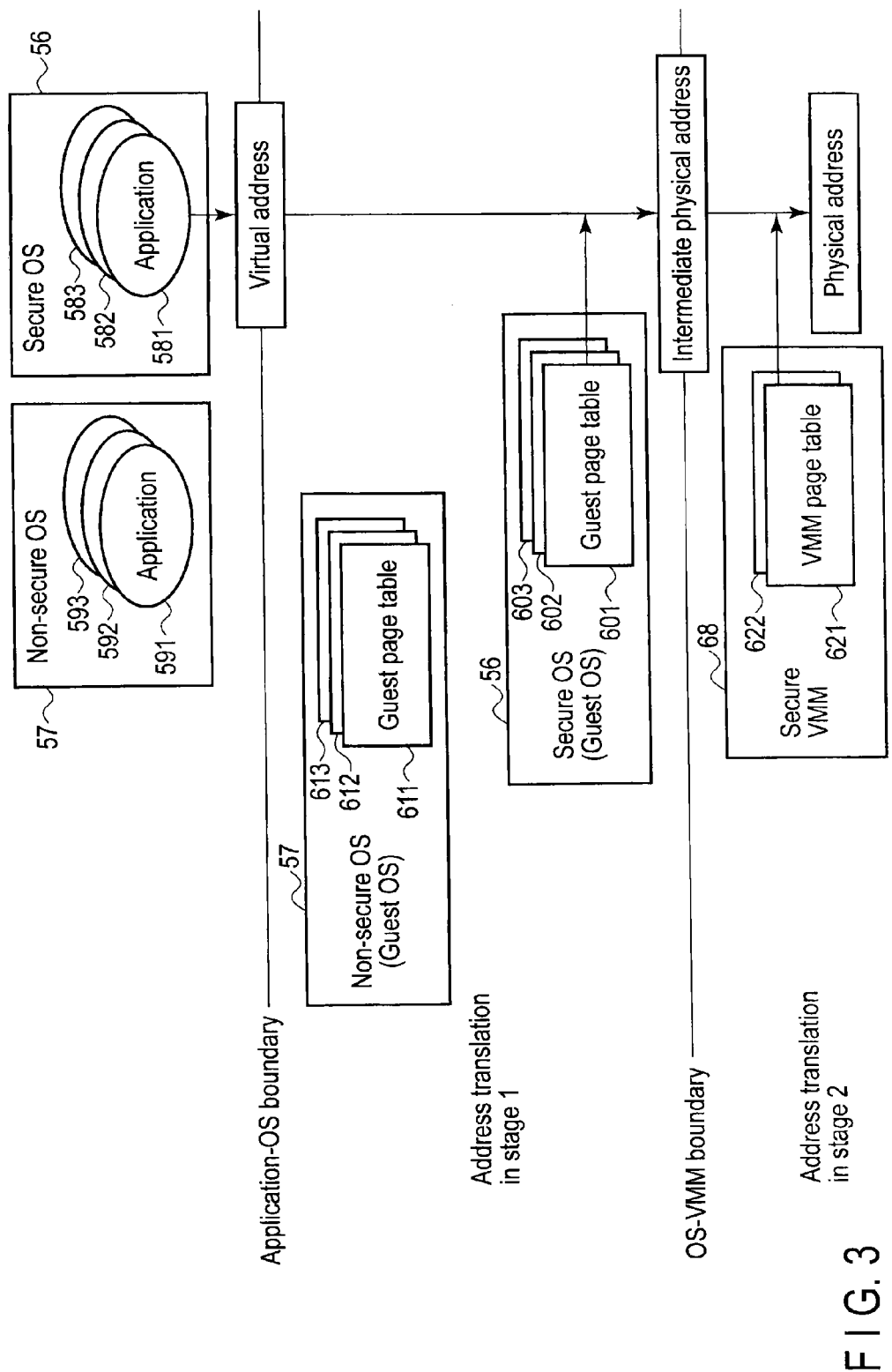
FIG. 3 is a block diagram showing an example of a configuration for executing two-stage address translation.

FIG. 3 is a block diagram showing an example of a structure for executing two-stage address translation.

Applications 581 to 583 are executed on the secure OS 56, and applications 591 to 593 are executed on the non-secure OS 57.

Guest page tables 601 to 603 of the secure OS 56 define translation of the applications 581 to 583 from virtual addresses to intermediate physical addresses, respectively.

Based on the guest page tables 601 to 603, the secure OS 56 translates virtual addresses to intermediate physical addresses.

Guest page tables 611 to 613 of the non-secure OS 57 define translation of the applications 591 to 593 from virtual addresses to intermediate physical addresses, respectively.

Based on the guest page tables 611 to 613, the non-secure OS 57 translates virtual addresses to intermediate physical addresses.

A VMM page table 621 of the secure VMM 68 defines translation by the secure OS 56 from intermediate physical addresses to physical addresses.

A VMM page table 622 of the secure VMM 68 defines translation by the non-secure OS 57 from intermediate physical addresses to physical addresses.

Based on the VMM page tables 621 and 622, the secure VMM 68 translates the intermediate physical addresses to the physical addresses.

Only address translation based on the application 581 included in the applications 581 to 583 and 591 to 593 will now be described. However, address translation based on other applications 582 to 583 and 591 to 593 is performed in the same way.

In two-stage address translation, firstly, in stage 1, address translation by the secure OS 56 is executed, and then in stage 2, address translation by the secure VMM 68 is executed. The secure OS 56 is a guest OS managed by the secure VMM 68. The application 581 controlled by the secure OS 56 is associated with the guest page table 601.

The application 581 issues a instruction read request and a data access request as virtual addresses. The secure OS 56 translates a virtual address into an intermediate physical address, based on the definition of the guest page table 601. A memory area for the intermediate physical address is allocated in advance to each guest OS by the secure VMM 68. Based on the definition of each guest page table, each guest OS allocates the allocated memory area to a currently operating application.

The secure VMM 68 translates an intermediate physical address into a physical address, based on the definition of the VMM page table 621 managed by the secure VMM 68. A request issued as the virtual address is processed using this physical address.

(Data Structure of Secure Page Table Tree 121)

FIG. 4 is a block diagram showing an example of a hardware structure for executing address translation and data reference, and a data structure of the secure page table tree 121.

The secure page table tree 121 shown in FIG. 4 has a virtual address space of, for example, 4 gigabytes. A data structure of the secure page table tree 121 is applicable to various architectures. In a particular architecture, page table size differs between stages 1 and 2 because of physical page expansion. However, in the present embodiment, a case where page tables of the same format are used between stages 1 and 2 will be described.

The processor 66 includes the MMU 46. The MMU 46 includes a register 64 designating a highest-level table of the secure table tree 121.

The register 64 designates upper 20 bits of a highest-level page table T101, using a physical address. Lower 12 bits of a page table constituted in units of 4 kilobytes are omitted. The highest-level page table T101 indexed by the register 64 includes table entries E101-0 to E101-3. Each table entry is of 8 bytes, and has an index for a page table of a subsequent level, and a valid/invalid bit designating whether the page table of the subsequent level is valid or invalid.

Reference by each table entry to a page table of a subsequent level is performed using a pointer. Accordingly, page tables T101, T101-1 and T101-0 may be arranged in the memory in an arbitrary order. Similarly, the page tables of the same level, for example, tables T101-1 to T101-$n$ (n is a natural number not less than 2) of level 2, may be arranged in the memory in an arbitrary order.

Table entries E101-1-0 to E101-1-511 in page table T101-1-0 refer to data B101-0-0 to B101-511-511.

FIG. 5 is a conceptual diagram an example of definitions of blocks according to the present embodiment.

In the present embodiment, blocks which correspond to units of pages, which constitute the page table tree 9, verifier tree 10, secure page table tree 121 and secure verifier tree 122, are called page blocks. Both of a table block and a data block are called a page block.

A page table used for address resolution is called a table block.

Data to be actually read or written is called a data block.

A one-page block that can be referred to, using a certain table block, is called a target block.

All page blocks that can be referred to, using a certain table block, are called associated blocks.

A table block as a reference source of a certain page block is called a reference source block.

MAC values and counter values used for verification are collected in and managed by a respective corresponding table block.

A block including collected MAC values is called a MAC block.

A block including collected counter values is called a counter block.

Combination of a MAC block and a counter block, which correspond to a certain page block, is called a verification block. If there is no counter block, a MAC block corresponding to a page block is set as a verification block.

A verification block corresponding to a certain page block has a format that enables the verification block itself to be associated with a reference source block corresponding to the page block.

(Details of Address Translation)

Referring to FIG. 4, a detailed description will be given of address translation, using, as an example, a case where a virtual address MA01=0x40000000 is issued.

An upper two bits of the virtual address MA01=0x40000000 are 01#b. A table entry E101-1 in the page table T101 indexed by the upper two bits 01#b of the virtual address is referred to.

Subsequently, address translation is advanced by a subsequent page table pointer included in table entry E101-1. When the virtual address MA01 is 0x40000000, the table entry selected in level 1 is E101-1, and a page table of level 2 referred to by table entry E101-1 is T101-1.

Subsequently, a table entry indexed by bits [29:21] of the virtual address MA01 is selected from the page table T101-1 selected in level 2. Notation "bits [A:B]" in a virtual address is supposed to denote a range of from the $A^{th}$ bit of the virtual address to the $B^{th}$ bit. Since bits [29:21] of the virtual address MA01 are all zeros, a table entry E101-1-0 is selected from the page table T101-1. A page table in level 3 referred to by the table entry E101-1-0 is T101-1-0.

From the page table T101-1-0 selected in level 3, a table entry indexed by bits [20:12] of the virtual address MA01 are selected. A table entry selected in level 3 is E101-1-0-0.

By the address translation as the above, an upper-level address of data B101-1-0-0 is finally determined.

(Virtualization of Page Table)

Virtualization of a page table will now be described in detail.

Firstly, a description will be given of a memory space and a page table size. The size of a page table that defines an entire virtual address space of 4 gigabytes is 8 megabytes or more. Therefore, in order to fixedly allocate page tables to a physical memory, a very large memory size is required. In view of this, the secure OS 56 and the secure VMM 68 virtualize page tables.

A page table virtualization is executed using valid/invalid bits in table entries. An example using the table entry E101-1 will be described. When a valid/invalid bit in table entry E101-1 designates an invalid state, the reference destination table T101-1 of the table entry E101-1 does not physically exist. Therefore, when access to this reference destination page is occurred, the MMU 46 generates a processor fault and executes processing of reading the reference destination page into a physical memory. Upon receipt of the fault, the secure OS 56 and the secure VMM 68 stores data corresponding to a reference destination table from the external device 43, such as a hard disk to a free page of the physical memory, thereby updating the valid/invalid bit in the table entry E101-1 to a valid state and resuming interrupted processing.

By executing the above control, the secure OS 56 and the secure VMM 68 can dynamically allocate a huge virtual address space to a physical memory, whereby a limited-capacity of a memory can be used effectively.

A structure and function of the secure page table tree 121 shown in FIG. 4 is applicable to various address translation mechanisms. As will be described later, in the present embodiment, a data structure necessary for memory integrity verification is used, and memory integrity verification mechanism transparent to guest OSs is realized.

(Several Times of Reference to Page Tables Due to Virtualization and Primary and Secondary Address Translation Caches 49 and 50)

A description will now be given of several times of reference to a page tables due to virtualization and primary and secondary address translation caches 49 and 50.

In many types of architecture, the above-described page-table reference processing is executed by hardware such as an MMU. In a case of two-stage virtualization, the above-described address translation is executed twice, and access to a page table of a guest OS also becomes a target of address translation. For instance, when two-stage address translation is performed, reference to 4×3 page tables is needed at worst.

Whenever access to data is performed, such page-table reference is executed, and the primary and secondary address translation caches 49 and 50 are used for cache a result of address translation in order to avoid an increase in overhead.

In the present embodiment, assume that a two-stage virtualization state by the primary and secondary address translation caches 49 and 50 is used.

When performing the two-stage address translation, the MMU 46 stores a guest-OS virtual address and a physical address, which is obtained after the virtual address is subjected twice to address translations, in the primary address translation caches 49 in association with each other. In this case, the virtual address is used as a tag. If at a time of subsequent data reference, a virtual address matches with the tag of the primary or secondary address translation cache 49 or 50, the MMU 46 can obtain a corresponding physical address (can realize address resolution) without performing address translation using the secure page table tree 121. When a plurality of secure page table trees 121 exist, the primary and secondary address translation caches 49 and 50 store identifiers for identifying the secure page table trees 121 in association with address translation information. For instance, as the identifiers, the highest-level addresses of the secure page table trees 121 may be used. As a result, even when a plurality of the same virtual addresses is occurred, a correct physical address can be obtained.

Since address translation is performed for each page, it is sufficient if the virtual and physical addresses have a bit which is upper than the page (12 bits).

Although the secondary address translation cache 50 has the same function as the primary address translation cache 49, it is larger and slower than the primary address translation cache 49.

(Concept of Hierarchization)

A description will be given of a concept of hierarchization.

For instance, to increase a speed of data reference, cache memories are hierarchized in two levels. Further, for instance, a page table tree for address translation is hierarchized in three levels. For instance, virtualization control use a hierarchy of two level, and address translations controlled by three-stage page tables are executed twice. Such cache memory levels, hierarchies of the page table trees, and times of address translation for virtualization (stage number) are orthogonal concepts. Logically, arbitrary combination of the concepts is possible. For instance, cache memories may be hierarchized in three levels, each page table tree for address translation may be hierarchized in three levels, and address translation for virtualization may be executed in two stages.

FIG. 6 is a block diagram showing an example of a concept of a data acquisition and address translation by the information processing device 65 according to the present embodiment.

The instruction execution unit 45 acquires data from the internal memory 8 when the data is not stored in primary cache memory 47a or 47b, or the secondary cache memory 48.

The instruction execution unit 45 transmits a virtual address to the MMU 46 when address translation is necessary.

Based on address translation information stored in the primary address translation cache 49 or the secondary address translation cache 50, the MMU 46 executes two-stage address translation based on the secure page table tree 121, when a virtual address cannot be translated to a physical address.

In the address translation, when a page fault is occurred in a page table or data, this page table or data is copied from the external memory 7 to the internal memory 8, based on paging.

(Initial State of Information Processing Device 65)

Assuming that the above-described address translation and virtualization mechanism are used, an initial state of the information processing device 65 according to the present embodiment will be described.

In the initial state, the secure VMM 68, and the secure OS 56 and the non-secure OS 57, managed by the secure VMM 68, are in a dormant state. Namely, the secure VMM 68, the secure OS 56 and the non-secure OS 57 are retreated in the nonvolatile external memory 7.

In the present embodiment, key data and MAC value as a root of trust associated with integrity and secrecy of the secure VMM 68 and the secure OS 56 are stored in the processor 66. More specifically, the processor 66 includes the key storage unit 67. The key storage unit 67 stores a secret key and root verification information 13. When the processor 66 has no rewritable memory area, it may use a nonvolatile memory in an external trusted platform module (TPM) based on a fixed key stored in the key storage unit 67. Information of the TPM can be reliably associated with a particular processor by performing authentication between the TPM and the processor 66 of a host.

(Memory Map and Entities)

A memory map and entities according to the present embodiment will be described.

Figure 7:
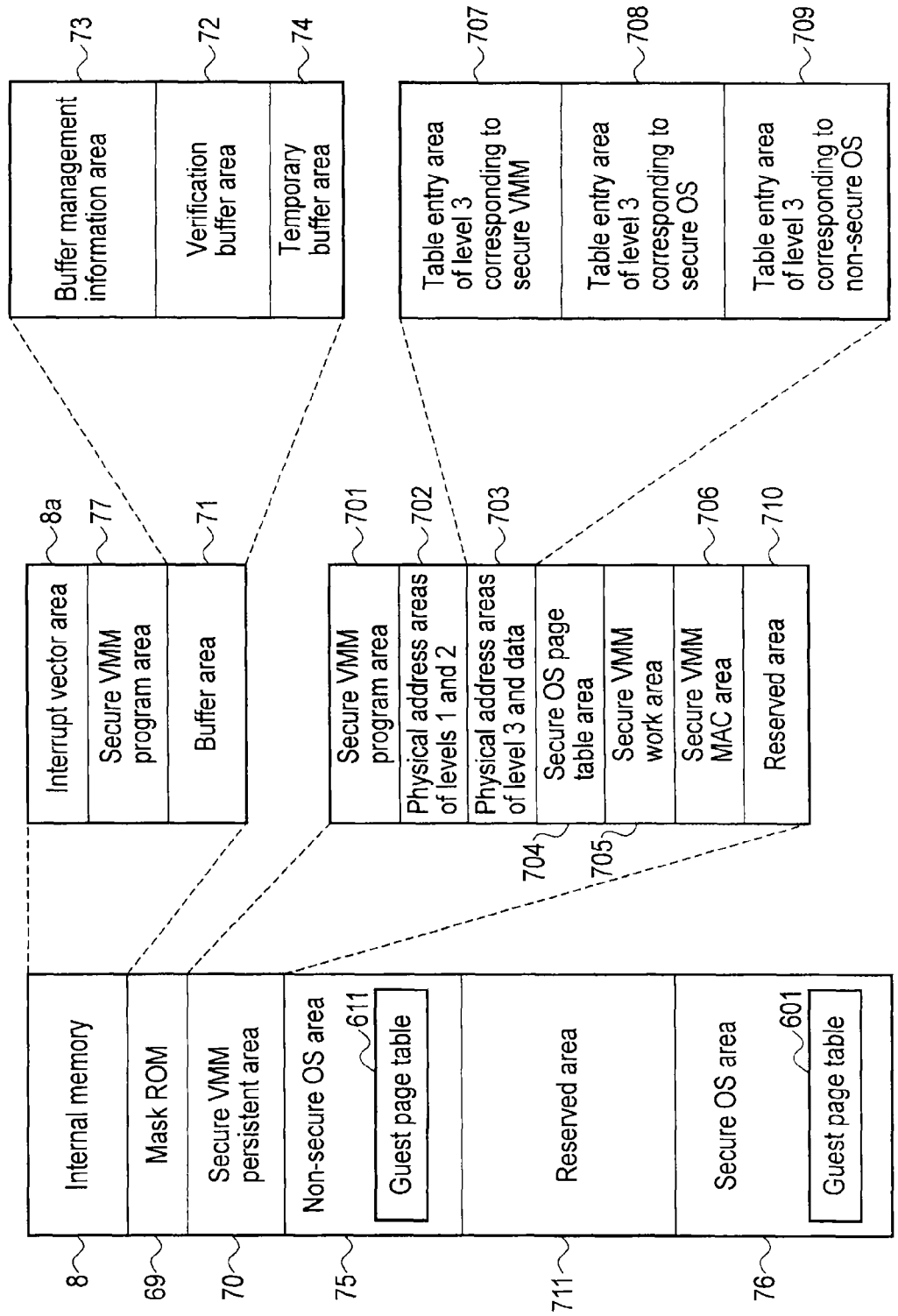
FIG. 7 is a view showing an example of a memory map according to the second embodiment.

FIG. 7 is a view showing an example of the memory map according to the present embodiment.

A memory of the information processing device 65 includes, for example, the internal memory 8, a mask read-only memory (ROM) 69, a secure persistent area 70, a non-secure OS area 75, a reserved area 711 and a secure OS area 76. The internal memory 8 includes an interrupt vector area 8a, a secure VMM program area 77, and a buffer area 71. The buffer area 71 includes a buffer management data area 73, a verification buffer area 72 and a temporary buffer area 74. The secure VMM persistent area 70, the non-secure OS area 75, the reserved area 711 and the secure OS area 76 are arranged in the external memory 7.

The secure VMM persistent area 70 includes physical address areas 702 and 703, a secure OS page table area 704, a secure VMM working area 705, a secure VMM MAC area 706, and a reserved area 710. The physical address area 702 stores page tables, counter values and MAC values in levels 1 and 2. The physical address area 703 stores page tables, counter values and MAC values of the page tables in level 3. Further, the physical address area 703 stores data, counter values and MAC values of the data in level 3. The physical address area 703 in level 3 includes a table entry area 707 in level 3 corresponding to the secure VMM 68 in level 3, a table entry area 708 in level 3 corresponding to the secure OS 56, and a table entry area 709 in level 3 corresponding to the non-secure OS 57.

The secure VMM 68 is booted securely. A kernel portion of the secure VMM 68 that executes verification is resident in a secure memory and protected from a falsification attack against the external memory 7. In the present embodiment, the internal memory 8 within the chip of the processor 66 is used as the secure memory. In the present embodiment, a memory verification function of the secure VMM 68 is realized by a memory verification program resident in the internal memory 8. A program, such as a program for realizing a device virtualization function, included in the secure VMM 68 and excluding the memory verification program, may be stored in the internal memory 8 in an on-demand manner by paging and verification described later, and executed.

The secure VMM 68 stored in the external memory 7 is verified at the time of, for example, activation, based on a program stored in the mask ROM 69, and is then stored in the program area 77 for the secure VMM 68 in the internal memory 8.

The verifier tree 10 is stored in the secure VMM persistent area 70 in the external memory 7. A portion of the verifier tree 10 verified by the secure VMM 68 is stored in the verification buffer area 72 in the buffer area 71 in the Internal memory 8.

The buffer area 71 is a data area used by the secure VMM 68. The buffer management information area 73 stores buffer management information, and a translation list used by the secure VMM 68. The verification buffer area 72 stores verification target data. An unused area in the verification buffer area 72 is called a verification buffer free area. The temporary buffer area 74 stores temporarily used data at the time of verification of the secure VMM 68. The buffer management information in the buffer area 71 designates a state of use of the buffer area 71. For example, the buffer management information includes the type, amount, frequency of use, etc., of data stored or not stored.

The memory map further includes the storage area 75 of the non-secure OS 57, and the storage area 76 of the secure OS 56.

(Verification Calculation Method)

A method for verification calculation according to the present embodiment will be described.

A description will hereinafter be described, assuming that a page size is 4096 bytes, an address size is 8 bytes (64 bits), and a counter size is 16 bytes (128 bits). However, each size is not limited to the above, and may be set to other values.

Parameters used for the verification calculation will be described below.

Addr is a leading address in a verification target page table.

D[Addr] is data corresponding to i pages beginning with Addr, i being an arbitrary natural number.

Ctr[Addr] is a counter value associated with a page beginning with Addr.

K is a secret value used in common in entire memory area, and is always stored within the processor 66.

Ek is a j-bit block ciphertext based on secret key K. In the present embodiment, it is assumed that encryption algorithm is AES128 where j=128. For instance, a block length is assumed to be 16 bytes (128 bits). However, encryption algorithm other than AES128 may be used.

"Padding" expresses padding.

For encryption calculation, a notation "Y=MAC[Ek](X)" is used. A MAC value of Y is calculated by applying fixed length CMAC algorithm of a common-key block base based on the secret key K to [X0, X1, . . . , Xn] obtained by dividing an input X into portions of a common-key block size. The data size of either of the MAC value Y and the secret key k is identical to the common-key block size. When the input X cannot be divided into portions of the common-key block size, Padding is used.

The MAC value Y of the data D[Addr] corresponding to i pages beginning with the address Addr is calculated by the following expression, based on [D0, D1, D2 . . . D255i] obtained by dividing D[Addr] into portions of the common-key block size, and counter value Ctr[Addr] associated with D, address Addr and Padding:

Y=MAC[Ek] ([D0, D1, . . . , D255i]||Ctr[Addr]||Addr-||Padding)

D[Addr], Ctr[Addr] and Addr may be input in an arbitrary order. Padding may not be used if the input to the MAC function can be divided into portions of the common-key block size. The size of the data D[Addr] beginning with the address Addr may differ even in the same verification tree, in accordance with a structure of a verifier tree.

Ctr[Addr] is used for version management of verification target data. Accordingly, when data is read, Ctr[Addr] is used directly. When the data is written, Ctr[Addr] is incremented and then used.

In the present embodiment, the address Addr will be described as an address for the external memory 7. However, the address Addr may be an intermediate physical address.

(Structure of Secure Verifier Tree 122)

A data structure of the secure verifier tree 122 will be described.

In the present embodiment, address resolution and data verification are simultaneously executed by matching a data structure of the secure page table tree 121 with a data structure of the secure verifier tree 122.

A tree structure (MAC tree structure) constituting page tables and MAC values will be described as a first data structure of the secure page table tree 121 and the secure verifier tree 122. A tree structure (MAC+counter structure) formed of page tables, MAC values and counter-values for managing versions will be described as a second data structure of the secure page table tree 121 and the secure verifier tree 122.

In the present embodiment, it is supposed that one page is of 4 kilobytes, a counter value is of 8 bytes, and a MAC value is of 8 bytes. Further, although in the present embodiment, each table block and a corresponding counter block are arranged in an continuous address space, each table block and a corresponding counter block may be arranged in separated address spaces.

(MAC Tree Structure)

FIG. 8 is a data structure diagram showing an example of a data structure of a MAC tree structure of the secure page table tree 121 and the secure verifier tree 122.

A MAC value of a respective data block is generated based on a content of the data block and its allocated address, and the generated MAC value is managed by a MAC block associated with (related to) a reference source block that refers to the data block. As described above, the MAC block corresponds to a verification block.

On the other hand, a MAC value used for verification of a respective table block is generated based on a content of the table block, a content of a MAC block associated with the table block, and an allocated address of the table block. The generated MAC value used for the verification of the table block is managed by a MAC block associated with a reference source block that refers to the table block, like the MAC value of the data block. By repeating this operation, a large-scale tree structure using one MAC block as a vertex is finally formed.

For instance, a MAC value M201-1-1-511 of a data block B201-1-0-511 is generated based on a data block B201-1-0-511 and its address addr(B201-1-0-511).

Further, a MAC value M201-1-0 used for verification of a table block T201-1-0 is generated based on a table block T201-1-0, a MAC block T202-1-0 associated with a table block T201-1-0, and an address addr(T201-1-0) of a table block T201-1-0. A MAC value M201-1-0-511 of a data block B201-1-0-511 is included in a MAC block T202-1-0 associated with a reference source block T202-1-0, and a MAC value M201-1-0 of a table block T201-1-0 is included in a MAC block T202-1 associated with a reference source block T202-1.

To guarantee legitimacy in the MAC tree structure, a table block and a MAC block associated with the table block are simultaneously read-in and verified. For instance, when a table block T201-1-0 is read-in, a MAC block T202-1-0 is read in simultaneously with the table block T201-1-0, and verification is executed using the table block T201-1-0 and the MAC block T202-1-0. In the MAC tree structure, the legitimacy of a lower-level block (child block) is guaranteed by a MAC block associated with an upper-level block (parent block). Accordingly, when a lower-level block is verified, it is necessary that a MAC block associated with a corresponding upper-level block is already verified.

(MAC+Counter Structure)

Figure 9:
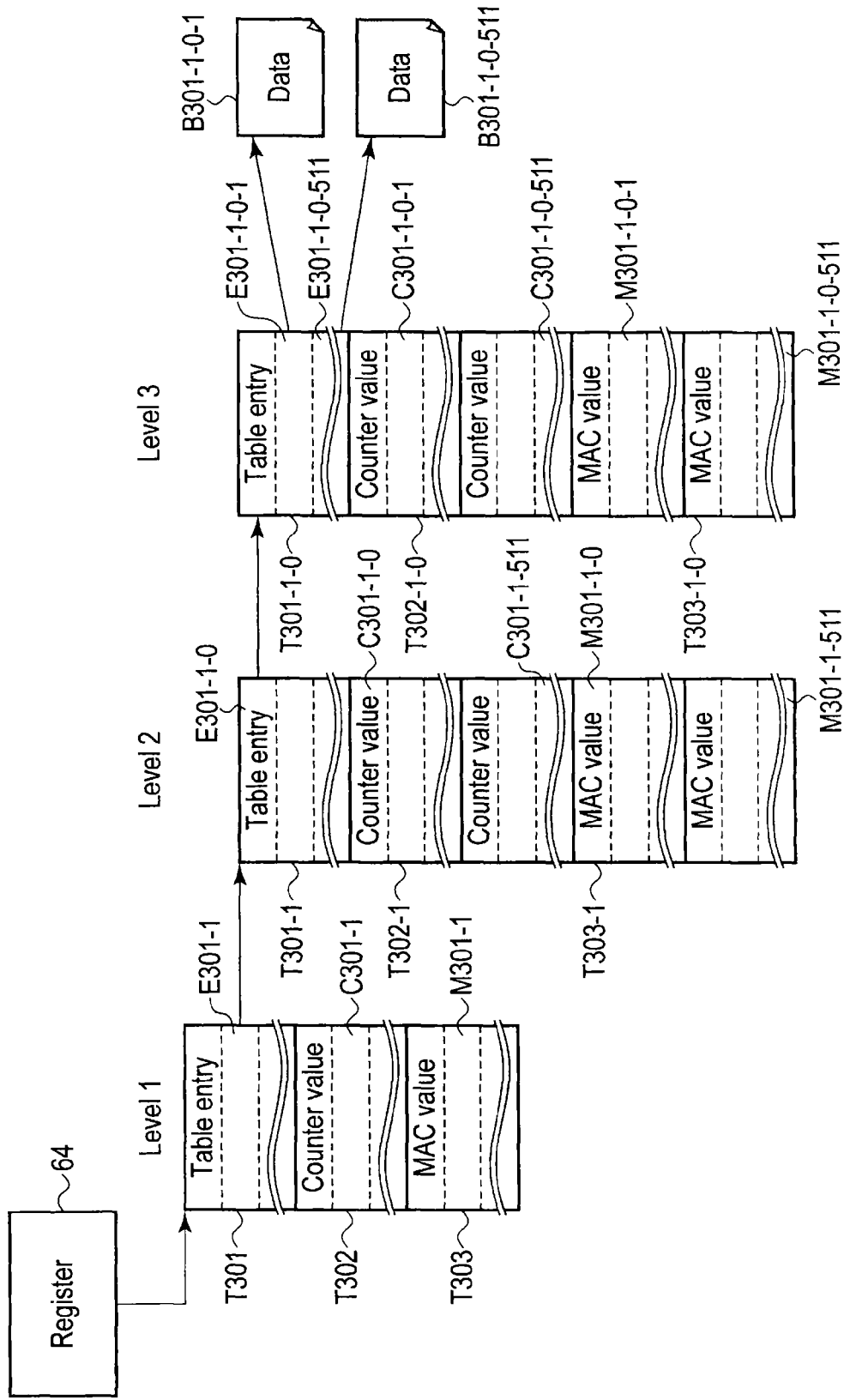
FIG. 9 is a data structure diagram showing an example of a MAC+counter structure of a secure page table tree and secure verifier tree according to the second embodiment.

FIG. 9 is a data structure diagram showing an example of a MAC+counter structure of the secure page table tree 121 and secure verifier tree 122 according to the present embodiment.

A counter value is set for each table entry, and is used for version management of a corresponding target block. It is sufficient if the counter value satisfies a condition that a duplication of values is avoided, and the counter value may be changed whenever data or a page table is updated. The counter value is not required to be counted up or down.

A MAC value of a respective data block is generated based on a content of a data block, and an allocated address and a counter value thereof. The used counter value and the generated MAC value of the data block are managed by a counter block and a MAC block associated with a corresponding reference source block. In contrast, a MAC value of a respective table block is generated based on the table block, a counter block associated with the table block, an allocated address of the table block, and a counter value of the table block. The used counter value and the generated MAC value of the table block are managed by a counter block and a MAC block associated with a corresponding reference source block. By repeating this operation, a small-scale tree data structure can be formed, in which version management is performed using a counter block included in a verification block associated with a one-level higher table block, and verification is executed using a MAC block.

For instance, A MAC value M301-1-0-511 of a data block B301-1-0-511 is generated based on a data block B301-1-0-511, an address addr(B301-1-0-511) and a counter value C301-1-0-511.

On the other hand, a MAC value M301-1-0 of a table block T301-1-0 is generated based on a table block T301-1-0, a counter block T302-1-0, an address addr(T301-1-0) and a counter value C301-1-0 of a table block T301-1-0.

A counter value C301-1-0-511 and MAC value M301-1-0-511 of a data block B301-1-0-511 are included in a counter block T302-1-0 and a MAC block T303-1-0 associated with a reference source block T301-1-0.

A counter value C301-1-0 and MAC value M301-1-0 of a table block T301-1-0 are included in a counter block T302-1 and MAC block T303-1 associated with a reference source block T301-1.

In the MAC+counter structure, when a table block is read-in, it is necessary to simultaneously read-in and verify the table block and a counter block associated with the table block. However, it is not necessary to simultaneously read-in or verify the table block and a MAC block associated with the table block. This is because to generate a correct MAC value for a certain page block, a counter value associated with the upper-level block of the page block is necessary, but a corresponding MAC block itself is irrelevant to a MAC value generation.

(Secure Page Table Tree 121 and Page Table Tree 9)

Figure 10:
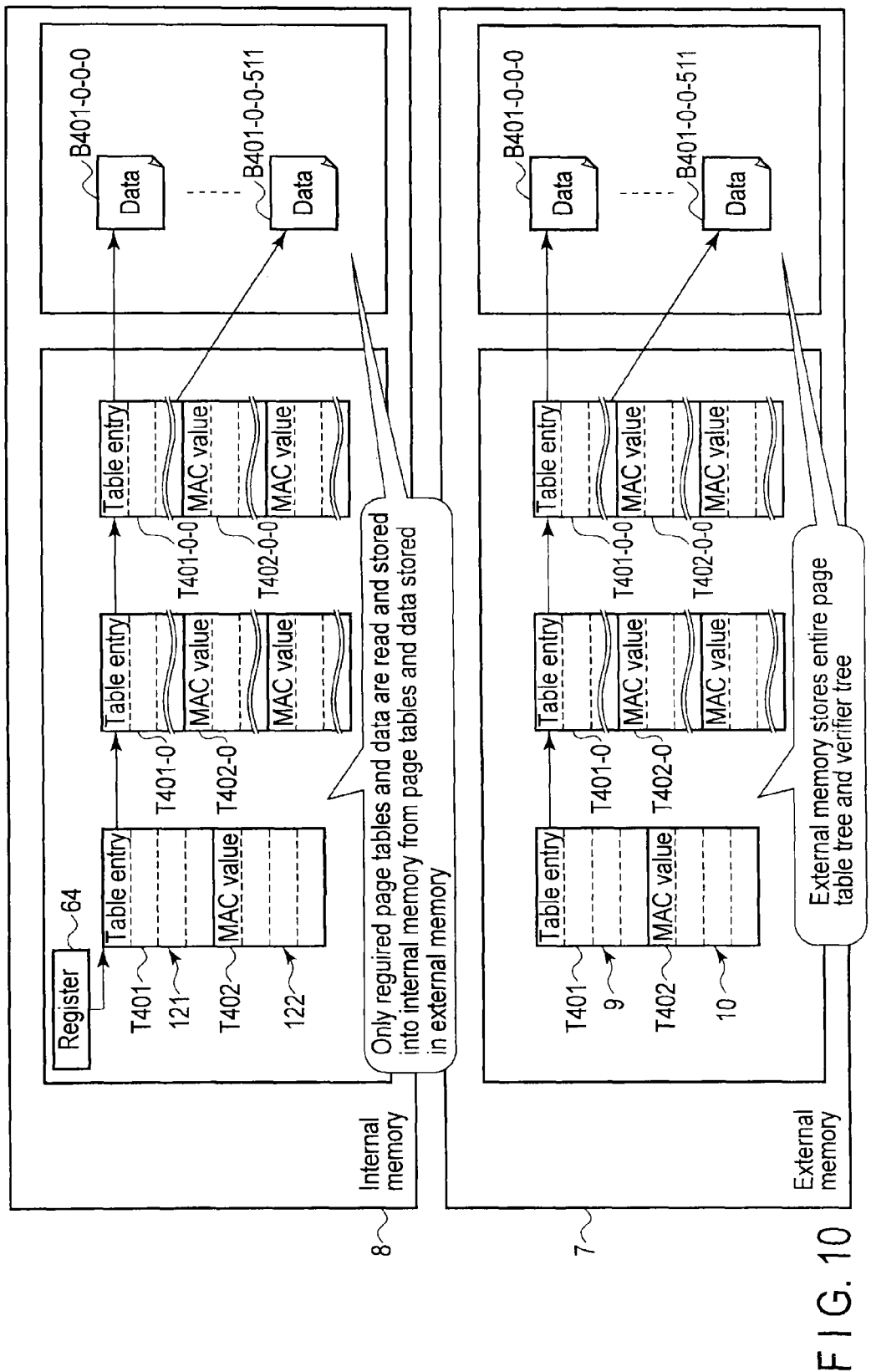
FIG. 10 is a data structure diagram showing an example of a relationship between a secure page table tree and page table tree according to the second embodiment.

FIG. 10 is a data structure diagram showing an example of a relationship between the secure page table tree 121 and page table tree 9.

The internal memory 8 stores the secure page table tree 121 used for address translation. The register 64 refers to a highest-level table T401 in the secure page table tree 121 in the internal memory 8. Based on a definition of the secure page table tree 121 to be referred to by the register 64, translation to a physical address is executed, and reference to a memory is executed by the instruction execution unit 45.

Entire page table tree 9 as source data for generating the secure page table tree 121 in the internal memory 8 is stored in the external memory 7. In the present embodiment, the page table tree 9 stored in the external memory 7 is not directly referred to as an address translation table. The page table tree 9 does not have a special function except for that it is source data of the secure page table tree 121. Since it is possible that the page table tree 9 in the external memory 7 will be falsified, direct use of the page table tree 9 for address translation without verification is avoided in the present embodiment. Instead, the secure page table tree 121 stored in the internal memory 8 is used for address translation. The secure page table tree 121 is a subset of the page table tree 9.

The information processing device 65 according to the present embodiment copies, to the internal memory 8, necessary portions of the page table tree 9 and data stored in the external memory 7, and executes, on them, verification based on the secure verifier tree 122, thereby adding the necessary portions to the secure page table tree 121 and the data already stored in the internal memory 8. If a page table or data that is not stored in the internal memory 8 is referred to, the information processing device 65 generates a page default to thereby cause the secure VMM 68 to verify the necessary portions of the page table tree 9 and data, and stores the necessary portions in the internal memory 8 if a verification result designates validity.

(Storage Destination and Address of Data Block, Structure of Page Table Tree 9 in External Memory 7)

The storage destination and address of a data block and the structure of the page table tree 9 in the external memory 7 will be described blow.

In the present embodiment, a page block stored in the external memory 7 is temporarily copied to the internal memory 8 protected from physical falsification, then processed and then returned to the external memory 7.

Because of this, the same page block may be stored in association with an address in the external memory 7 and with an address in the internal memory 8. For simplifying the description, an address of an area in the external memory 7 that stores a data block B401-0-0-511 is set to Eaddr (B401-0-0-511). An address of an area in the internal memory 8 that stores a data block B401-0-0-511 is set to Iaddr(B401-0-0-511). In a strict sense, an address in the internal memory 8 is dynamically secured in the verification buffer area 72. Accordingly, a value of Iaddr(B401-0-0-511) even for the same data block B401-0-0-511 varies whenever this block is read-in. However, in the following description given of a series of read-in and write-out operations, this change does not have to be considered, and then the address of the data block B401-0-0-511 in the internal memory 8 is simply expressed to as Iaddr(B401-0-0-511).

Each entry in a page table stored in the external memory 7 holds an address of a target block, such as Eaddr(B401-0-0-511), in the external memory 7. However, a page table entity recognized by the MMU 46 is not a page table stored in the external memory 7 but a page table stored in the internal memory 8 and already verified. The MMU 46 refers to a page table stored in the internal memory 8 and already verified. For instance, in FIG. 10, an address of an entity referred to by the register 64 is Iaddr(T401). An address Eaddr(T401-0-0) in the external memory 7 to a page table T401-0-0 is set at the time of a page table construction, and address resolution can be executed by performing verification read-in in an order beginning with a highest-level page table T401. In contrast, an address Iaddr(T401-0-0) in the internal memory 8 to the page table T401-0-0 is determined if a memory is secured in the temporary buffer area 74 in the internal memory 8.

(Outline of Hierarchical Verification Processing)

An outline of a hierarchical verification processing will be described below.

A series of operations performed from the time when a data reference request is issued, to the time when data is acquired can be divided into data reference processing, address resolution processing, verification processing, replacement processing and flush processing. The processing has an inset relationship, and each processing except for data reference processing does not occur unless it is necessary.

In the present embodiment, when address resolution is performed, resolved data is verified. Accordingly, the verification processing is performed hierarchically. For instance, when a data reference request for certain data is issued, the address resolution processing based on a page walk will occur. If an upper-level table block (parent table block) needed for the address resolution is not verified, the verification processing is firstly performed on the upper-level table block. After the verified table block is read into the secure internal memory 8, a lower-level table block (child table block) is verified. Thus, blocks from a highest level to a lowest level (data block) are sequentially subjected to verification.

(Flow Until Occurrence of Verification Processing)

A description will be given of a flow until occurrence of verification processing.

FIG. 11 is a flowchart showing an example of data reference processing according to the present embodiment. Assume that address translation described below is processing using a page table of stage 2, and address translation by a guest OS using a page table of stage 1 is already finished.

The instruction execution unit 45 issues a data reference request to the MMU 46 in step S001.

In step S002, the MMU 46 confirms whether the primary address translation cache 49 or the secondary address translation cache 50 caches address translation information associated with a virtual address and a physical address.

If the primary address translation cache 49 or the secondary address translation cache 50 caches the address translation information (TLB hit), the processing moves to step S005.

If the primary address translation cache 49 or the secondary address translation cache 50 caches no address translation information (TLB miss), the MMU 46 performs address resolution processing in step S003, and caches, in step S004, address translation information associated with the resolved virtual address and physical address in the primary address translation cache 49 or the secondary address translation cache 50.

In step S005, the MMU 46 reads data, to be referred to, from the solved physical address.

Figure 12:
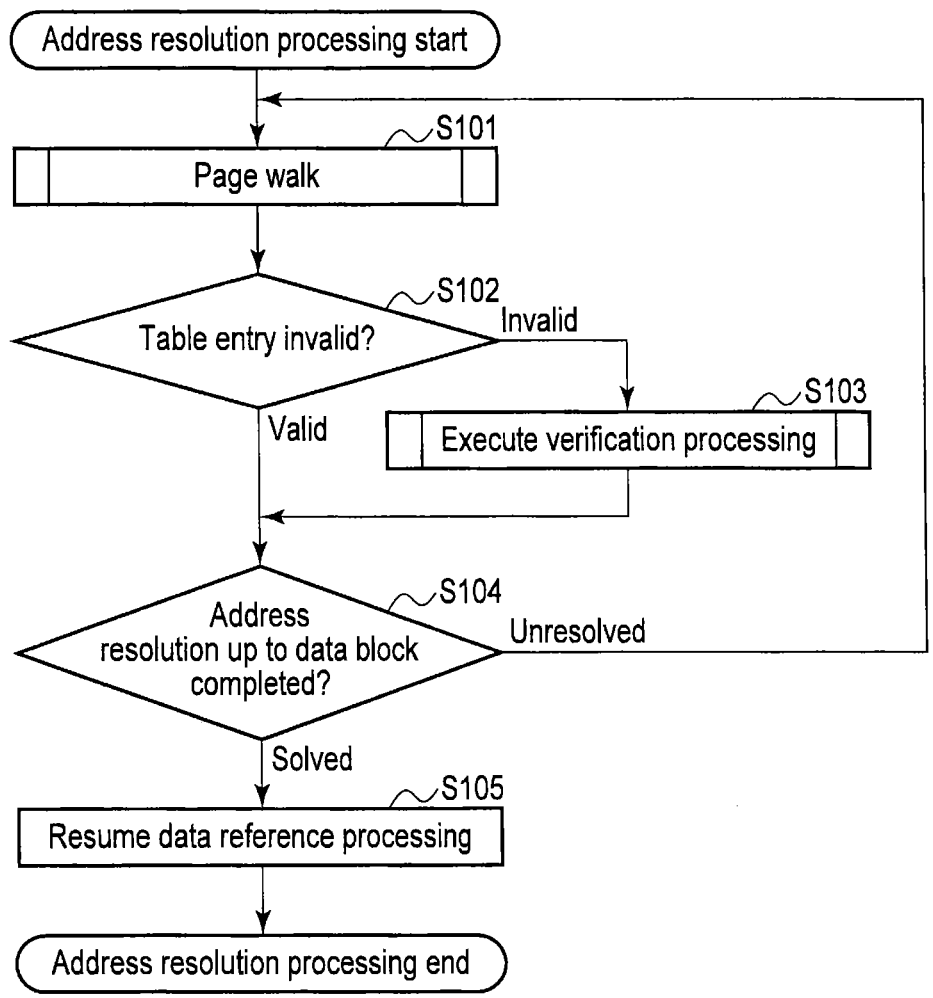
FIG. 12 is a flowchart showing an example of address resolution processing according to the second embodiment.

FIG. 12 is a flowchart showing an example of the address resolution processing according to the present embodiment.

The address resolution processing shown in FIG. 12 is executed in the data reference processing.

In step S101, when the address resolution processing is started, the MMU 46 executes address resolution using a page walk.

In step S102, the MMU 46 checks, during the page walk, whether a table entry designates a valid state.

If the table entry exhibits the valid state, a process proceeds to steps S104.

In contrast, if the table entry is invalid, control is transferred from the MMU 46 to the secure VMM 68, and the secure VMM 68 executes, in step S103, verification processing of a page block referred to by the invalid table entry. After finishing the verification processing, the invalid table entry is validated by the secure VMM 68, and control is transferred from the secure VMM 68 to the MMU 46. In step S104, the MMU 46 checks whether the address resolution up to a data block is completed.

If the address resolution is not yet completed, the address resolution processing returns to step S101. As a result, a page walk is repeated until the address resolution processing is completed.

If the address resolution is completed, the MMU 46 resumes the data reference processing in step S105, thereby finishing the address resolution processing.

As described above, the verification processing is sequentially executed by the secure VMM 68 during the address resolution processing based on a page fault of the page table tree in stage 2. In the page walk, paging of a table block and a data block may be performed simultaneously. In this case, the number of times of control transfer between the secure VMM 68 and the MMU 46 can be reduced.

(Occurrence of Verification Processing and Details of Verification Processing)

Occurrence of verification processing and details of the verification processing will be described below.

Specifically, a description will be given of an operation example when a data reference request associated with a data block B301-1-0-511 is occurred, using the verifier tree of the MAC+counter structure shown in FIG. 9.

Firstly, an assumption for simplifying the description will be described.

Assume here that table blocks and counter blocks up to level 2, which are included in a verifier tree, are always cached in the internal memory 8. For instance, when a memory size of the protected external memory 7 is 4 gigabytes, a data size cached in the internal memory 8 is 52 kilobytes, and a memory size of the internal memory 8 is 1 megabyte, the internal memory 8 has a capacity enough to cache the table blocks and counter blocks up to level 2 included in the verifier tree.

In replacement processing, the same type of data as a replacement source is selected as a replacement target, using replacement algorithm. Namely, at a time of table block replacement, a table block is selected. At a time of data block replacement, a data block is selected. As the replacement algorithm, Least Recently Used (LRU) is used. However, a replacement target may be selected using another replacement algorithm.

In the present embodiment, It is assumed that a translation list for the addresses of the external memory 7 and those of the internal memory 8 is stored in the buffer management data area 73 in the internal memory 8. Namely, the secure VMM 68 recognizes a correspondence relationship between the address Iaddr(B301-1-0-511) in the internal memory 8 and the address Eaddr(B301-1-0-511) in the external memory 7, which are associated with a data block B301-1-

0-511. For translation between an address Iaddr in the internal memory 8 and an address Eaddr in the external memory 7, a reverse page walk, for example, may be used instead of the translation list.

Although MAC-value calculation is executed by, for example, the secure DMA controller 52, it may be executed by software.

For table blocks of level 3 or less, a paging is executed in the internal memory 8. Thus, a description will be given of a case where all table blocks necessary for address resolution of data block B301-1-0-511 exist in the internal memory 8, and a case where all table blocks do not exist in the internal memory 8. Since a data block differs from a table block in data structures and verification processing, the data block and the table block will be described respectively.

(Verification Processing of Data Block)

Firstly, a description will be given of a case where all page tables necessary for address resolution of the data block B301-1-0-511 are stored in the internal memory 8, namely, where verification of only data block B301-1-0-511 is occurred. Assume that the table blocks T301, T301-1 and T301-1-0, and the counter blocks T302, T302-1 and T302-1-0 associated with the table blocks are stored in the verification buffer area 72 in the internal memory 8.

<Details of Address Resolution Processing for Data Block>

Referring to FIGS. 11 and 12, data reference processing and address resolution processing that occurs in the data reference processing will now be described.

The MMU 46 starts address resolution processing of the data block B301-1-0-511. In step S101, the MMU 46 executes address resolution by a page walk.

In step S102, the MMU 46 checks the table entry E301-1 of the table block T301, thereby detecting valid, and hence referring to the table entry E301-1.

In step S104, the MMU 46 checks whether the address resolution of the data block B301-1-0-511 is completed. Since in this case, the address resolution is not completed, the page walk is repeated in step S101.

When the MMU 46 is detected in step S102 that the table entry E301-1-0-511 in the table block T301-1-0 is invalid, control is transferred from the MMU 46 to the secure VMM 68. In step S103, the secure VMM 68 executes verification processing of the data block B301-1-0-511 referred to by the table entry E301-1-0-511. After the verification processing is terminated, the table entry E301-1-0-511 invalid so far becomes valid, and hence control is returned from the secure VMM 68 to the MMU 46. In step S104, the MMU 46 checks whether the address resolution is completed up to the data block B301-1-0-511. Since in this case, the address resolution is completed, the MMU 46 resumes the data reference processing in step S105, thereby finishing the address resolution processing.

<Structure of Information Processing Device 65>

Figure 13:
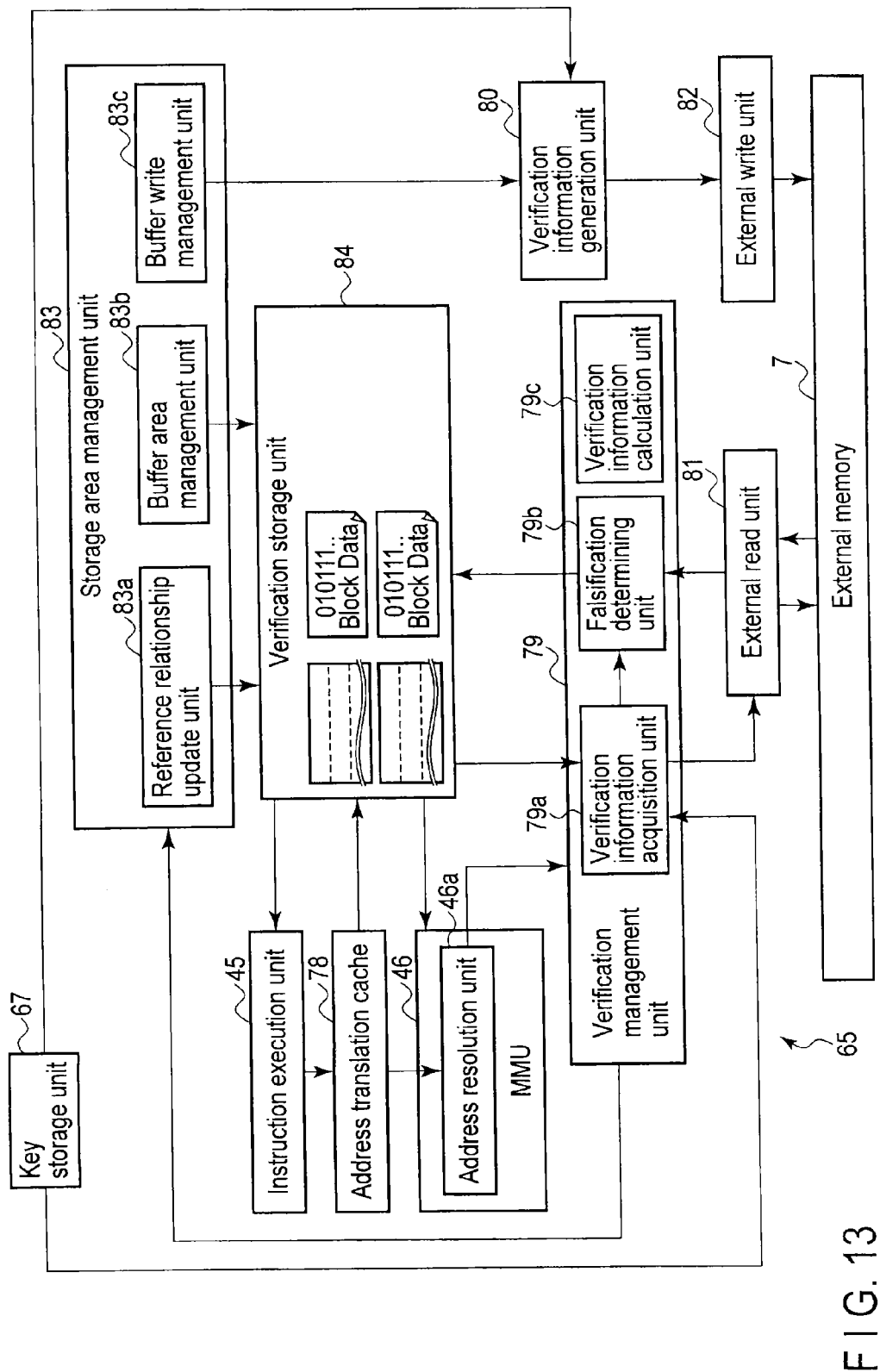
FIG. 13 is a block diagram showing an example of a structure of the information processing device according to the second embodiment.

FIG. 13 is a block diagram showing an example of a structure of the information processing device 65 according to the present embodiment.

The information processing device 65 includes the instruction execution unit 45, an address translation cache 78, the MMU 46, a verification management unit 79, a verification information generation unit 80, an external read unit 81, an external write unit 82, a storage area management unit 83, a verification storage unit 84, the key storage unit 67 and the external memory 7.

The MMU 46 includes the address resolution unit 46*a*.

The verification management unit 79 includes verification information acquisition unit 79*a*, falsification determining unit 79*b* and verification information calculation unit 79*c*.

The storage area management unit 83 includes a reference relationship update unit (page-table reference relationship update unit) 83*a*, buffer area management unit 83*b*, and buffer write management unit (verification buffer write management unit) 83*c*.

The address translation cache 78 and the MMU 46 correspond to the address translation unit 3. The address translation cache 78 corresponds to the primary and secondary address translation caches 49 and 50.

The external read unit 81 and the external write unit 82 correspond to the external input/output unit 2.

The verification information calculation unit 79*c* and the verification information generation unit 80 correspond to the verification calculation unit 4.

The verification information acquisition unit 79*a* corresponds to the verification unit 5.

The reference relationship update unit 83*a* corresponds to the update unit 6 shown in FIG. 1.

The buffer area management unit 83*b* and buffer write management unit (verification buffer write management unit) 83*c* correspond to the replacement management unit 20 shown in FIG. 1.

The verification storage unit 84 corresponds to the internal memory 8.

<Relationship Between Data Reference Processing and Structure of Information Processing Device 65>

A relationship between each structural element of FIG. 13 and the above-described flowcharts of FIGS. 11 and 12 will be described.

The instruction execution unit 45 issues a data reference request in step S001, and inquires of the address translation cache 78 in step S002 whether a physical address corresponding to a virtual address of a guest OS is cached.

When the address translation cache 78 does not cache the physical address corresponding to the virtual address required to be refer to, the address resolution unit 46*a* of the MMU 46 executes address resolution processing in step S003.

In the address resolution processing, the MMU 46 executes a page walk in step S101, and checks, in step S102, the table entry E301-1 in table block T301 stored in the verification storage unit 84.

When the table entry designates a valid state, the processing proceeds to step S104.

In contrast, when the table entry designates an invalid state, this result is notified to the verification management unit 79. The verification management unit 79 receiving the result executes, in step S103, verification processing of a page block referred to by the table entry. After finishing the verification processing, the verification management unit 79 informs the reference relationship update unit 83*a* of the end of the verification processing, and the reference relationship update unit 83*a* changes a invalid state of the table entry to a valid state. Thereafter, control is transferred from the verification management unit 79 to the MMU 46 since read-in is completed.

In step S104, the MMU 46 checks whether address resolution is completed up to a data block. When the address resolution is not completed, the processing returns to the page walk of step S101.

When the address resolution is completed, the MMU 46 resumes the data reference processing in step S105, thereby finishing the address resolution processing.

When the address resolution is completed, the verification management unit 79 and the storage area management unit 83 store page tables, needed for the address resolution and already verified, in the buffer area 71 dynamically secured in the verification storage unit 84.

In step S004, the MMU 46 caches, in the address translation cache 78, address translation information designating a result of the address resolution.

When the address translation cache 78 caches a physical address corresponding to a virtual address requested to be referred to, or When address resolution is completed, the MMU 46 reads in data in step S005, using the corresponding physical address.

When address translation information is stored in the address translation cache, and data reference is already completed, verified data is stored in the verification storage unit 84. The address translation cache 78 stores an address for a buffer of the verification storage unit 84. A verified physical address is sent from the address translation cache 78 to the verification storage unit 84, and data in the verification storage unit 84 corresponding to the verified physical address is returned to the instruction execution unit 45 in step S005.

<Details of Verification Processing for Data Block>

Figure 14:
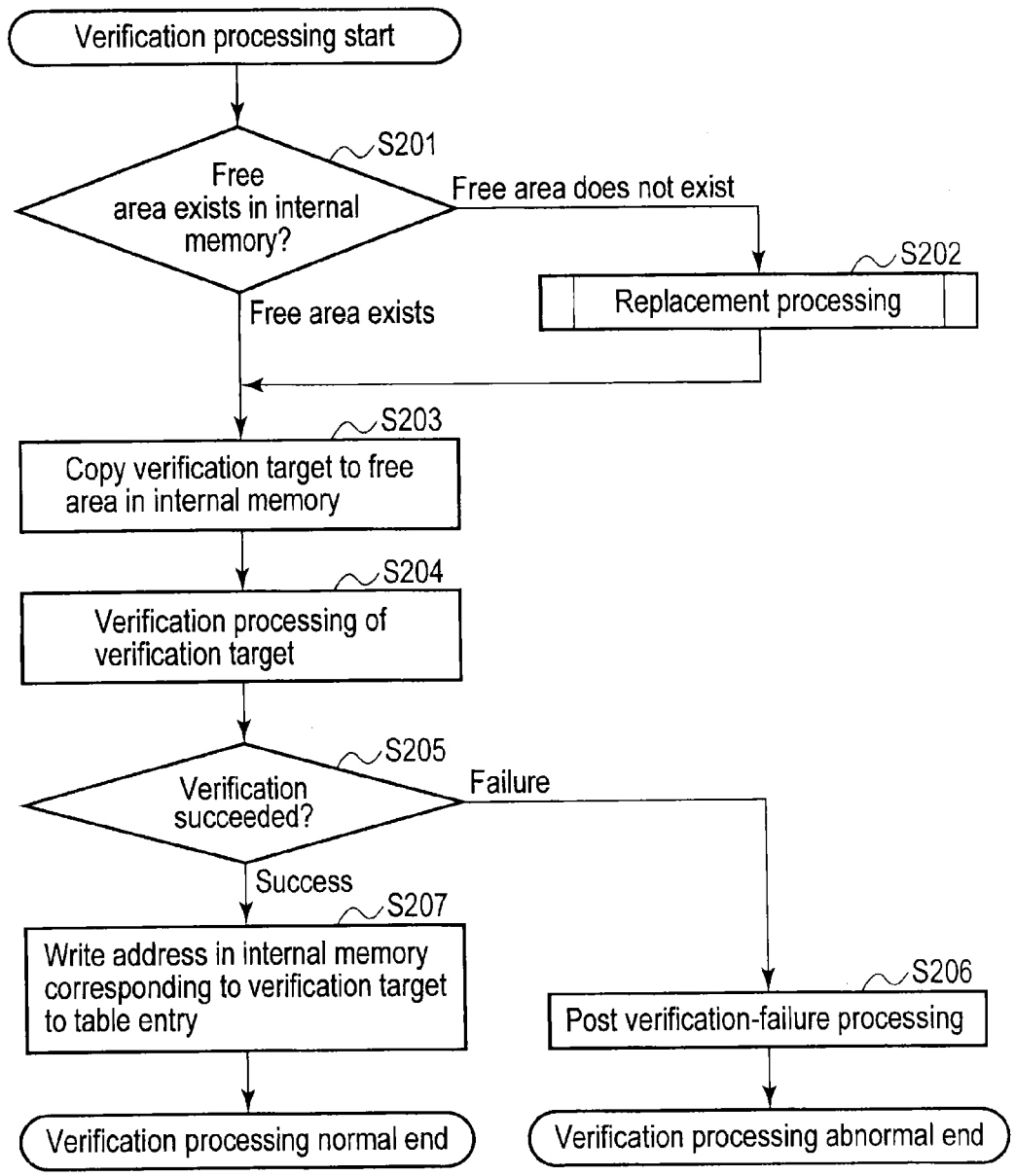
FIG. 14 is a flowchart showing an example of verification processing according to the second embodiment.

FIG. 14 is a flowchart showing an example of verification processing according to the present embodiment. The verification processing shown in FIG. 14 occurs in the address resolution processing shown in FIG. 12. A description will be given of the verification processing of the data block B301-1-0-511 in FIG. 9.

The secure VMM 68 starts the verification processing of the data block B301-1-0-511, and checks in step S201 whether the verification buffer area 72 of the internal memory 8 has a free area. When the verification buffer area 72 has no free area, the secure VMM 68 releases an area by replacement processing in step S202.

Subsequently, in step S203, the secure VMM 68 copies to-be-verified data block B301-1-0-511 from the address Eaddr(B301-1-0-511) in the external memory 7 to the free area in the verification buffer area 72 in the internal memory 8. At this time, the secure DMA controller 52 generates a MAC value, based on the data block B301-1-0-511, address Eaddr(B301-1-0-511) of the data block B301-1-0-511 in the external memory 8, and counter value C301-1-0-511 of the counter block T302-1-0 as an upper-level verification block existing in the internal memory 8.

In step S204, the secure VMM 68 executes falsification verification of the verification target data block B301-1-0-511, based on the generated MAC value. When in the falsification verification, it is necessary to read in a MAC value from the external memory 7, the secure VMM 68 reads, from the external memory 7, the MAC value M301-1-0-511 corresponding to the verification target data block B301-1-0-511, and stores the read MAC value M301-1-0-511 in the temporary buffer area 74 in the internal memory 8. When the MAC value M301-1-0-511 in the internal memory 8 is used, the secure VMM 68 reads, from the internal memory 8, the MAC value M301-1-0-511 corresponding to the verification target data block B301-1-0-511, and stores the read MAC value M301-1-0-511 in the temporary buffer area 74. Then, the secure VMM 68 compares the MAC value M301-1-0-511 stored in the temporary buffer area 74 with the MAC value generated by the secure DMA controller 52.

If in step S205, the MAC values do not match each other, the secure VMM 68 determines that the verification is failed, and transfers control to post-verification-failure processing in step S206. In step S206, the secure VMM 68 performs, for example, error processing in the post-verification-failure processing, and thereafter leads the verification processing to termination.

If in step S205, the MAC values match each other, the secure VMM 68 determines that the verification is succeeded. In this case, in step S207, the secure VMM 68 changes a reference destination address in the table entry E301-1-0-511 set as invalid, the address Iaddr(B301-1-0-511) in the internal memory 8 corresponding to the verification target data block B301-1-0-511. At this time, the address Eaddr(B301-1-0-511) in the external memory 7 corresponding to the verification target data block B301-1-0-511 is stored in the buffer management data area 73 in the unit of buffer block. Thereafter, the secure VMM 68 finishes the verification processing.

The verification processing shown in FIG. 14 and the structure of the information processing device 65 shown in FIG. 3 will be described in association with each other.

In step S201, the verification management unit 79 refers to the buffer area management unit 83*b* in the storage area management unit 83 so as to detect whether the verification storage unit 84 has a free area. When there is no free area in the verification storage unit 84, the verification management unit 79 requests, in step S202, the storage area management unit 83 to release an already-read buffer area and acquire a free-area address.

In step S203, the verification information acquisition unit 79*a* of the verification management unit 79 acquires the MAC value M303-1-0-511 from the MAC block T303-1-0 as an upper-level verification block existing in the verification storage unit 84, and acquires the counter value C301-1-0-511 from the counter block T302-1-0 as the upper-level verification block in the verification storage unit 84. Further, the verification information acquisition unit 79*a* acquires, from the external memory 7 via the external read unit 81, the verification target data block B301-1-0-511 and the MAC value M301-1-0-511 corresponding to the verification target data block B301-1-0-511, then stores the acquired verification target data block B301-1-0-511 and MAC value M301-1-0-511 in a free area of the verification storage unit 84.

In step S204, the verification information calculation unit 79*c* calculates a MAC value, based on the verification target data block B301-1-0-511, the counter value C301-1-0-511 and a secret key. The falsification determining unit 79*b* compares the calculated MAC value with the already acquired MAC value M301-1-0-511.

When the MAC values do not match each other and verification is failed, in step S206, the verification management unit 79 notifies the instruction execution unit 45 of the verification failure, thereby stopping subsequent processing.

When the MAC values match each other and the verification is succeeded, in step S207, the verification management unit 79 notifies the reference relationship update unit 83*a* of a read-in success. The reference relationship update unit 83*a* stores, as the reference destination address in table entry E301-1-0-511 determined as invalid, the address Iaddr(B301-1-0-511) in the internal memory 8 corresponding to the verification target data block B301-1-0-511. Further, the reference relationship update unit 83*a* stores the address Eaddr(B301-1-0-511) in the external memory 7 corresponding to the verification target data block B301-1-0-511, to the buffer management data area 73 in a unit of buffer block, thereby finishing the verification processing.

<Details of Replacement Processing for Data Block>

FIG. 15 is a flowchart showing an example of replacement processing according to the present embodiment. The replacement processing shown in FIG. 15 occurs in the verification processing of FIG. 14. A description will be given, assuming that data block B301-1-0-511 is a data block for which the replacement processing is performed, and data block B301-1-0-1 is a least used data block.

The secure VMM 68 starts the replacement processing, and selects a replacement target from the internal memory 8 in step S301. Specifically, the secure VMM 68 selects the data block B301-1-0-1 as a replacement target to be replaced with the data block B301-1-0-511, based on replacement algorithm, such as LRU.

In step S302, the secure VMM 68 selects the data block B301-1-0-1 as a flush target to be flushed from the internal memory 8.

In step S303, the secure VMM 68 executes flush processing.

After finishing the flush processing, the secure VMM 68 checks, in step S304, whether replacement target data block B301-1-0-1 exists in the internal memory 8. Since in this case, replacement target data block B301-1-0-1 does not exist in the internal memory 8, replacement processing is finished. The reason why it is checked whether a replacement target exists in the internal memory 8 lies in that if the replacement target is a table block as described later, a target block must be flushed depending upon a policy of buffer management, and such flush may be required several times. In the above example, flush processing is completed only by one flush.

After finishing the above-described replacement processing, a free area is secured in the verification buffer area 72 of the internal memory 8.

The replacement processing shown in FIG. 15 and the information processing device 65 shown in FIG. 13 will be described in association with each other.

In step S301, upon receipt of a request from the verification management unit 79, buffer area management unit 83b selects, as a replacement target, data block B301-1-0-1 least used.

Buffer area management unit 83b selects replacement target data block B301-1-0-1 as a flush target in step S302, and executes flush processing in step S303.

After finishing the flush processing, the secure VMM 68 checks in step S304 whether another replacement target exists in the verification storage unit 84.

If another replacement target exists in the verification storage unit 84, processing in step S302 et seq. is repeated. This processing is repeated until the verification storage unit 84 no more contains a replacement target. When the verification storage unit 84 no more contains a replacement target, the secure VMM 68 finishes the replacement processing.

<Details of Flush Processing for Data Block>

Figure 16:
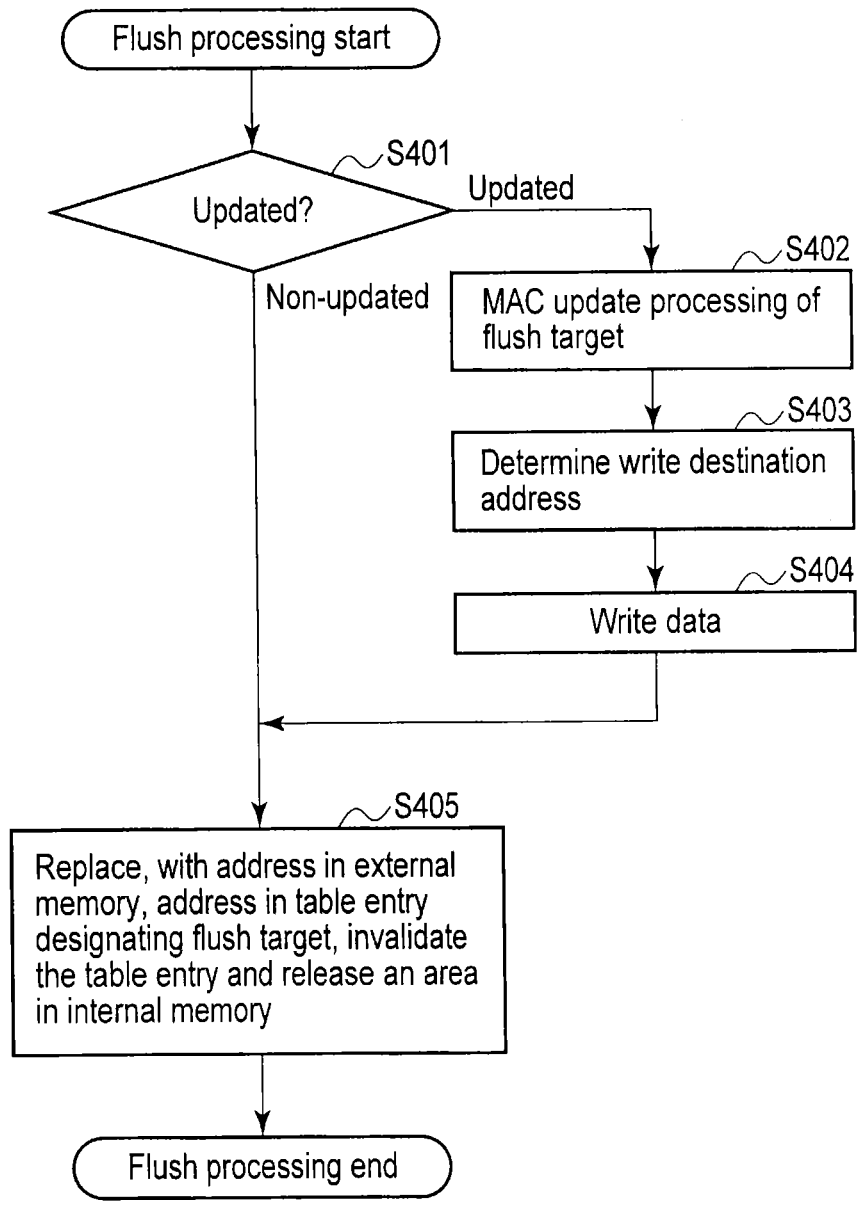
FIG. 16 is a flowchart showing an example of flush processing according to the second embodiment.

FIG. 16 is a flowchart showing an example of flush processing according to the present embodiment. The flush processing shown in FIG. 16 occurs in the replacement processing of FIG. 15. A description will be given, using data block B301-1-0-1 as a flush target. Counter value C301-1-0-1 of data block B301-1-0-1 is stored in the internal memory 8. MAC value M301-1-0-1 of data block B301-1-0-1 is stored in the external memory 7. MAC value M301-1-0-1 of the external memory 7 is the MAC value of data block B301-1-0-1 stored in the external memory 7. Accordingly, when data block B301-1-0-1 updated in the internal memory 8 is returned (copied) to the external memory 7, MAC value M301-1-0-1 must be updated. In contrast, when data block B301-1-0-1 is not updated in the internal memory 8, MAC value M301-1-0-1 does not have to be updated, since a content of data block B301-1-0-1 is identical between the external memory 7 and the internal memory 8.

The secure VMM 68 starts flush processing of data block B301-1-0-1, and confirms in step S401 whether the content of data block B301-1-0-1 as a flush target is updated. If it is not updated, the processing proceeds to step S405.

If it has been updated, the secure VMM 68 executes MAC update processing of flush target data block B301-1-0-1 in step S402. Specifically, the secure VMM 68 increments counter value C301-1-0-1 included in counter block T302-1-0 of the upper-level verification block of flush target data block B301-1-0-1. The secure DMA controller 52 generates new MAC value M301-1-0-1 for flush target data block B301-1-0-1, based on flush target data block B301-1-0-1, address Eaddr(B301-1-0-1) of the external memory 7 translated using a translation list, and incremented counter value C301-1-0-1.

After that, in step S403, the secure VMM 68 determines, using the translation list of the internal memory 8, address Eaddr(B301-1-0-1) of the external memory 7 as a destination to which data block B301-1-0-1 is to be written.

In step S404, the secure DMA controller 52 writes flush target data block B301-1-0-1 to a position (to which address Eaddr(B301-1-0-1) is allocated) of the external memory 7, and writes generated MAC value M301-1-0-1 to a predetermined position in MAC block T303-1-0 of the external memory 7.

If flush target data block B301-1-0-1 is not updated in the internal memory 8, or if MAC update and writing (roll out) of the flush target have been executed, the secure VMM 68 replaces, in step S405, the reference destination address of table entry E301-1-0-1, which designates flush target data block B301-1-0-1, with address Eaddr(B301-1-0-1) of the external memory 7, thereby invalidating flush target table entry E301-1-0-1. Subsequently, the secure VMM 68 deletes control data associated with flush target data block B301-1-0-1 from the buffer management data area 73 of the internal memory 8, thereby releasing an area of the verification buffer area 72 in which data block B301-1-0-1 was stored. By this processing, a free area of the data block size is secured in the verification buffer area 72. This is the termination of the flush processing by the secure VMM 68.

The flush processing shown in FIG. 16 and the structure of the information processing device 65 shown in FIG. 13 will be described in association with each other.

The buffer write management unit 83c starts flush processing of flush target data block B301-1-0-1. In step S401, the buffer write management unit 83c confirms whether the content of data block B301-1-0-1 as the flush target is updated.

If it is not updated, the buffer write management unit 83c discards the data to release a corresponding portion of the buffer area of the internal memory 8, and the reference relationship update unit 83a performs table entry rewriting processing (step S405).

In contrast, if it is updated, the buffer write management unit 83c requests, in step S402, the verification information generation unit 80 to execute MAC update processing of flush target data block B301-1-0-1. The verification information generation unit 80 increments counter value C301-1-0-1 included in counter block T302-1-0 of the upper-level verification block of flush target data block B301-1-0-1, and generates new MAC value M201-1-0-1 for flush target data block B301-1-0-1, based on flush target data block B301-

1-0-1, address Eaddr(B301-1-0-1) of the external memory 7 translated using a translation list, and incremented counter value C301-1-0-1.

After that, in step S403, the buffer write management unit 83c determines, using the translation list of the internal memory 8, address Eaddr(B301-1-0-1) of the external memory 7 as a destination to which data block B301-1-0-1 is to be written. In step S404, the buffer write management unit 83c requests the external write unit 82 to write flush target data block B301-1-0-1 to an area of the external memory 7 to which address Eaddr(B301-1-0-1) is allocated, and to write generated MAC value M301-1-0-1 to an area of MAC block T303-1-0 of the external memory 7 to which a predetermined address is allocated.

When MAC update and data writing is executed, the reference relationship update unit 83a replaces, in step S405, a reference destination address of the table entry E301-1-0-001 designating the flush target data block B301-1-0-1 with the address Eaddr(B301-1-0-1) of the external memory 7, thereby invalidating the entry. Further, the buffer area management unit 83b deletes control information stored in the buffer management data area 73 of the internal memory 8 and corresponding to the flush target data block B301-1-0-1, and releases an area of the verification buffer area 72 storing the flush target data block B301-1-0-1 so far. By this processing, a free area of a data block size is secured in the verification buffer area 72. Then, the buffer write management unit 83c terminates the flush processing.

The above-described processing is processing for a data block when all upper-level table blocks of the data block, needed for the address resolution processing, verification processing, replacement processing and flush processing, are already stored in the internal memory 8.

(Verification Processing of Table Block)

A description will now be given of a case where a part of the table blocks needed for address resolution of data block B301-1-0-511 do not exist in the internal memory 8, in other words, where table blocks are verified.

Assume here that table blocks T301 and T301-1, and counter blocks T302 and T302-1 associated with the table blocks are stored in the verification buffer area 72 in the internal memory 8. The verification buffer area 72 is included in the verification storage unit 84. Assume that table block T301-1-0 and counter block T302-1-0 attached thereto are not stored in the internal memory 8.

<Address Resolution Processing for Table Block>

Referring again to the flowchart of FIG. 12, address resolution processing for a table block will be described.

The MMU 46 starts address resolution processing of data block B301-1-0-511, and executes address resolution using a page walk in step S101.

In step S102, the MMU 46 checks the table entry E301-1 in the table block T301.

When the table entry E301-1 is valid, the MMU 46 refers to the table entry E301-1.

In step S104, the MMU 46 checks whether the address resolution processing of the data block B301-1-0-511 is completed. When the address resolution is not completed, the MMU 46 repeats the page walk in step S101.

In contrast, if table entry E301-1 of table block T301-1 is invalid, control is transferred from the MMU 46 to the secure VMM 68, and the secure VMM 68 executes, in step S103, verification processing of table block T301-1-0 referred to by table entry E301-1-0. After finishing the verification processing, table entry E301-1-0 that is currently invalid is validated, and control is returned from the secure VMM 68 to the MMU 46.

In step S104, the MMU 46 checks whether address resolution processing has been completed up to data block B301-1-0-511. If the address resolution processing is not yet completed, the MMU 46 again executes the page walk of step S101, thereby repeating the above processing.

In contrast, if address resolution processing has been completed up to data block B301-1-0-511, the MMU 46 resumes data reference processing in step S105, thereby finishing the address resolution processing.

The above address resolution processing of a page table will be described in association with the structure of the information processing device 65 shown in FIG. 13.

The instruction execution unit 45 issues a data reference request to the MMU 46. The MMU 46 determines a cache miss in the address translation cache 78, since table block T301-1-0 is not read in. At this time, the address resolution unit 46a of the MMU 46 executes address resolution. In step S101, an address resolution unit 46a of the MMU 46 executes a page walk.

In step S102, the MMU 46 checks table entry E301-1 of table block T301 stored in the verification storage unit 84, and refers to table entry E301-1 since table entry E301-1 is valid.

In step S104, the MMU 46 checks whether address resolution processing of data block B301-1-0-511 has been completed. Since in this case, the address resolution processing is not yet completed, the page walk of step S101 is repeated.

If in step S102, the MMU 46 detects that table entry E301-1-0 of table block T301-1 is invalid, it informs the verification management unit 79 of this.

In step S103, the verification management unit 79 executes verification processing of data block B301-1-0-511 referred to by table entry E301-1-0-511. After finishing the verification processing, the verification management unit 79 informs reference relationship update unit 83a of this, and reference relationship update unit 83a validates currently invalid table entry E301-1-0. The verification management unit 79 informs the MMU 46 of the completion of read-in.

In step S104, the MMU 46 checks whether the address resolution processing has been completed up to data block B301-1-0-511. If the address resolution processing is not yet completed, the page walk of step S101 is executed again to repeat the above processing.

After completing the above address resolution processing, the MMU 46 resumes data reference processing in step S105, thereby finishing the address resolution processing.

When address resolution processing is completed, the page tables needed for address resolution are verified by the verification management unit 79, and are stored in a verified state by the storage area management unit 83 in a buffer dynamically secured in the verification storage unit 84. The MMU 46 caches the result of the address resolution processing in the address translation cache 78.

<Details of Verification Processing for Table Block>

Referring again to the verification processing shown in FIG. 14, verification processing for a page table will be described. More specifically, verification processing of table block T301-1-0 will be described.

The secure VMM 68 starts verification processing of table block T301-1-0, and checks in step S201 whether the verification buffer area 72 in the internal memory 8 has a free area.

If the verification buffer area 72 has no free area, the secure VMM 68 releases an area by replacement processing in step S202.

Subsequently, in step S203, the secure VMM 68 copies to-be-used table block T301-1-0 for verification from address Eaddr(T301-1-0) of the external memory 7 to the free area of the verification buffer area 72 of the internal memory 8. At this time, the secure DMA controller 52 generates a MAC value for read-in data, based on a MAC generation method defined by the MAC tree structure or the MAC+counter structure.

In step S204, the secure VMM 68 executes falsification verification of verification target table block T301-1-0, based on the generated MAC value. The secure VMM 68 reads, from the external memory 7, MAC value M301-1-0 corresponding to verification target table block T301-1-0, and stores read MAC value M301-1-0 in the temporary buffer area 74 of the internal memory 8. After that, the secure VMM 68 compares MAC value M301-1-0 stored in the temporary buffer area 74 with the MAC value generated by the secure DMA controller 52. MAC value M301-1-0 is included in MAC block T303-1 of the external memory 7. A MAC value corresponding to a correct upper-level counter value cannot be calculated without a secret key. The upper-level counter value is already verified along with the upper-level table. Accordingly, read MAC M301-1-0 does not have to be verified.

If in step S205, the MAC values do not match each other, the secure VMM 68 determines that the verification is failed, and transfers control to post-verification-failure processing in step S206. In step S206, the secure VMM 68 performs, for example, error processing in the post-verification-failure processing, and thereafter leads the verification processing to abnormal termination.

If in step S205, the MAC values match each other, the secure VMM 68 determines that the verification has succeeded. In step S207, the secure VMM 68 writes, as a reference destination address in the table entry E201-1-0 determined as invalid, the address Iaddr(T301-1-0) in the internal memory 8 corresponding to the verification target table block T301-1-0. At this time, the address Eaddr(T301-1-0) in the external memory 7 corresponding to the verification target table block T301-1-0 is stored in the buffer management data area 73 in a unit of buffer block. Thereafter, the secure VMM 68 finishes the verification processing.

The above table-block verification processing will be described in association with the flowchart of FIG. 12 for the address resolution processing and the structure of the information processing device 65 of FIG. 13.

Address resolution unit 46a of the MMU 46 starts address resolution processing of data block B301-1-0-511, and executes address resolution using a page walk in step S101.

In step S102, address resolution unit 46a refers to the verification storage unit 84 to check table entry E301-1 of table block T301. Since table entry E301-1 is valid, it is referred to.

In step S104, the MMU 46 checks whether address resolution processing of data block B301-1-0-511 has been completed up to a data block. Since the address resolution processing is not yet completed, the page walk of step S101 is repeated.

If the MMU 46 detects in step S102 that table entry E301-1-0 of table block T301-1 is invalid, it informs the verification management unit 79 of this.

The verification management unit 79 requests the storage area management unit 83 to secure a free area. Buffer area management unit 83b of the storage area management unit 83 determines in step S201 whether the verification storage unit 84 has a free area, and executes replacement processing of step S202 if there is no free area.

Verification information acquisition unit 79a acquires, in step S203, counter value C301-1-0 from counter block T302-1 as an upper-level verification block existing in the verification storage unit 84. Verification information acquisition unit 79a transfers verification target page block T301-1-0 and MAC value M301-1-0 corresponding thereto from the external memory 7 to the free area of the verification storage unit 84 via the external read unit 81.

In step S204, verification information calculation unit 79c calculates a MAC value based on verification target page block T301-1-0, counter value C301-1-0 and a secret key.

In step S205, falsification determining unit 79b compares the calculated MAC value with already acquired MAC value M301-1-0.

If the MAC values do not match each other (verification has failed), the verification management unit 79 informs the instruction execution unit 45 of verification failure, thereby stopping subsequent processing (step S206).

In contrast, if the MAC values match each other (verification has succeeded), the verification management unit 79 informs reference relationship update unit 83a of read-in success in step S207. Reference relationship update unit 83a writes, as the reference destination address in table entry E301-1-0 regarded as invalid, address Iaddr(T301-1-0) of the verification storage unit 84 corresponding to verification target page block T301-1-0. Further, reference relationship update unit 83a stores address Eaddr(T301-1-0) of the external memory 7 corresponding to verification target page block T301-1-0 in buffer area management unit 83b in a buffer block unit, thereby finishing the verification processing.

<Details of Replacement Processing for Table Block>

Referring again to the replacement processing flowchart of FIG. 15, replacement processing for a table block will be described. In this description, table block T301-1-0 is assumed to be a data block for which replacement processing is performed, and table block T301-1-511 is assumed to be a least used one. When a table block is replaced, blocks associated with the table block are also flushed from the internal memory 8 to the external memory 7. Specifically, when table block T301-1-511 is a replacement target, data blocks B301-1-511-0 to B301-1-511-511 that can be referred to from table block T301-1-511 and existing in the internal memory 8 are also selected as replacement targets, along with table block T301-1-511. In this case, the secure VMM 68 invalidates table entry E301-1-511 included in upper-level table block T301-1 of table block T301-1-511. However, in the present embodiment, it is not always necessary to set all associated blocks as replacement targets. For instance, when appropriate buffer management has been executed, data blocks B301-1-511-0 to B301-1-511-511 may exist in the internal memory 8 even after table block T301-1-511 is flushed. As a data management method in which some of associated blocks are cached, a method for use in a directory cache in a file system can be used.

The secure VMM 68 starts replacement processing, and selects a replacement target table block in the internal memory 8 in step S301. Based on replacement algorithm, the secure VMM 68 selects table block T301-1-511 as the replacement target of table block T301-1-0.

In step S302, the secure VMM 68 selects, as flush targets to be flushed from the internal memory 8, data blocks that exist in the internal memory 8 and are included in replacement target table block T301-1-511 and associated data blocks B301-1-511-0 to B301-1-511-511, and executes flush processing in step S303. Thus, when a table block is selected as a replacement target, the replacement target table block and blocks (lower-level blocks) associated therewith are selected as replacement targets.

After finishing the flush processing, the secure VMM 68 checks in step S304 whether another replacement target exists in the internal memory 8. The processing of step S302, et seq. is repeated until no more replacement target is detected in the internal memory 8. When no more replacement target is detected in the internal memory 8, the secure VMM 68 finishes the replacement processing.

After finishing the above-described replacement processing, a free area that corresponds to table block T301-1-511, a corresponding counter block, and associated blocks existing in the internal memory 8 is secured in the verification buffer area 72 of the internal memory 8.

The above replacement processing for a table block will be described in association with the information processing device 65 of FIG. 13.

Upon receipt of a request from the verification management unit 79, in step S301, buffer area management unit 83b selects, as replacement targets, least-used table block T301-1-511 and associated blocks arranged under table block T301-1-511.

In step S302, buffer area management unit 83b selects, as a flush target, one of table block T301-1-511 and the associated blocks. In step S303, buffer area management unit 83b executes flush processing of the flush target.

In step S304, buffer area management unit 83b repeats the flush processing until all replacement targets are flushed from the internal memory 8.

<Details of Flush Processing for Table Block>

Referring again to the flowchart of FIG. 16, flush processing for a table block will be described. Assume, for example, that the flush target is table block T301-1-511. Counter value C301-1-511 of table block T301-1-511 is stored in the internal memory 8. MAC value M301-1-511 of table block T301-1-511 is stored in the external memory 7. MAC value M301-1-511 of the external memory 7 is the MAC value of table block T301-1-511 stored in the external memory 7. Accordingly, when table block T301-1-511 updated in the internal memory 8 is copied to the external memory 7, update processing of MAC value M301-1-511 is needed. In contrast, when table block T301-1-511 in the internal memory 8 is not updated, MAC value M301-1-511 does not have to be updated, because there is no difference in the content of table block T301-1-511 between the external memory 7 and the internal memory 8.

The secure VMM 68 starts flush processing of table block T301-1-511, and confirms in step S401 whether the content of table block T301-1-511 as the flush target is updated.

If the content is not updated, the secure VMM 68 proceeds to processing of step S405 for releasing an area in the internal memory 8.

If the content is updated, the secure VMM 68 executes, in step S402, MAC update processing of table block T301-1-511. More specifically, the secure VMM 68 increments counter value C301-1-511 in counter block T302-1 of the upper-level verification block of table block T301-1-511. The secure DMA controller 52 generates new MAC value M301-1-511 for table block T301-1-511, based on table block T301-1-511, address Eaddr(T301-1-511) of the external memory 7 translated using a translation list, and incremented counter value C301-1-511.

Thereafter, in step S403, the secure VMM 68 determines address Eaddr(T301-1-511) of the external memory 7 to be the write destination of table block T301-1-511, using the translation list of the internal memory 8.

In step S404, the secure DMA controller 52 writes table block T301-1-511 to an area of the external memory 7 to which address Eaddr(T301-1-511) is allocated, and writes generated MAC value M301-1-511 to a predetermined area in MAC block T303-1-511 of the external memory 7.

If table block T301-1-511 is not updated, or if MAC update and write of data have been executed, the secure VMM 68 replaces, in step S405, the reference destination address of table entry E301-1-511, which designates table block T301-1-511, with address Eaddr(T301-1-511) of the external memory 7, thereby invalidating table entry E301-1-511. Subsequently, the secure VMM 68 deletes control data associated with table block T301-1-511 from the buffer management data area 73, thereby releasing an area of the verification buffer area 72 in which table block T301-1-511 was stored.

By this processing, a free area of the table block size and counter block size is left in the verification buffer area 72. This is the termination of the flush processing by the secure VMM 68.

The above flush processing for a table block will be described in association with the structure of the information processing device 65 of FIG. 13.

Buffer area management unit 83b starts flush processing of table block T301-1-511, and determines in step S401 whether the content of table block T301-1-511 as a flush target is updated. If the content is not updated, the processing proceeds to step S405 where an area in the verification storage unit 84 is released.

If the content has been updated, the verification information generation unit 80 executes MAC update processing of table block T301-1-511 in step S402. The secure VMM 68 increments counter value C301-1-511 included in counter block T302-1 of the upper-level verification block of table block T301-1-511. The verification information generation unit 80 generates new MAC value M201-1-511 for table block T301-1-511, based on table block T301-1-511 itself, address Eaddr(T301-1-511) of the external memory 7 translated using a translation list, and incremented counter value C301-1-511.

After that, in step S403, reference relationship update unit 83a determines, using the translation list of the verification storage unit 84, address Eaddr(T301-1-511) of the external memory 7 as a destination to which table block T301-1-511 is to be written. In step S404, the external write unit 82 writes table block T301-1-511 to an area of the external memory 7 to which address Eaddr(T301-1-511) is allocated, and writes generated MAC value M301-1-511 to a predetermined area in MAC block T303-1 of the external memory 7.

If table block T301-1-511 is not updated, or if MAC update and write data have been completed, reference relationship update unit 83a replaces, in step S405, the reference destination address of table entry E301-1-511, which designates table block T301-1-511, with address Eaddr(T301-1-511) of the external memory 7, thereby invalidating table entry E301-1-511. Subsequently, buffer area management unit 83b deletes control data associated with table block T301-1-511 from the buffer management data area 73, thereby releasing an area of the verification buffer area 72 in which table block T301-1-511 is stored. By this processing, a free area of the table block size is left in the verification buffer area 72. This is the termination of the flush processing by buffer area management unit 83b.

The above-described various types of processing for a table block are executed when a table block necessary for address resolution, verification, replacement and flush of a data block is not stored in the internal memory 8.

A description will be given of a case where the information processing device 65 according to the present embodiment has a particular architecture.

Assume that notation "X[A:B]" denotes a range of from the $A^{th}$ bit of value X to the $B^{th}$ bit of the same. For instance, X[63:6] denotes a range of from $63^{rd}$ to $6^{th}$ bit.

Figure 17:
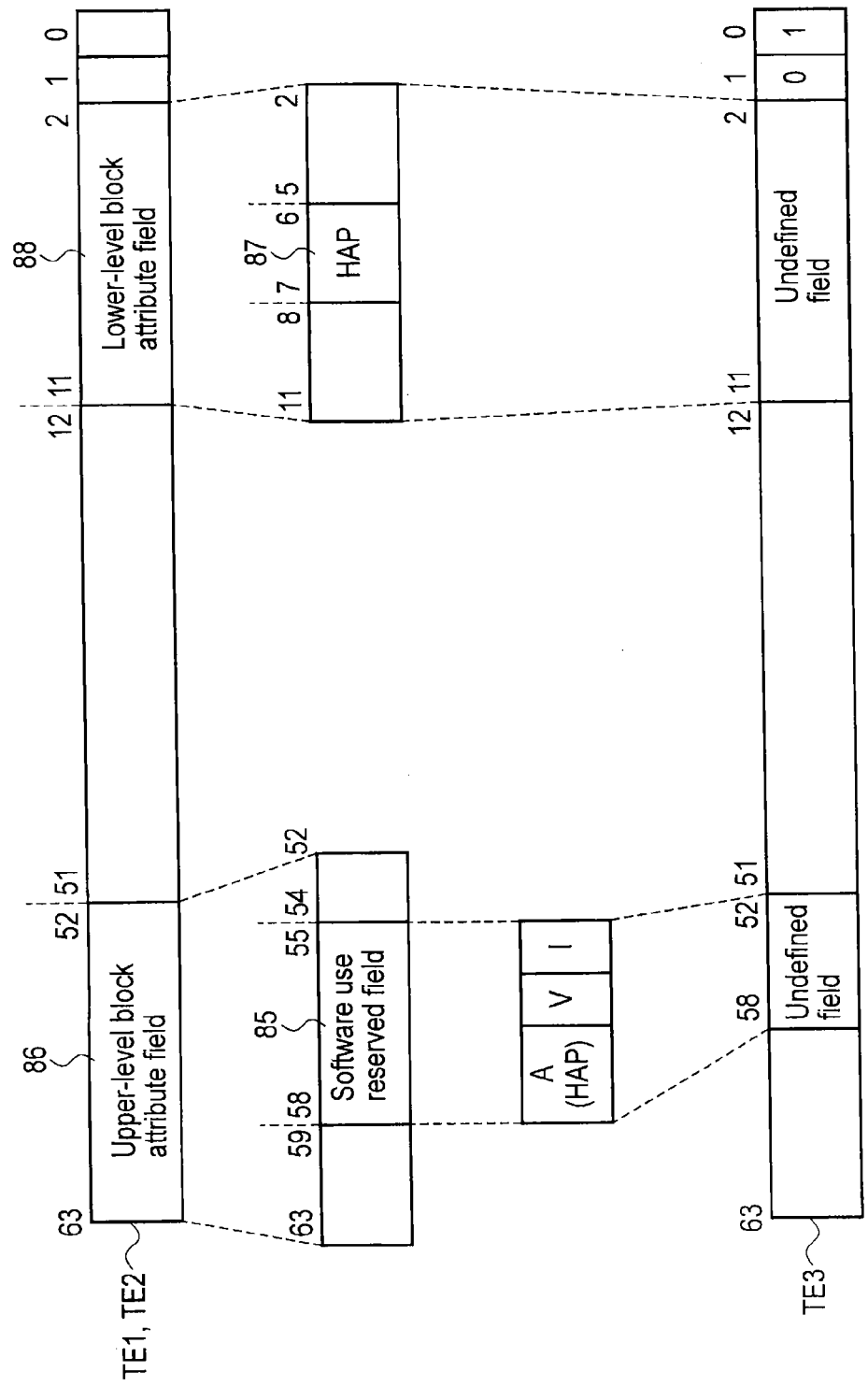
FIG. 17 is a data structure diagram showing an example of a table entry structure of a specific architecture.

FIG. 17 shows is a data structure diagram showing an example of a table entry structure of a specific architecture.

Table entry TE1 is supposed to be a table entry of level 3 that refers to a data block.

Table entry TE2 is supposed to be a table entry of level 1 or 2 that refers to a data block.

Table entry TE3 is supposed to be a table entry that refers to a table block.

A software use reserved field 85 is set to TE1[58:54] or TE2[58:55]. The software use reserved field 85 is secured in an upper-level block attribute field 86 of table entry TE1 or TE2. The software use reserved field 85 is a data field in which a particular purpose of use is not defined. The software use reserved field 85 is supposed not to be defined with respect to hardware.

A HAP field 87 is set to TE1[7:6] or TE2[7:6]. The HAP field 87 is secured in a lower-level block attribute field 88 of table entry TE1 or TE2. The HAP field 87 stores data for access control.

FIG. 18 is a view showing an example of a specification of a HAP field 87.

When HAP[1:0] is 00, access right is set to "NoAccess" that designates invalid.

When HAP[1:0] is 01, access right is set to "Read-only" that designates reading.

When HAP[1:0] is 10, access right is set to "Write-only" that designates writing.

When HAP[1:0] is 11, access right is set to "Read/Write" that designates reading and writing.

Table entries TE1 and TE2 define the software use reserved field 85 of the upper-level block attribute field 86, and the lower-level block attribute field 88. Further, table entry TE3 defines a data field different from those defined by table entries TE1 and TE2. However, TE3[58:52] and TE3[11:2] define no fields. The undefined fields of table entry TE2 can be used if they are defined by the same definitions as those of data fields of table entries TE1 and TE2. In the description below, data fields of TE1[58:55], TE2[58:55] and TE3[58:55] will be represented by Entry[58:55]. Similarly, data fields of TE1[7:6], TE2[7:6] and TE3[7:6] will be represented by Entry[7:6].

If HAP[1:0]=No Access is detected during address translation of stage 2, the MMU 46 generates a fault to set a secure VMM mode. In the present embodiment, verification is performed utilizing a mechanism in which the MMU 46 generates a fault, based on HAP.

Entry[58:55] of the software use reserved field 85 is of four bits. More specifically, Entry[58:55] of the software use reserved field 85 includes 2-bit flag A, 1-bit flag V and 1-bit flag I.

Flag A is used for storing original HAP data.

Flag V is used for designating whether verification has been executed.

For flag I, no definition is made.

Entry[7:6] storing HAP manages whether verification has been executed. In a table entry designating invalid (namely, in a table entry designating a non-validated block), HAP is set to No Access. Original HAP is stored in flag A. In a table entry designating valid, a value other than No Access is set in HAP.

In a particular architecture, when address resolution is performed, HAP is utilized to cause the MMU 46 to intentionally generate a fault. As a result, control can be transferred to the secure VMM 68, thereby executing verification processing. After verification processing, original HAP data stored in flag A is written to the HAP field 87.

Figure 19:
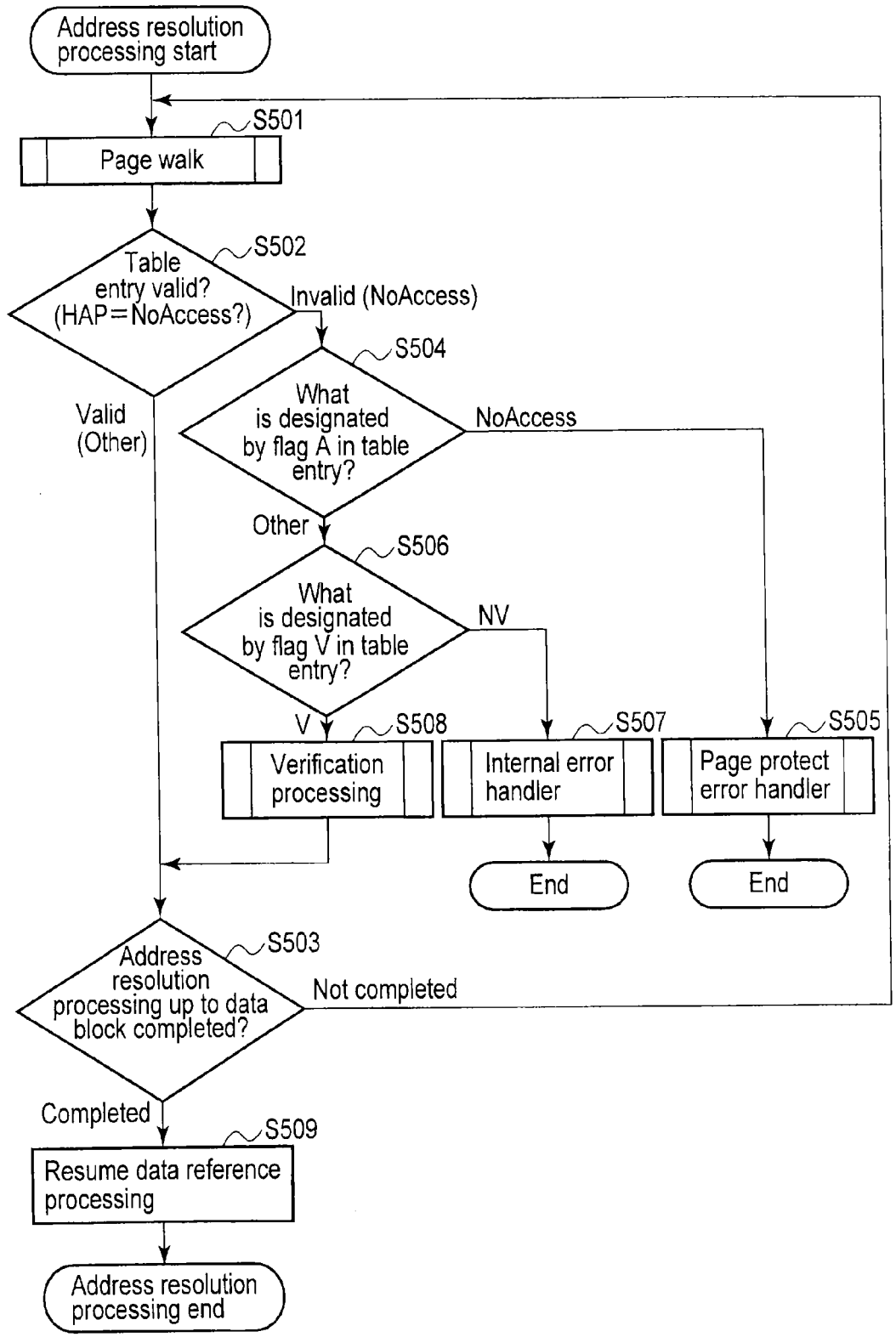
FIG. 19 is a flowchart showing an example of address resolution processing when a data reference request is issued in a particular architecture.

FIG. 19 is a flowchart for explaining address resolution processing executed when a data reference request has been issued in a particular architecture. The processing executed by the secure VMM 68 as software is the same as the above-described one. In the description referring to FIG. 19, it is assumed that the secure verifier tree 122 has a MAC+ counter structure. A description will be given of an example where a request to refer to data block B301-1-0-511 has been issued.

Access control based on HAP realizes a predetermined function during verification execution. More specifically, when read/write access to, for example, a table entry with HAP=Read-only has been performed, a page protection error will occur.

At this time, the MMU 46 starts address resolution processing of data block B301-1-0-511, and executes address resolution based on page walk in step S501.

In step S502, the MMU 46 checks table entry E301-1 of table block T301. Since table entry E301-1 is valid (HAP=Other), the MMU 46 refers to it.

In step S503, the MMU 46 checks whether address resolution processing of addresses up to the address of data block B301-1-0-511 has been completed.

Since the address resolution processing is not completed, the MMU 46 repeats page walk in step S501.

In step S502, the MMU 46 checks table entry E301-1-0-511 of table block T301-1-0.

If table entry E301-1-0-511 is invalid (HAP=No Access), the MMU 46 generates a fault to thereby transfer control to the secure VMM 68.

In step S504, the secure VMM 68 checks flag A of table entry E301-1-0-511.

If table entry E301-1-0-511 is invalid (flag A=No Access), the secure VMM 68 transfers control to a page protection error handler in step S505, thereby terminating the processing.

If flag A is not No Access (flag A=Other), the secure VMM 68 checks flag V of table entry E301-1-0-511 in step S506.

If a target block is not a verification target (flag V=NV), the secure VMM 68 transfers control to an internal error handler in step S507, thereby terminating the processing.

If the target block is a verification target (flag V=V), the secure VMM 68 executes verification processing of data block B301-1-0-511 in step S508. After finishing the verification processing, the secure VMM 68 validates table entry E301-1-0-511 that is currently invalid.

As a result, reference to data block B301-1-0-511 is enabled. The secure VMM 68 writes the value of flag A to HAP, and returns control to the MMU 46.

In step S503, the MMU 46 checks whether address resolution processing of addresses up to the address of data block B301-1-0-511 has been completed.

If address resolution processing of the addresses up to the address of data block B301-1-0-511 has been completed, the MMU 46 resumes data reference processing in step S509, which is the termination of the address resolution processing.

As described above, in the present embodiment, the secure page table tree 121 and the secure verification tree 122 for falsification verification are made to match each other in graph structure, and the storage state of the internal memory 8 is managed in a secure manner, whereby verification processing can be executed efficiently. As a result, the information processing device 65 can be protected completely from a falsification attack against the external memory 7.

In the present embodiment, a table block and a verification block are simultaneously read from the external memory 7 into the internal memory 8, and are simultaneously validated. As a result, the information processing device 65 can reliably and efficiently store, in the internal memory 8 with the completeness of content guaranteed, the page table tree 9, the verifier tree 10 and data stored in the external memory 7 that can be altered illegally, and can reliably and efficiently use them.

In the present embodiment, when the secure page table tree 121 or data updated in the internal memory 8 is written to the external memory 7, a verifier is calculated from the written page table or data, and the secure verifier tree 122 of the internal memory 8 is updated based on the verifier. As a result, falsification of a page table or data can be detected when the page table or data is read into the internal memory 8, after updating.

In the present embodiment, a page table is transferred from the internal memory 8 to the external memory 7, and is thereafter transferred from the external memory 7 to the internal memory 8. If a page table or data to be referred to by the table entry of the first-mentioned page table is not yet stored in the internal memory 8, the table entry is managed to exhibit an invalid state. As a result, reference processing and verification processing of a lower-level page table or data can be executed correctly.

Third Embodiment

A present embodiment is a modification of the second embodiment. In the present embodiment, in order to prevent the data of the secure VMM 68 from being damaged by a defect or malfunction of a guest OS, the data of the secure VMM 68 is isolated from the access area of the guest OS.

(Limitations on Intermediate Physical Address Level)

Firstly, a description will be given of limitations on an address area that can be accessed by a guest OS. Two limitations are imposed on the address area.

The first limitation is imposed on an intermediate physical address area that can be accessed by the guest OS.

FIG. 20 is a block diagram showing an example of a first limitation embodiment of a virtual address area associated with the secure page table tree 121 and secure verifier tree 122 according to the present embodiment.

FIG. 20 shows a basic structure example of a page table tree of stage 2. The page table tree of stage 2 defines translation from an intermediate physical address to a physical address.

The entire page table tree of stage 2 is denoted by T400, and the entire data is denoted by B400.

The secure VMM 68 can access a memory both in a virtual address mode in which it accesses the memory using the address translation function of the MMU 46, and in a real address mode in which it accesses the memory without using the MMU 46.

In the real address mode, the secure VMM 68 can access all memory spaces unconditionally. The secure VMM 68 uses the real address mode when setting an interrupt vector, and when firstly setting a page table.

In the virtual address mode, the secure VMM 68 can access all areas set as translation targets by the stage-2 table tree T400.

The page tables arranged in the physical address areas 702 and 703 in FIG. 7 have verifiers corresponding to the hierarchical structure. All memory areas except for the internal memory 8 can be validated using a verifier tree.

To prevent data destruction due to erroneous operations, access control is generally performed so that a guest OS cannot refer to a stage-2 page table allocated to the guest OS itself. In the present embodiment, a description will be given using, as an example, such an address area limitation on a guest OS.

An intermediate physical address space 89 represents the entire intermediate physical address space.

An address area 89*a* in the intermediate physical address space 89 can be accessed by the secure VMM 68 and cannot be accessed by the guest OS.

An address area 89*b* in the intermediate physical address space 89 can be accessed in common by both the secure VMM 68 and the guest OS.

The secure VMM 68 sets the address area 89*b* in an address area limitation register 90. In other words, the address area limitation register 90 sets an address area that can be accessed by the guest OS. Limitation on the address area by the address area limitation register 90 is activated during the execution of the guest OS.

To start address resolution processing, beginning with page table T401 of the top level, the guest OS can potentially access all physical address areas mapped in page table T401.

However, by limiting the address area of the above-mentioned intermediate physical address level, an accessible address area of a translated physical address level is limited to an address area 91*a* in a physical address space 91. Thus, the image of the secure VMM 68 stored in the external memory 7 can be protected from being accessed by the guest OS. Further, the secure VMM program area 77 of the internal memory 8 can be protected from being accessed by the guest OS.

The above limitation on the access area of the intermediate physical address level can be realized by checking the intermediate physical address space 89 during address translation by the MMU 46.

In the second limitation, the address area of the guest OS is limited by a register 64 for designating the highest-level page table.

In a particular architecture, the pointing destination of the register 64 that designates an address in the secure page table tree 121 can be set to a page table of level 2 or lower, by controlled register setting.

Figure 21:
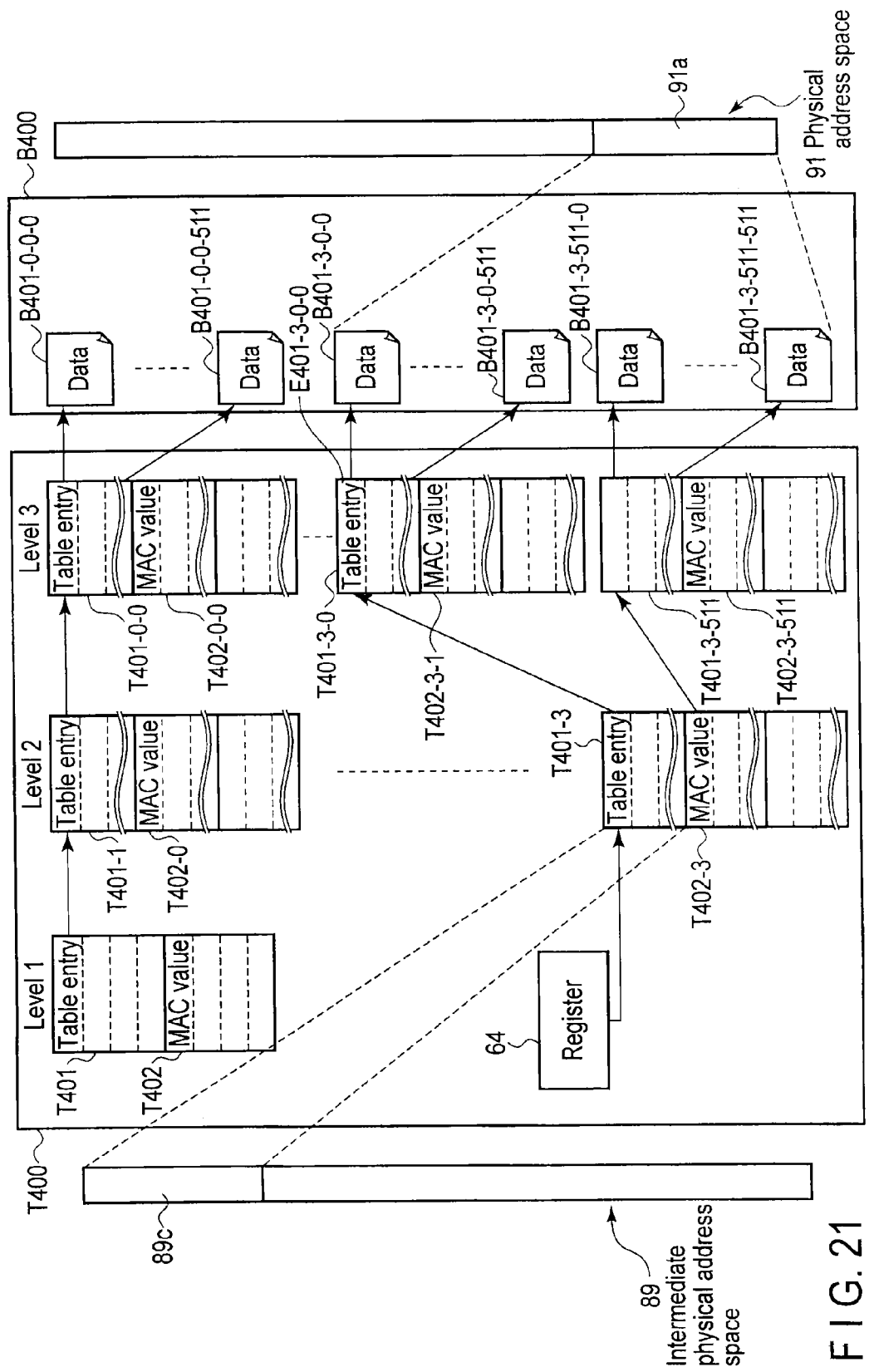
FIG. 21 is a block diagram showing an example of a second limitation embodiment of the virtual address area associated with the page table tree and verifier tree according to the third embodiment.

FIG. 21 is a block diagram showing an example of a second limitation embodiment of the virtual address area associated with the secure page table tree 121 and secure verifier tree 122 according to the present embodiment;

For instance, the register 64 sets a pointer designating page table T401-3 of level 2. By thus enabling a page table of the highest level to be appropriately set, the accessible address area can be limited to the same physical address area 91*a* as in the case of FIG. 20. In the example of FIG. 21, the intermediate physical address area 89*c* is mapped to the physical address area 91*a*.

(Relationship Between Secure Verifier Tree 122 and Access Control)

When limitation using the register 64 is employed, the register 64 used during execution of a guest OS designates page table T401-3 of level 2 included in the secure page table tree(s) 121. It is a matter of course that the secure verifier tree, in which page table T401-3 is of the highest level, is part of all secure page table trees 121, and that tree verification cannot be performed using only this part. However, since the secure VMM 68 accessible to page tables of level 1 performs verification, access to upper-level verifiers is possible even when verification of guest-OS data has occurred, which enables tree verification.

Specifically, if page table T401-3 does not exist during execution of a guest OS, a page fault occurs. Upon occurrence of the fault, control is transferred to secure VMM 68, and the secure VMM 68 sets the register 64 to refer to table block T401 of level 1. Subsequently, the secure VMM 68 executes verification of page table T401-3 of level 2 in which the fault has occurred, using MAC block T402 of highest level 1 and based on verification processing described in the second embodiment.

FIG. 22 is a block diagram showing an example of a relationship between an address map and physical address areas. In FIG. 22, a reference number corresponding to that of FIG. 7, a physical address area, data designating whether verification has been executed at the time of booting, data designating whether page verification has been executed, the reference numbers of non-verified blocks, and a memory size, are stored in each of the internal memory 8, the mask ROM 69, the secure VMM program area 701, the physical address area 702 to the secure OS page table area 704, the secure VMM work area 705 and the secure VMM MAC area 706, the reserved area 710, the non-secure OS area 75, the reserved area 711 and the secure OS area 76, which are shown in FIG. 7.

In the above-described present embodiment, the address areas that can be accessed by the guest OS can be made different from those accessed by the secure VMM 68. This enables, for example, the secure page table tree 121 to be shared between the guest OS and the secure VMM 68, and enables data associated with verification using the secure verifier tree 122 to be protected from erroneous operations.

More specifically, a multi-functional guest OS may be potentially weak. In the present embodiment, the area that can be accessed by the guest OS is limited, which enables the secure VMM 68 to be protected from erroneous operations due to the weakness of the guest OS. In the present embodiment, the secure VMM 68 can protect its work area from the guest OS, and can protect the secure page table tree 121 by falsification verification based on the secure verifier tree 122.

In the present embodiment, even when the guest OS erroneously operates, the word area of the secure VMM 68 can be protected to thereby guarantee the soundness of the secure VMM 68. In the present embodiment, guarantee can be achieved efficiently by sharing the secure page table tree 121 between the guest OS and the secure VMM 68.

In the present embodiment, the address areas that can be accessed by the guest OS can be limited by causing the secure VMM 68 to set, in the register 90, address areas that can be accessed by the guest OS, or by causing the secure VMM 68 to arbitrarily set in a page table of the highest level designated by the register 64. As a result, destruction of the data of the secure VMM 68 due to a failure and/or erroneous operation of the guest OS can be avoided.

Fourth Embodiment

A present embodiment is directed to a modification of the second and third embodiments. The above-described third embodiment is directed to a case where the address areas that can be accessed by a guest OS are limited by a structure wherein the secure page table tree 121 is shared between the guest OS and the secure VMM 68.

In contrast, in the present embodiment, a description will be given of a case where the guest OS and the secure VMM 68 have different secure page table trees. In the present embodiment, for example, the guest OS and the secure VMM 68 have respective stage-2 page table trees, thereby limiting the address areas that can be accessed by the guest OS.

FIGS. 20 and 21 referred to in the above-described third embodiment show secure page table tree T400 managed by the secure VMM 68 integrally with the secure verifier tree.

FIG. 23 is a data structure diagram showing an example of a stage-2 page table tree of a guest OS.

The entire stage-2 page table tree is denoted by T500.

Stage-2 page table tree T500 shown in FIG. 23 includes page tables T501 to T501-0-511. Page tables T501-0-0 to T501-0-511 refer to data B401-3-0-0 to B401-3-0-511, respectively. In the above-described third embodiment, data B401-3-0-0 to B401-3-0-511 are arranged in the data area 91a that can be referred to by the guest OS.

For instance, in an initial state, only table block T401 and verification block T402 of level 1 managed by the secure VMM 68 and shown in FIGS. 20 and 21 are stored in the internal memory 8. The register 64 of the secure VMM 68 is set to Iaddr(T401) as a storage destination of table block T401 in the internal memory 8.

Before execution of the guest OS, the secure VMM 68 verifies stage-2 page table T501 of the guest OS, and then stores the verified table in the internal memory 8. Page table T501 is not a stage-1 page table (stored in the physical address area 91a) that is permitted to be managed and changed by the guest OS, but is a stage-2 page table (stored in the secure OS page table area 704) that is supposed to be disable to be operated by the guest OS itself.

No verifier tree is attached to stage-2 page table tree T500 of the guest OS. In verification and read-in of stage-2 page table tree T500, the secure VMM 68 verifies table blocks constituting stage-2 page table tree T500, based on the secure verifier tree attached to stage-2 page table tree T400 managed by the secure VMM 68, and stores them in the internal memory 8.

Figure 24:
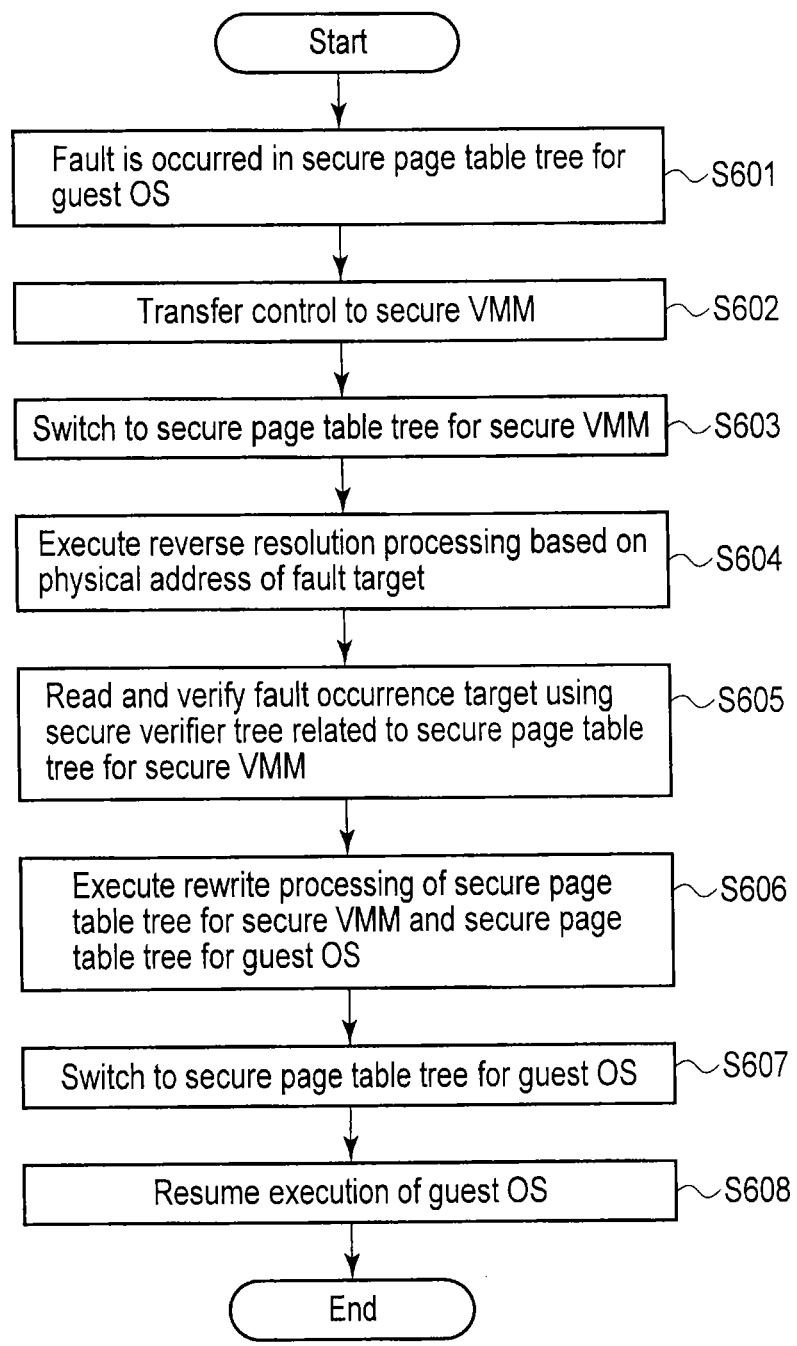
FIG. 24 is a flowchart showing an example of data verification, reading-in, and access control according to a fourth embodiment.

FIG. 24 is a flowchart showing an example of data verification, reading-in, and access control according to the present embodiment.

During execution of the guest OS, Iaddr(T501) is set in the register 64, and the MMU 46 executes stage-2 address translation in association with stage-2 page table tree T500. When a data reference fault has occurred in step S601, control is transferred from the MMU 46 to the secure VMM 68 in step S602.

In step S603, the secure VMM 68 changes the value of the register 64 to Iaddr(T401). Assuming here that the intermediate physical address is 0, the secure VMM 68 stores data block B401-3-0-0 in the internal memory 8.

A verifier used to verify data block B401-3-0-0 is attached to table block T401-3-0 that refers to data block B401-3-0-0 in stage-2 page table tree T400 managed by the secure VMM 68. In step S604, the secure VMM 68 executes reverse address resolution processing of table block T401-3-0 including table entry E401-3-0-0 that refers to data block B401-3-0-0, using stage-2 page table tree T400. This reverse address resolution processing is well known to anyone skilled in the art. In the present embodiment, no address translation is performed on stage-2 page table tree T400 used for management. Using stage-2 page table tree T400 used for management, table entry E401-3-0-0 that refers to data block B401-3-0-0 can be detected.

In step S605, the secure VMM 68 executes verification processing using a secure verifier tree attached to stage-2 page table tree T400, as in the processing performed in the above-described second embodiment.

After that, in step S606, in association with two stage-2 page table trees T400 and T500, the secure VMM 68 changes the reference destination of table entries E401-3-0-0 and E501-1-0-0 that refer to data block B401-3-0-0, to Iaddr(B401-3-0-0) as the storage destination of data block B401-3-0-0 in the internal memory 8.

Subsequently, in step S607, the secure VMM 68 sets Iaddr(T501) in the register 64 for the guest OS, thereby switching the processing to the execution of the guest OS. In step S608, the secure VMM 68 resumes execution of the guest OS.

Although in the above present embodiment, read-in of a data block has been described, data reading into the internal memory 8 is executed by the same processing as the above also when the table blocks of stage-2 page table tree T500 of the guest OS are not yet read.

In the present embodiment, stage-2 page table tree T500 managed by the guest OS and stage-2 page table tree T400 managed by the secure VMM 68 are completely independent of each other. This can enhance the degrees of freedom of arrangement, in a memory, of and access control of intermediate physical addresses that can be referred to by the guest OS access control. Further, memory verification can be executed using a secure verifier tree attached to stage-2 page table tree T400 managed by the secure VMM 68.

In the present embodiment, the enhancement of the degree of freedom of address arrangement in the memory for the guest OS requires rewriting of data block reference destinations in two secure page table trees T400 and T500. In order to reduce the load for this processing, the guest OS and the secure VMM 68 may each includes page tables of levels 1 and 2 in stage-2 page table trees T400 and T500, and may share page tables of level 3. In this case, although the granular size of one page table of level 3 is as large as 2 megabytes in association with the degree of freedom of the memory map of the guest OS, an increase in the rewrite load of stage-2 table trees T400 and T500 can be suppressed by read-in processing of highly accessed data blocks.

Depending upon a system architecture, a particular physical address area (an intermediate physical address area when virtualization is performed) may be allocated to a particular buffer memory, such as a communication input/output. If a page table is shared between a plurality of OSs and only one physical address image is allocated to one physical address area, it is difficult to operate a plurality of guest OSs in a parallel manner. Similar collision may occur not only between guest OSs but also between a guest OS and the secure VMM 68. However, in the present embodiment, two page table trees T400 and T500 are allocated to each guest OS, whereby intermediate physical address areas can be allocated to each guest OS.

Fifth Embodiment

A present embodiment is a modification of the second to fourth embodiments. In the present embodiment, verification associated with read-in and decoding are performed. Further, in the present embodiment, encryption is performed at the time of data writing (roll-out). For instance, a Counter with CBC-MAC (CCM) mode as a mode using authorization-attached encryption is utilized instead of simple MAC. This simultaneously realizes efficient encryption and verifier calculation. Encryption and decryption may be executed along with MAC calculation and verification. Alternatively, encryption and decryption may be executed by other various methods.

By encrypting a page table or data transferred from the internal memory 8 to the external memory 7, and decrypting a page table or data transferred from the external memory 7 to the internal memory 8, secrecy can be guaranteed in addition to completeness.

Sixth Embodiment

A present embodiment is a modification of the second to fifth embodiments.

In the present embodiment, an intermediate physical address is used for calculation for data block falsification verification, and a secure page table tree and a secure verifier tree are provided for each guest OS.

In the present embodiment, a description will be given of a case where an intermediate physical address is used for calculation for verification of data block falsification, and a secure page table tree and a secure verifier tree are provided for each guest OS.

In the present embodiment, secure page table trees for respective guest OSs are associated with respective secure verifier trees that are independent of each other. In the present embodiment, when a page table or data is read in, it is not necessary to update both a secure page table tree managed by a guest OS influenced by the read-in, and a common secure page table managed by the secure VMM 68, unlike the fourth embodiment. It is sufficient if only the secure page table managed by the influenced guest OS is updated.

Figure 25:
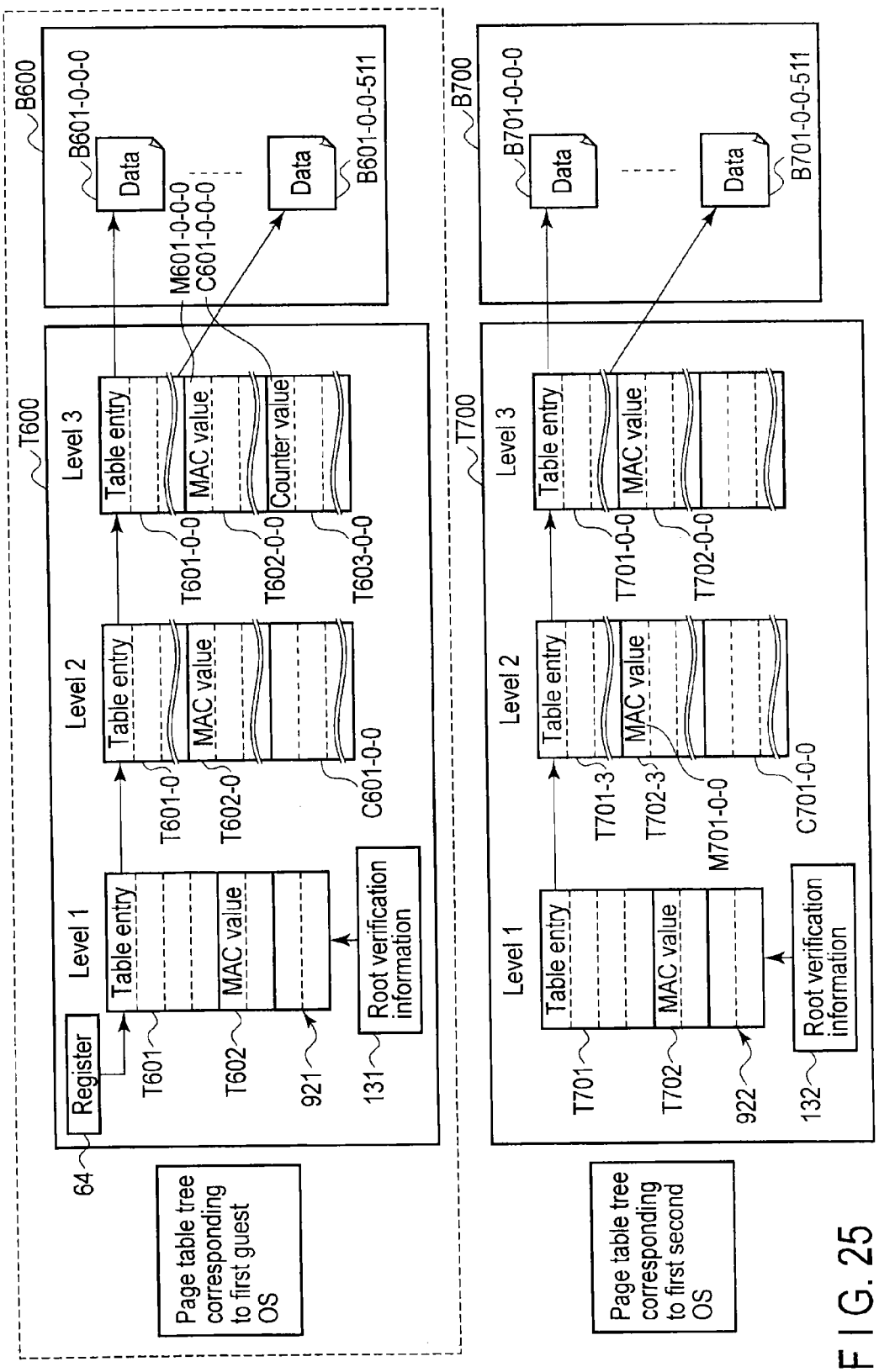
FIG. 25 is a data structure diagram showing examples of secure page table trees corresponding to respective guest OSs according to a sixth embodiment.

FIG. 25 is a data structure diagram showing examples of secure page table trees corresponding to respective guest OSs according to the present embodiment.

Secure page table tree T600 of a first guest OS refers to data B600. Secure verifier tree 921 corresponding to the first guest OS is attached to secure page table tree T600. In FIG. 25, the first guest OS is being executed, and the register 64 stores an address allocated to highest-level table T601 of secure page table tree T600.

Secure page table tree T700 of a second guest OS refers to data B700. Secure verifier tree 922 corresponding to the second guest OS is attached to secure page table tree T700. In FIG. 25, the second guest OS is in a standby state.

During the execution of the first guest OS, the register 64 sets the address of the secure page table tree T600 corresponding to the first guest OS. During the execution of the second guest OS, the register 64 sets the address of the secure page table tree T700 corresponding to the second guest OS. In FIG. 25, since the first guest OS is being executed, the register 64 sets the address of the secure page table tree T600 corresponding to the first guest OS. In the present embodiment, a tree formed of page tables read into the internal memory 8, and a tree formed of verifiers, are called a secure page table tree and a secure verifier tree, respectively, regardless of whether they are referred to by the register 64 and used for address translation.

Compared to the above-described third and fourth embodiments, the present embodiment has the following first to third features:

The first feature of the present embodiment is that secure verifier trees 921 and 922 are provided in association with the secure page table trees T600 and T700 of each guest OS, respectively.

The second feature of the present embodiment is that different addresses are used for verifier calculation between data and a page table. Suppose here that intermediate physical addresses are used for verifier calculations corresponding to data blocks B601-0-0-0 to B601-0-0-511, instead of such physical addresses as shown in FIG. 3.

The third feature of the present embodiment is that root verification information 131 and 132 are stored for the secure verifier trees 921 and 922 corresponding to each guest OS, respectively. Each of the root verification information 131 and 132 is combination of a secret key and a highest-level verifier.

FIG. 26 is a block diagram showing an example of a structure of an information processing device according to the present embodiment.

The MMU 46 of the information processing device 93 includes the register 64. The verification management unit 79 includes a root verification switching unit (root verification information switching unit) 79d. The storage area management unit 83 includes a root verification specifying unit (root verification information specifying unit) 83d.

The information processing device 93 according to the present embodiment differs from the third and fourth embodiments in the execution of verification and replacement, and is the same in the other operations.

Although in the present embodiment, a description will be given of an example case where the secure verifier trees 921 and 922 are used for the respective two guest OSs, a unique secure verifier tree may also be used for the program image and data of the secure VMM 68.

The stage-2 page table tree and the verifier tree of a guest OS may have a rather big size. The stage-2 page table tree of the guest OS is data managed by the secure VMM 68, and needs, of course, to be protected from falsification. The operation performed when data managed by the secure VMM 68 is verified by an independent secure verifier tree is complicated, since data verification of the guest OS and that of the secure VMM 68 are performed in parallel. In light of this, to simplify the description, the present embodiment is directed to a case where two guest OSs have respective independent secure verifier trees 921 and 922. However, the data managed by the secure VMM 68 can be verified by another independent secure verifier tree.

(Details of Verification Processing)

Figure 27:
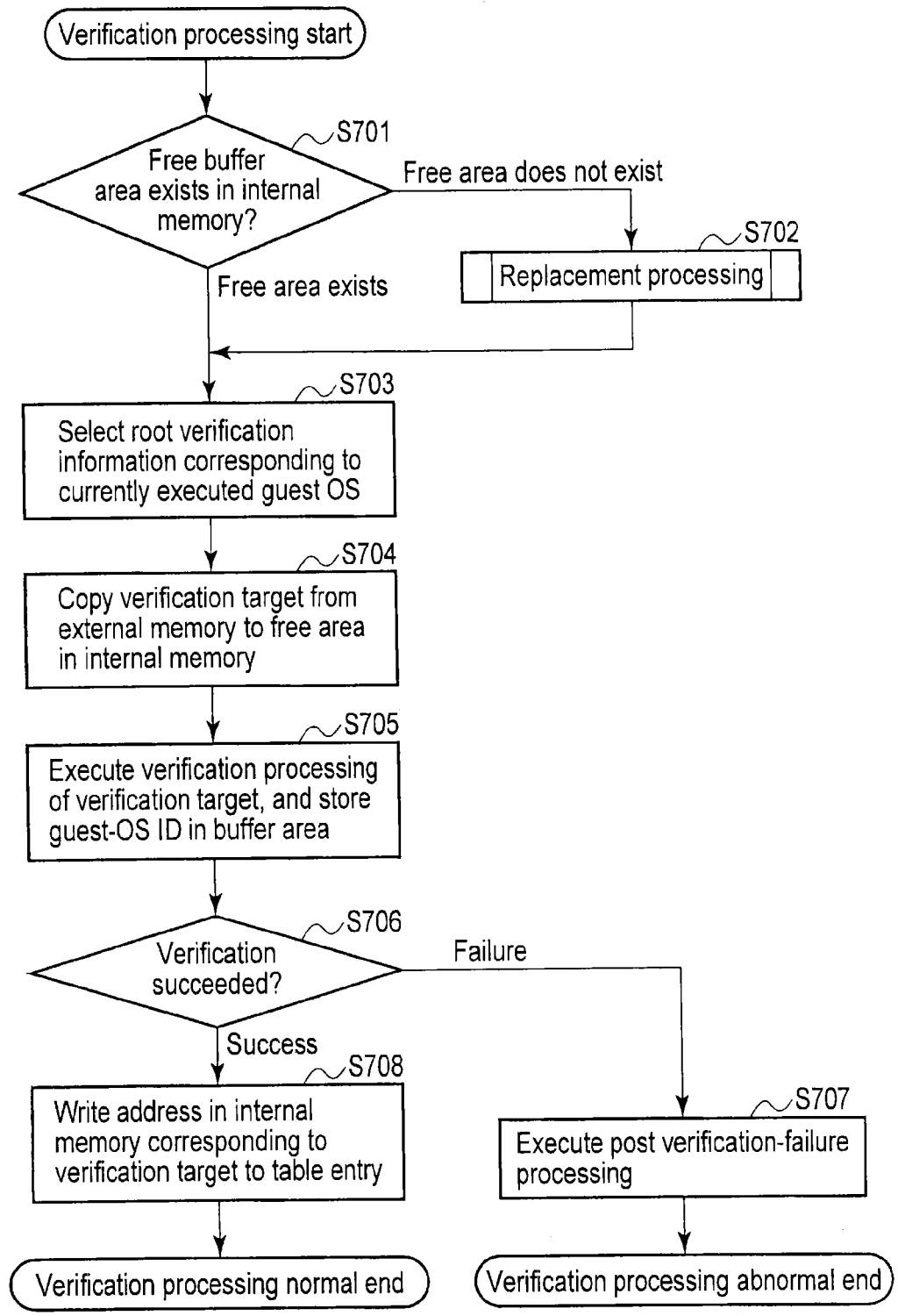
FIG. 27 is a flowchart showing an example of verification processing of the information processing device according to the sixth embodiment.

FIG. 27 is a flowchart showing an example of verification processing of the information processing device 93 according to the present embodiment. In this verification processing, table block T601-0-0 is used as a verification target example.

The secure VMM 68 starts verification processing of table block T601-0-0, and checks in step S701 whether the verification buffer area 72 of the internal memory 8 has a free area.

If the verification buffer area 72 has no free area, the secure VMM 68 releases an area by replacement processing in step S702.

Subsequently, in step S703, the secure VMM 68 selects, as root verification information for verification processing performed below, the root verification information 131 of a first guest OS that was executed before occurrence of a fault.

In step S704, the secure VMM 68 copies verification target table block T601-0-0 and verification blocks T602-0-0 and T603-0-0 associated with table block T601-0-0 from address Eaddr(T601-0-0) of the external memory 7 to the free area of the verification buffer area 72 of the internal memory 8.

In step S705, the secure DMA controller 52 executes verification processing of verification target table block T601-0-0 and verification blocks T602-0-0 and T603-0-0. The secure VMM 68 stores a corresponding guest-OS ID in each of the buffer areas that store read-in verification target table block T601-0-0 and verification blocks T602-0-0 and T603-0-0.

Subsequent steps S706 to S708 of the verification processing are similar to steps S205 to S207 shown in FIG. 14 directed to the second embodiment.

Referring again to FIG. 27, a description will be given of the relationship between the data verification processing of the present embodiment and the configuration of the information processing device 93 shown in FIG. 26. In this description, data block B601-0-0-0 shown in FIG. 25 is used as verification processing target example.

In step S701, the verification management unit 79 inquires of buffer management unit 83b of the storage area management unit 83 whether the verification storage unit 84 has a free buffer area.

If there is no free area, the verification management unit 79 requests, in step S702, the storage area management unit 83 to release an already read buffer area, thereby obtaining an address allocated to the released area.

Verification information acquisition unit 79a of the verification management unit 79 acquires MAC value M601-0-0-0 and counter value C601-0-0-0 from MAC block T602-0-0 and counter block T603-0-0 as an upper-level verification block existing in the verification storage unit 84.

The present embodiment is characterized in that root verification switching unit 79d acquires, in step S703, the secret key of the currently executed guest OS, and root verification information 131, if necessary, thereby transferring them to verification information acquisition unit 79a.

In step S704, verification information acquisition unit 79a transfers verification target data block B601-0-0-0 from the external memory 7 to the free area of the verification storage unit 84 via the external read unit 81.

In step S705, verification information calculation unit 79c calculates a MAC value, based on verification target data block B601-0-0-0, counter value C601-0-0-0 from upper-level counter block T603-0-0, and the secret key. The present embodiment is characterized in that the storage area management unit 83 informs root verification specifying unit 83d of guest-OS IDs, and root verification specifying unit 83d stores the guest-OS IDs in respective buffer areas. The falsification determining unit 79b compares the calculated MAC value with already acquired MAC value M601-0-0-0.

If in step S706, the MAC values do not match each other (if the result of verification designates read-in failure), the verification management unit 79 informs the instruction execution unit 45 of the failure in step S707, thereby stopping subsequent processing.

In contrast, if in step S706, the MAC values match each other (if the result of verification designates read-in success), the verification management unit 79 informs reference relationship update unit 83a of the success. In step S708, reference relationship update unit 83a writes address Iaddr (B601-0-0-0) of the verification storage unit 84 corresponding to verification target data block B601-0-0-0, as the reference destination address of an invalidated table entry.

Further, reference relationship update unit 83a stores, in the buffer management data area 73 in a buffer block unit, address Eaddr(B601-0-0-0) of the external memory 7 corresponding to data block B601-0-0-0, thereby finishing the verification processing.

(Block Address Used for Verifier Calculation)

In the present embodiment, different addresses are used for calculation of verifiers between a data block and a table block.

Addresses used for calculating the verifiers of data blocks B601-0-0 to B601-0-511 and B701-0-0 to B701-0-511 may be intermediate physical addresses, instead of physical addresses. In the present embodiment, since root verification information 131 and 132 are allocated to the secure verifier trees 921 and 922, respectively, even if a plurality of guest OSs use intermediate physical addresses for calculation of verifiers of data blocks, verifier collision will not occur. Further, since intermediate physical addresses are used for verifier calculation, a physical address at which data corresponding to a certain intermediate physical address is located can be changed freely, which enhances the degree of freedom of implementation.

However, the verifier of a table block included in stage-2 secure page table trees T600 and T700 is calculated based on a corresponding physical address. This is because the table block designates context of a corresponding guest OS, and no intermediate physical address is allocated to the table block. Even when table blocks cannot be rearranged, the same advantage can be obtained if the reference relationship between the table blocks is explicitly changed.

(Details of Flush Processing)

Figure 28:
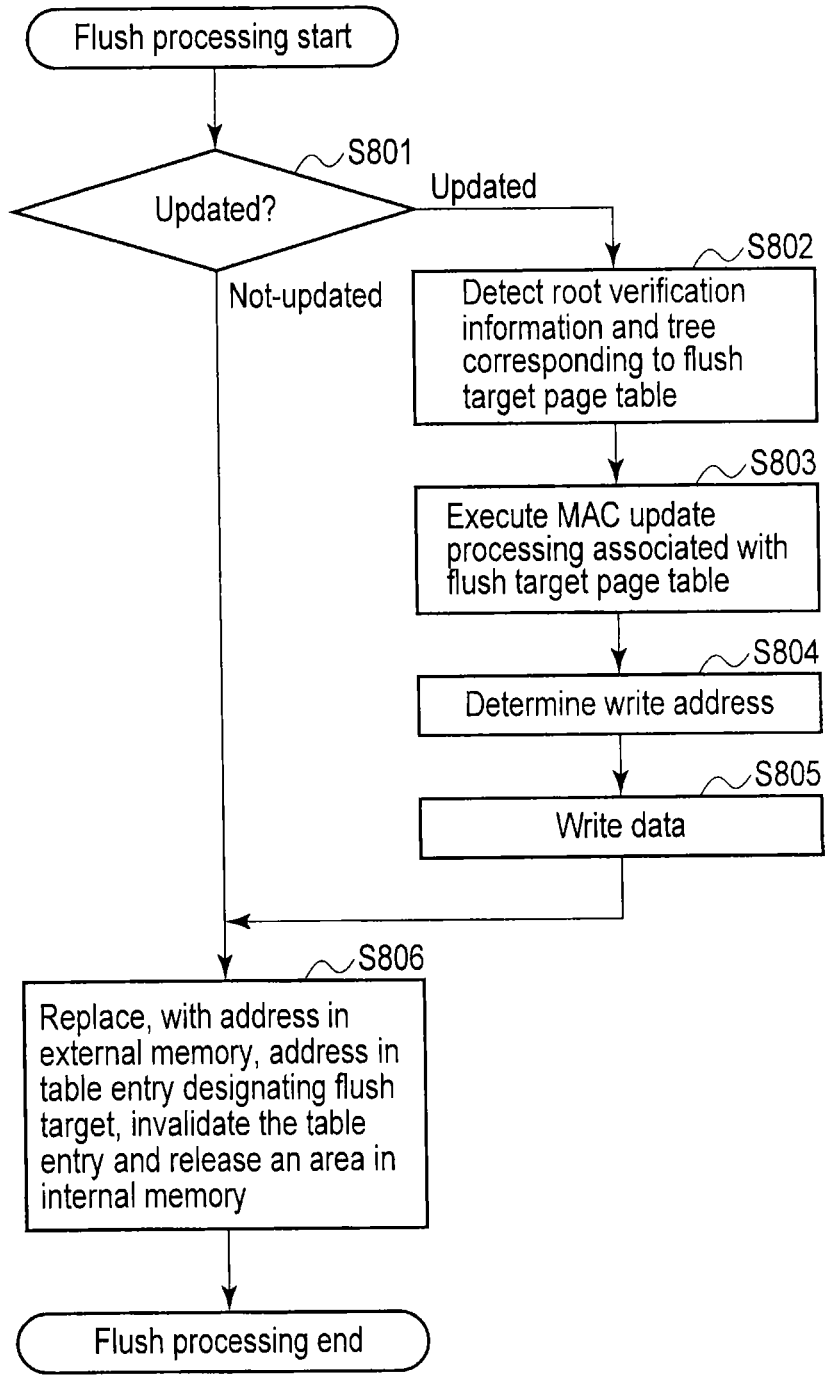
FIG. 28 is a flowchart showing an example of flush processing of the information processing device according to the sixth embodiment.

FIG. 28 is a flowchart showing an example of flush processing of the information processing device 93 according to the present embodiment. The flush processing shown in FIG. 28 occurs in, for example, the replacement processing shown in FIG. 15.

A table block as a flush target is supposed to be, for example, table block T701-0-0 of the second guest OS shown in FIG. 25.

A table block stored as a read-in target in the internal memory 8 is supposed to be, for example, table block T601-0-0 of the first guest OS, instead of flush target table block T701-0-0.

Counter value C701-0-0 of flush target table block T701-0-0 is stored in the internal memory 8. MAC value M701-0-0 of table block T701-0-0 is stored in the external memory 7. MAC value M701-0-0 in the external memory 7 is the MAC value of table block T701-0-0 stored in the external memory 7. Accordingly, when table block T701-0-0 updated in the internal memory 8 is written to the external memory 7, update processing of MAC value M701-0-0 is needed. In contrast, when table block T701-0-0 in the internal memory 8 is not updated, MAC value M701-0-0 does not have to be updated, because there is no difference in the content of table block T701-0-0 between the external memory 7 and the internal memory 8.

In the second embodiment, a flush target table block, and a read-in target table block as a trigger of flush, are included in page table elements of the same guest OS.

However, in the present embodiment, table block T601-0-0 as a trigger of flush occurs when the first guest OS is executed, whereas table block T701-0-0 as a flush target occurs when the second guest OS is executed. Namely, in the present embodiment, read-in and flush occur in association with different guest OSs. Further, the two guest OSs have respective root verification information 131 and 132, as well as their respective secure page table trees T600 and T700 and secure verifier trees 921 and 922.

Based on the above feature, in the present embodiment, the secure VMM 68 checks in step S801 whether flush target table block T701-0-0 is updated.

If flush target table block T701-0-0 is updated, the secure VMM 68 acquires the root verification information 132 of secure page table tree T700 from which the flush target table block is flushed, thereby recognizing secure page table tree T700. Namely, the secure VMM 68 acquires the root verification information 132 associated with the second guest OS, instead of the root verification information 131 associated with the first guest OS executed so far.

In step S803, the secure VMM 68 performs MAC update processing of flush target table block T701-0-0, using the acquired root verification information 132 associated with the second guest OS.

In step S804, the secure VMM 68 determines a physical address allocated to an area to which data is to be written, by reverse translation of the secure page table tree T700 or by storing a physical address used at the time of read-in.

Steps S805 and S806 are similar to steps S404 and vaS405 in FIG. 16 referred to in the second embodiment.

A description will be given of the above-described page-table flush processing and its peripheral processing in association with the structure of the information processing device 93 of FIG. 26.

In steps S201 and S202, the verification management unit 79 requests a free buffer area of the storage area management unit 83. The storage area management unit 83 refers to buffer area management unit 83b to search for the free buffer area.

If there is no free buffer area, the storage area management unit 83 selects, in step S302, a buffer area serving as a flush target page table area, using predetermined algorithm. Buffer write management unit 83c determines in step S801 whether the buffer area corresponding to the flush target page table and selected by buffer area management unit 83b is updated.

If it is updated, root verification specifying unit 83d acquires, in step S802, guest-OS ID corresponding to the flush buffer area when flush is performed, acquires corresponding root verification information 131 or 132, and verifies secure page table tree T600 or T700.

Root verification specifying unit 83d sends root verification information 131 or 132 to the verification information generation unit 80.

In step S803, the verification information generation unit 80 performs MAC update processing of the flush target page table.

In step S804, buffer area management unit 83b determines an address in the external memory 7 serving as a write destination.

In step S805, the external write unit 82 writes, to the external memory 7, the flush target page table and a generated verifier.

After completing the writing from the buffer area, reference relationship update unit 83a updates the reference relationship between page tables in step S806.

(OS Switch Processing)

FIG. 29 is a flowchart showing an example of OS switch processing according to the present embodiment.

The secure VMM 68 determines a guest OS as a switch destination in step S901, switches the root verification information between the verification information 121 and 122 in step S902, rewrites the register 64 in step S903, and starts to execute the guest OS as the switch destination in step S904.

In the above-described present embodiment, secure page table trees T600 and T700 and the secure verifier trees 921 and 922 are generated for respective guest OSs, and switching is performed between secure page table trees T600 and T700 and between the secure verifier trees 921 and 922 in accordance with switching between the guest OSs. As a result, update of secure page table trees T600 and T700 can be efficiently executed for the respective guest OSs.

In the present embodiment, an intermediate physical address can be used during data falsification verification by calculating a verifier corresponding to data, using the intermediate physical address.

Seventh Embodiment

In each of the above-described embodiments, the memory image of the entire information processing device 65 or 93, or the memory image of each of the guest OSs, is consolidated into one root verification information 13, 131 or 132. In other words, each of the above-described embodiments is characterized in that if the memory content of the entire information processing device 65 or 93 or each guest OS is changed even by one bit, this change will appear in the form of change in the root verification information 13, 131 or 132.

A present embodiment provides a function of confirming, utilizing the above feature, a state in which the memory content of the information processing device 65 or 93 does not change from a certain point of time, which state includes a normal operation. This function relates to a so-called digital forensic that is associated with perpetuation of evidence of the status of the information processing device 65 or 93 assumed when an accident or a criminal act occurs.

FIG. 30 is a system structure diagram showing an example of an information processing system according to the present embodiment.

FIG. 31 is a block diagram showing an example of a structure of the information processing system according to the present embodiment.

FIG. 32 is a flowchart showing an example of a forensic processing of the information processing system according to the present embodiment.

An information processing system 94 has a structure wherein an information processing device (data reference device) 95 is connected communicable to a management server 96 via a network 97.

The information processing device 95 has a configuration similar to that of the above-described information processing device 65 or 93, and further includes a signature generation unit 951 and a message transmission unit 952.

In step S1001, the secure VMM 68 incorporated in the information processing device 95 starts processing for perpetuation of evidence of data, based on a notification from the management server 96 or using a self-governing abnormality detection function.

In step S1002, if a guest OS is a target of perpetuation of evidence processing, the secure VMM 68 stops execution of the guest OS, and sequentially writes, to the external memory 7, the data, secure page table tree 121 and secure verifier tree 122 stored in the verification storage unit 84 in the stopped state.

In step S1003, the signature generation unit 951 generates, after completing write to the external memory 7, forensic data (signature data), based on the MAC value of root verification information stored in the key storage unit 67 and a system time, and using a secret key for forensic signature stored in the key storage unit 67.

In step S1004, the message transmission unit 952 transmits the generated forensic data to the management server 96 via the network 97. The secret key for MAC generation included in the root verification information is not transmitted since it is data that is improper to externally disclose.

In the present embodiment, an agency that has withdrawn the information processing device 95 compares forensic data managed by the management server 96 based on a legal right, with the root verification information of an internal guest OS in the information processing device 95.

If someone illegally has altered data in the information processing device 95 after the forensic data is generated, the root verification information will naturally change, which enables detection of illegal acts.

In view of forensic, not only a physical attack against a memory, but also overwriting of a record by a normal operation, is regarded as misconducts. By transmitting and storing forensic data as in the present embodiment, such misconducts can be detected.

Eighth Embodiment

A present embodiment is a modification of the first to seventh embodiments.

In the present embodiment, it is determined whether data copied from the external memory 7 to the internal memory 8 should be verified each time it is copied, or whether it should be verified only one time, or whether it is not verified. In the present embodiment, it is assumed that a table copied from the external memory 7 to the internal memory 8 is verified each time. This can make a verification level of data appropriate, thereby preventing a processing speed of the processor 66 from reduction. In the present embodiment, it is determined whether verification is executed each time, or it is executed one time, or it is not executed, from power-on to power-off. However, verification is not limited to be executed each time or one time. The number of times of verification may be two or more.

If data copied from the external memory 7 to the internal memory 8 is verified each time, a data protection is possible during operation of the processor 66. The data protection includes falsification verification, securing by an encryption, etc. However, when data having a size greater than a memory size of the internal memory 8 is processed by the processor 66 (for example, when a program having a size greater than the memory size of the internal memory 8 is executed), access to data (e.g., a program) that is not stored in the internal memory 8 may well occur, resulting in an increase in cache misses and an increase in an overhead due to executions of paging.

On the other hand, since it is more difficult to execute a data falsification and a data thieving attack on a nonvolatile memory while the processor 66 is operating, than to execute the same when the processor 66 is not operating, a countermeasure against the data falsification and the data thieving attack may be dared to be limited to a time when the processor 66 is stopped, depending upon a purpose of use of the processor 66, thereby allowing an attack risk of the data falsification and the data thieving attack when the processor 66 is stopped, to prefer a reduction of an overhead during an operation of the processor 66 to a data protection.

In a description below, the processor 66 in which three data protection types are executed are explained. The outlines of the three data protection types will be described below.

A first data protection type designates each-time verification (ETV). In the ETV, when data is copied from the external memory 7 to the internal memory 8, verified data is stored in the internal memory 8 each time. For example, the internal memory 8 is an SRAM (static random access memory) buffer memory. Overflow data from the internal memory 8 is written to the external memory 7. In the ETV, when data is written from the internal memory 8 to the external memory 7, a verifier, such as a MAC value, is updated each time. An encryption may be performed when data is written from the internal memory 8 to the external memory 7, and a decryption may be performed when data is read-in from the external memory 7 to the internal memory 8.

A second data protection type designates one-time verification (OTV). In the OTV, data access for a first time after power is supplied is directly verified for data in the external memory 7. When data from the external memory 7 is encrypted, it is decrypted. In subsequent access to data in the external memory 7, the data in the external memory 7 is directly referred to, without verification or decryption. Before power to the processor 66 is cut off, decrypted data is again encrypted, and a verifier corresponding to the data is updated.

A third data protection type designates no verification (NOV). In the NOV, the processor 66 directly accesses data in the guest OS of the external memory 7 without verification processing.

In the present embodiment, a supply of power and a power down include a so-called normally-off operation where power is cut off, with an execution state of software maintained in a memory without a reactivation of the guest OS.

When a plurality of data protection types is intermingled, it is necessary to eliminate an interaction which causes an adverse influence. In the present embodiment, a data protection type for certain data (page data) is determined based on internal data for managing a virtual machine monitor (secure VMM 68) and setting information for the data protection types in a page table. Any of the data protection types can protect a page table from falsification, whereby no external attacker can change the data protection types.

In the present embodiment, different levels as data protection levels, i.e., different levels of data security, are set to the plurality of data protection types. However, regardless of the types of the data protection types, verification is performed each time on a page table itself that sets a data protection type, whereby the page table is protected from an attack including a data falsification during operation. Thus, it is possible for protection levels of various setting information included in page tables to be high by applying the ETV to the page tables. Even if data of a low protection level is falsified, the present embodiment guarantees data of higher protection level from damage. Further, even if data of which a data protection type is no-verification is a falsified by data falsification when a processor is stopped, data of one-time verification and each-time verification protection types is not influenced by the data falsification. Furthermore, a guest OS cannot directly operate a page table managed by the secure VMM 68. For instance, when a first guest OS sets a shared memory area between the first guest OS and a second guest OS, the first guest OS may issue a service request to a VMM to thereby indirectly change a setup of a page table. However, if a condition for allowing change of such page-table setup is sufficiently considered, an attack that indiscriminately destroy data of the second guest OS by the first guest OS can be avoided. Thus, in the present embodiment, even if a plurality of data protection types is intermingled, the interaction between data protection types that may involve adverse influence can be excluded.

(Operation in One-Time Verification)

The one-time verification executed when the external memory 7 is a nonvolatile memory will be described.

The one-time verification can be realized by the same structure as that of FIG. 2 described in the second embodiment.

Figure 33:
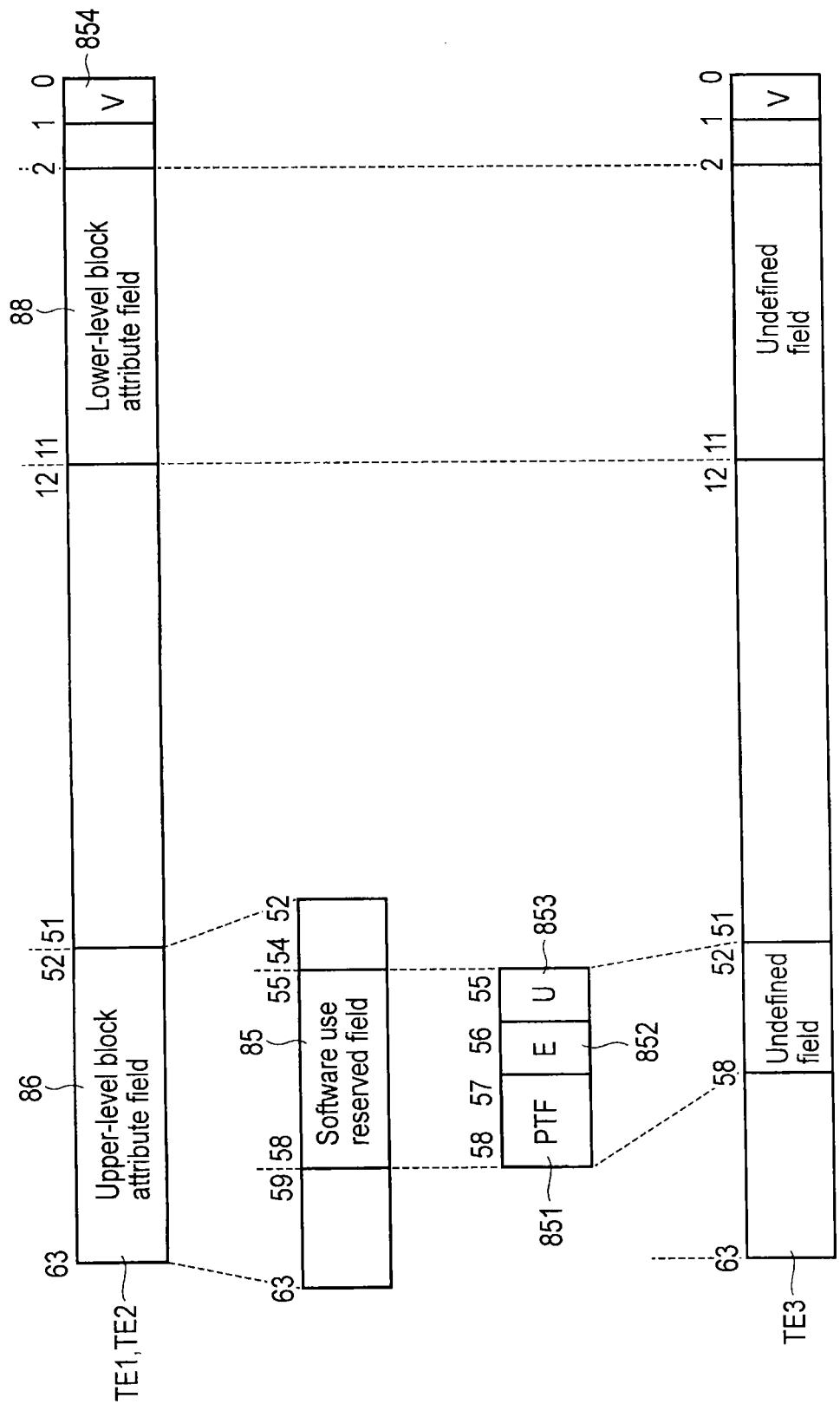
FIG. 33 is a data structure diagram showing an example of a field format of a page table entry according to an eighth embodiment.

FIG. 33 is a data structure diagram showing an example of a field format of a page table entry according to the present embodiment. A page table entry of FIG. 33 is a modification of the page table entry of FIG. 17 described above.

The table entries TE1 and TE2 include the software use reserved field 85.

The software use reserved field 85 and a valid/invalid flag 854 are used as control fields for controlling a data protection type and a state of protection target data. For instance, the software use reserved field 85 includes a data protection type field 851, an encryption field 852 and a use-state field 853.

Information set in the data protection type field (PTF) 851 designates each-time verification, one-time verification, no verification, or reserved.

Information set in the encryption field 852 designates protection by encryption, or no-protection by encryption.

The use-state field 853 is a field provided for one-time verification. If the information set in the use-state field 853 designates "in use," it designates that target data is already verified (or the target data is already decoded in the case where the target data is encrypted). In contrast, if the information set in the use-state field 853 designates "not in use (unverified)," he information designates that the target data is not yet referred to and hence is not yet verified after power is supplied.

Further, a page table entry includes the valid/invalid flag 854 that designates whether the page table entry is valid or invalid.

(Operations in s Plurality of Data Protection Types)

Figures 34, 35:
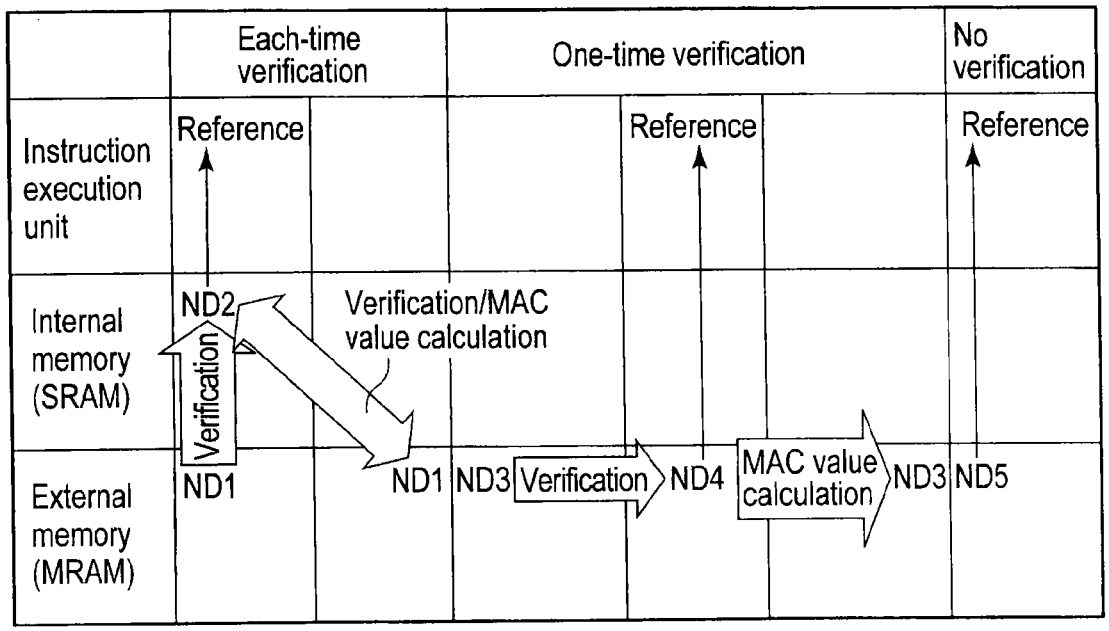
FIG. 34 is a state transition diagram showing an example of a copy state and verification state of data in each data protection type, according to the eighth embodiment.
FIG. 35 is a view showing an example of a relationship between states of a control field of a page table entry, valid/invalid flags designating whether the page table entry is valid or invalid, states of subsequent reference data, and symbols of states of subsequent reference data, in each data protection type.

FIG. 34 is a state transition diagram showing an example of a copy state and verification state of data in each data protection type, according to the present embodiment. In FIG. 34, it is assumed that the external memory 7 is an MRAM, and the internal memory 8 is an SRAM.

FIG. 35 is a view showing an example of a relationship between states of a control field of a page table entry, valid/invalid flags 854 designating whether the page table entry is valid or invalid, states of subsequent reference data, and symbols of states of the subsequent reference data, in each data protection type. In other words, the valid/invalid flag 854 designates whether access translation is possible or impossible.

For instance, when 1 is set in the use-state field 853, it designates "in use," while when 0 is set therein, it designates "not in use."

Further, when the valid/invalid flag 854 has a value of 1, it designates "valid," while when it has a value of 0, it designates "invalid." When the valid/invalid flag 854 designates "valid," data referred to in a page table entry can be used in the instruction execution unit 45. When the valid/invalid flag 854 designates "invalid," data referred to in a page table entry can not be used in the instruction execution unit 45.

In the description below, subsequent reference data means data to be actually used subsequently by the secure VMM 68 or a guest OS when certain data in the guest OS is copied and hence stored in a plurality of areas (e.g., in the external memory 7 and the internal memory 8). For example, when data is not read into the internal memory 8 in the each-time verification, the data of state ND1 which is not unverified, stored in the external memory 7, and not yet read into the internal memory 8 is subsequent reference data. Further, when data of state ND1 stored in the external memory 7 is verified and read into the internal memory 8, data of verified state ND2 stored in the internal memory 8 is subsequent reference data. The subsequent reference data in the internal memory 8 is referred to or flushed by the guest OS. When a verifier (such as a MAC value) is re-calculated for data of state ND2 in the internal memory 8, data of state ND2 is stored in the external memory 7, and the data of state ND2 stored in the internal memory 8 is erased, unverified data of state ND1 stored in the external memory 7 becomes the subsequent reference data.

In the each-time verification, data transitions between state ND1 and state ND2. States ND1 and ND2 differ in states according to storage positions of data images, verification execution, MAC value calculation, or the like. In the each-time verification, if subsequent reference data has state ND1 (that means unverified data in the external memory 7), it is always subjected to verification. If the subsequent reference data is encrypted, it is decrypted. Then, the subsequent reference data is stored in the internal memory 8. Data reference by the instruction execution unit 45 is performed to subsequent reference data of state ND2 (that means verified data in the internal memory 8). When the subsequent reference data of state ND2 is written to the external memory 7, a MAC value of the subsequent reference data is calculated. Further, if protection by encryption is set for the subsequent reference data, the subsequent reference data is encrypted. Then, the subsequent reference data is stored in the external memory 7. The subsequent reference data stored in the internal memory 8 becomes state ND1 (that means unverified data in the external memory 7). Thus, if protection by encryption is set, a decryption is performed on a copy of subsequent reference data from the external memory 7 to the internal memory 8, and an encryption is performed when subsequent reference data is write from the internal memory 8 and written to the external memory 7. When subsequent reference data is again copied from the external memory 7 to the internal memory 8, subsequent reference data of state ND1 is read from the external memory 7, and is verified, decrypted, and stored in the internal memory 8, where the subsequent reference data is set to state ND2. Data reference is performed to subsequent reference data of state ND2.

In the one-time verification, data transits between state ND4 and state ND5. In the one-time verification according to the present embodiment, a data image may be stored at the same address in state ND4 and state ND5. In the one-time verification, when subsequent reference data has state ND3 (that means unverified data in the external memory 7), the subsequent reference data is verified in the external memory 7, without being copied to the internal memory 8. When protection by encryption is set, the subsequent reference data in the external memory 7 is verified and decrypted. An update of a MAC value for the subsequent reference data of state ND4 (that means verified data in the external memory 7) during use in the external memory 7 is executed until a subsequent power down. At the time of power down, the subsequent reference data of state ND4 is returned to state ND3 (that means unused data in the external memory 7). When protection by encryption is set, the subsequent reference data of state ND4 in the external memory 7 is again encrypted. Then re-encrypted subsequent reference data is set to state ND3.

When verification is not instructed, verification is not performed on subsequent reference data of state ND5 in the external memory 7. The instruction execution unit 45 can refer to the unverified subsequent reference data of state ND5 stored in the external memory 7. In no verification, termination processing is not performed at the time of power down, either.

The above-mentioned data writing, MAC-value calculation and data re-encryption may be executed only when data is updated, as described in the second embodiment. Thus, as the second embodiment, it may be determined whether there is a data update, before data writing, MAC-value calculation or data re-encryption. However, for simplifying the description, only an operation when a data update is performed will be described.

For a page table, verification is performed each time. Therefore, the same processing as in the first and second embodiments is executed to the page table. For simplifying the description, in the present embodiment, a description will be given only of verification of data, and the verification of the page table will be omitted.

(Verification Processing)

A description will be given only of a portion of verification processing differing from the second embodiment.

An page table entry corresponding to read target data includes any of following states in an initial state after power-up.

Each-time verification (ETV): D/F flag=F: valid/invalid flag=0 (state ND1)

One-time verification (OTV): D/F flag=F: valid/invalid flag=0 (state ND3)

No verification (NOV): D/F flag=F: valid/invalid flag=0 (state ND5)

Power down processing in which the information is set to a control field in the initial state, will be described later.

As described above, even in the one-time verification, the page table is verified each time. Therefore, the processing up to data verification is the same as that of the first and second embodiments. A description will hereinafter be given of only processing different from that of the first and second embodiments.

Figure 36:
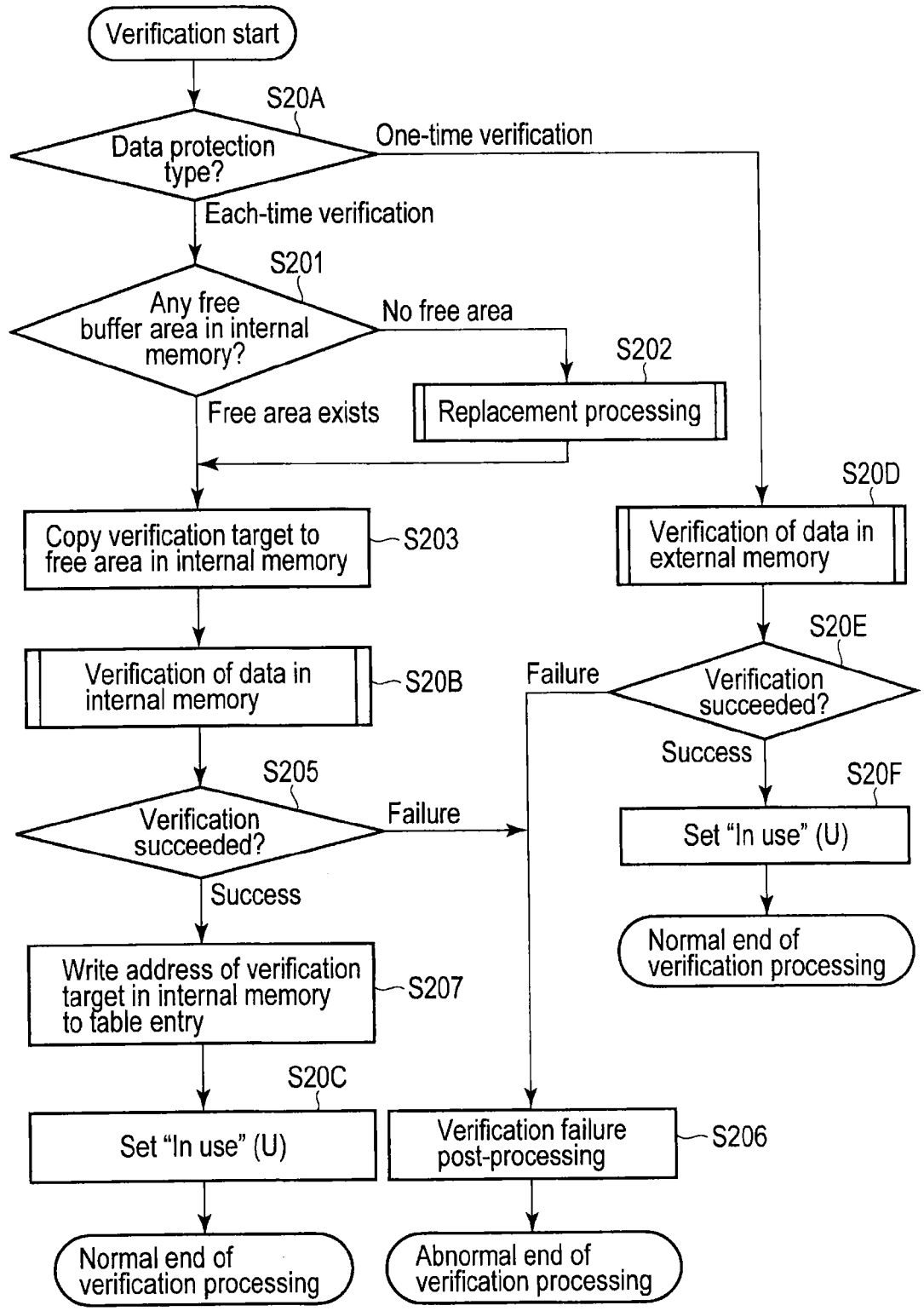
FIG. 36 is a flowchart showing an example of verification processing corresponding to data protection types according to the eighth embodiment.

FIG. 36 is a flowchart showing an example of verification processing corresponding to data protection types according to the present embodiment.

Verification processing of FIG. 36 can be performed as the verification processing in step S103 included in the address resolution processing of FIG. 12.

Firstly, in step S20A, the secure VMM 68 determines a data protection type set in a page table entry that refers to target data.

When the data protection type is each-time verification, the processing proceeds to step S201.

When the data protection type is one-time verification, the processing proceeds to step S20D.

After step S203, the secure VMM 68 verifies target data in the internal memory 8 in step S20B. The processing in step S20B will be described later referring to FIG. 37. After step S20B, the processing proceeds to step S205.

After step S207, in step S20C, the secure VMM 68 sets information designating "in use," to the use-state field 853 in the page table entry referring to the target data (in other words, "not in use" is changed to "in use"), thereby normally finishing the processing.

In step S20D, the secure VMM 68 executes verification on the target data in the external memory 7. The processing of step S20D will be described later referring to FIG. 38. Although in step S20D, a verification target data is read from the external memory 7, a MAC value for verification is calculated, and the verification is executed, the read data is not transferred to the internal memory 8.

In step S20E, the secure VMM 68 determines whether the verification is successful.

When the verification is in failure, the processing proceeds to step S206.

When the verification is successful, the secure VMM 68 sets, in step S20F, information designating "in use" in the use-state field 853 in the page table entry referring to the target data, thereby normally terminating the processing.

When the verification is successful in one-time verification, a page table entry which refers data is validated to thereby resume the data reference processing, as in the case where verification is successful in the each-time verification.

FIG. 37 is a flowchart showing an example of processing of verifying data in the internal memory 8. FIG. 37 corresponds to step S20B of FIG. 36.

In step S1101, the secure VMM 68 determines whether protection by encryption is set in the encryption field 852 of a page table entry that refers to target data.

When protection by encryption is not set, the processing proceeds to step S1103.

In contrast, when protection by encryption is set in step S1102, the secure VMM 68 decrypts target data in the external memory 7, and stores the target data in the internal memory 8.

In step S1103, the secure VMM 68 verifies the data read into the internal memory 8.

FIG. 38 is a flowchart showing an example of processing of verifying data in the external memory 7. FIG. 38 corresponds to step S20D of FIG. 36.

In step S1201, the secure VMM 68 determines whether protection by encryption is set in the encryption field 852 in a page table entry which refers to target data.

When protection by encryption is not set, the processing proceeds to step S1203.

In contrast, when protection by encryption is set, the secure VMM 68 decodes the target data in the external memory 7 in step S1202.

In step S1203, the secure VMM 68 verifies the target data in the external memory 7.

(Flush Processing)

In the one-time verification, data is verified only one time, and is not read into the internal memory 8. Therefore, the data of the one-time verification is not regarded as a target to be flushed from the internal memory 8 into the external memory 7.

In the one-time verification, data subjected to verification one time and changed to "in use" data has its "in use" state maintained until power is interrupted, and is directly referred to in the external memory 7 in accordance with a data reference request by a guest OS.

In the one-time verification, when an upper-level page table referring to target data is flushed from the internal memory 8 to the external memory 7, processing, such as calculation of a MAC value for the target data to be referred to, is not executed.

Moreover, when the upper-level page table is flushed from the internal memory 8 to the external memory 7, a MAC value for the upper-level page table itself is calculated, and the upper-level page table is read from the internal memory 8 and written to the external memory 7. However, the page table entries in the upper-level page table are not invalidated. Accordingly, when data is again referred to, it is sufficient if a corresponding upper-level page table is again read from the external memory 7, verified, and written into the internal memory 8. The upper-level page table which is stored again in the internal memory 8 already designates a valid state. Namely, in reference to data for which "in use" is set in the page table entry in the upper page table, it is not necessary to validate the page table entry in the upper page table.

(Power Down Pre-Processing)

As described above, data for which "in use" is set in a page table entry in a higher-level page table, is directly referred to by the external memory 7 until power down.

Before the power down, MAC-value calculation, encryption, and update of the page table entry of the higher-level page table referring to the data are executed to the data, for which "in use" is set. As a result, the above-described verification processing can be appropriately executed when power is supplied again.

Figure 39:
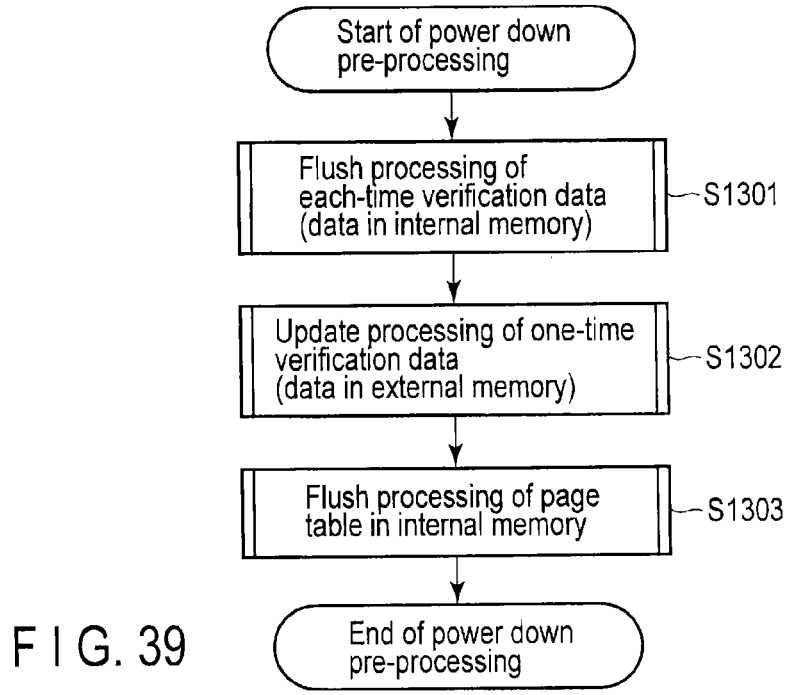
FIG. 39 is a flowchart showing an example of power down pre-processing according to the eighth embodiment.

FIG. 39 is a flowchart showing an example of power down pre-processing according to the present embodiment.

In step S1301, the secure VMM 68 performs flush processing on data in the internal memory 8, for which each-time verification is set.

In step S1302, the secure VMM 68 performs update processing on data in the external memory 7, for which one-time verification is set.

In step S1303, the secure VMM 68 performs flush processing on a page table in the internal memory 8, as described above referring to FIG. 6.

Figure 40:
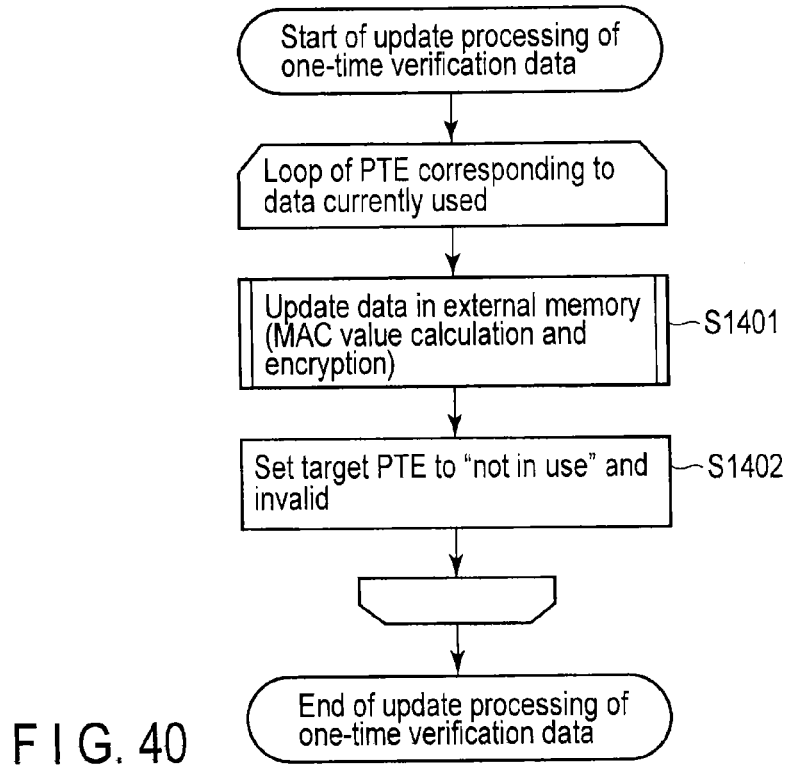
FIG. 40 is a flowchart showing an example of update processing of data for which one-time verification is set, according to the eighth embodiment.

FIG. 40 is a flowchart showing an example of update processing of data for which the one-time verification is set, according to the present embodiment. FIG. 40 corresponds to step S1302 of FIG. 39.

Processing of FIG. 40 is repeatedly performed on a page table entry in a higher-level page table, for which "in use" is set.

In step S1401, the secure VMM 68 updates a MAC value of target data stored in the external memory 7, and encrypts the data when protection by encryption is set.

In step S1402, the secure VMM 68 sets "not in use" and "invalid" in a page table entry in a higher-level page table that refers to the target data.

FIG. 41 is a flowchart showing an example of update processing for data stored in the external memory according to the present embodiment. FIG. 41 corresponds to step S1401 of FIG. 40.

In step S1501, the secure VMM 68 calculates a MAC value of target data stored in the external memory 7.

In step S1502, the secure VMM 68 determines whether protection by encryption is set in the encryption field 852 in the page table entry which refers to the target data.

If protection by encryption is not set, the update processing is terminated.

If protection by encryption is set, the secure VMM 68 encrypts the target data in the external memory 7 in step S1503.

According to the power down pre-processing described above, "not in use" and "invalid" is set for a page table entry which refers data of the one-time verification. Then, when data is referred to after a subsequence power on, verification is executed for least one time which is less than times of data reference for data in the external memory 7. That is, a failure of address translation occurs at a first time of reference for certain data, and at least one of verification is executed based on the failure.

As described above, in the power down pre-processing, MAC-value calculation and encryptions are executed on all data, for which "in use" are set in page table entries in the higher-level page table, thereby changing contents of setting in the page table entries from "in use" to "not in use." The combination of the MAC value calculation, the encryption and the change of setting in the page table entry is called verification update processing. In the counter type described by the above-described second embodiment, update of a counter value is also included in the verification update processing. In parallel with the above, MAC value calculation is also performed on a higher-level page table that will be influenced by the MAC value calculation, and verification update processing is sequentially executed for a page table for which verification update processing for all lower page table are completed. Verification update processing for a page table of the one-time verification is similar to that for a page table of the each-time verification.

In the flowchart of FIG. 39, as the power down pre-processing, sequentially executed are, flush processing of flushing data, which is stored in the internal memory 8 and for which the each-time verification is set, into the external memory 7, verification update processing on data, which is stored in the external memory 7 and for which the one-time verification is set, and flush processing of flushing a page table from the internal memory 8. The processing do not have to be always executed in this order, and may be executed in a different order. However, the flush processing of flushing a page table from the internal memory 8 must be executed lastly, because it depends upon the data flushing processing and the verification update processing. Moreover, it may be necessary to re-read a reference source page table that was once flushed during the verification update processing, in processing which executes the verification update processing for each data protection type for a page table for which various data protection types are set. Then, when various data protection types are set for a data reference source page table, verification update processing is executed altogether for various data protection types included in the data reference source page table. Therefore, the number of re-reads of a data reference source page table can be reduced.

In the counter type, a counter value corresponding to low-level data is needed for MAC value calculation of a higher-level page table. However, a MAC value of low-level data is not necessary for the MAC value calculation of the higher-level page table.

Therefore, in the one-time verification, when a page table entry in a certain page table of the one-time verification becomes "in use," a counter value is incremented by one, whereby verification update processing of this page table becomes executable without waiting for update of a lower-level page. Therefore, when the counter type is used, verification update processing on data of one-time verification at the time of power down can be executed independently of verification update processing of a page table. However, when a state of data or address information is stored in a page table, it is necessary to read the page table into the internal memory 8. In this case, if state information of currently used data, control information, or address information is managed by, for example, a temporary list aside from a page table, re-reading of the page table can be avoided for data update at the time of power down. When data of the one-time verification and, data of the each-time verification and no verification are existed, and when the total number of data in use is small, the size of the above-mentioned temporary list is smaller than the page table.

Then, a time required for processing at the time of power down can be shortened, with a capacity of the internal memory 8 saved.

(Structure)

FIG. 42 is a block diagram showing an example of a structure of the memory management device 1 according to the present embodiment.

The verification calculation unit 4 of the memory management device 1 includes a type determination unit 99.

The memory management device 1 further includes power down pre-processing unit 98.

The type determination unit 99 determines a set data protection type included in the plurality of data protection types, and switches processing in accordance with a result of the determination.

The power down pre-processing unit 98 performs the power down pre-processing explained with reference to FIG. 39.

In the above-described present embodiment, the same hierarchical verification as that of the above-described first to seventh embodiments is applicable, and a plurality of data protection types that have different attack resistances and overheads can be made to coexist. Data protection types may be allocated to respective guest OSs. Alternatively, data protection types may be allocated to respective data in one guest OS. Contents of verification processing functions correctly in accordance with data protection types allocated to respective data.

In the one-time verification, a size of data is not restricted to a size of data that can be stored in the internal memory 8, and therefore, even data of such a large size as 2 megabytes can be processed.

Ninth Embodiment

In the above-described eighth embodiment, the external memory 7 is assumed to be a nonvolatile memory, such as an MRAM, which can executes word access. However, at present, a flash memory, wherein the unit of access is limited to a page and the number of writes is limited, is more advantageous than the word-accessible nonvolatile memory for bit price. In a present embodiment, a description will be given of a case where the above-mentioned data protection types are applied to an external main memory device obtained by combining a nonvolatile memory (nonvolatile page memory), such as a flash memory, with a nonvolatile memory (nonvolatile word-access memory), such as a dynamic random access memory (DRAM).

FIG. 43 is a block diagram showing an example of a hardware configuration of an information processing device 65 according to the present embodiment.

A processor 66, a nonvolatile memory 400 and a volatile memory 401 can transmit and receive data, signal and instruction therebetween via the external bus 44.

As described above, as the nonvolatile memory 400, a flash memory is used, for example. As a volatile memory, a DRAM is used, for example. However, various other types of memories can be used when those memories have similar properties.

Although DRAMs are volatile, they allow word access, and the number of possible rewrites is effectively infinite. A main memory can be formed at low cost, using a DRAM as a temporary buffer memory for a flash memory that is inexpensive in bit price.

If a volatile DRAM is used, it is advantageous that data as a secret target will disappear from the DRAM after a certain period elapses from power down. This is especially advantageous in combination with processing of encrypted data in the above-mentioned one-time verification.

A description will hereinafter be given of an example in which the above-described three data protection types are applied to a case where the external memory 7 includes the combination of the nonvolatile memory 400 and the volatile memory 401.

The nonvolatile memory 400 stores the secure VMM 68, the secure OS 56, and the non-secure OS 57 in a stop state.

(Access to the Nonvolatile Memory 400)

For example, the nonvolatile memory 400 limited to access page by page is not directly mapped to physical memory addresses (i.e., mapping is not made between the nonvolatile memory 400 and the physical memory addresses), but is accessed via a controller. In this case, in the nonvolatile memory 400, physical addresses are not necessarily given to respective pages. The present embodiment is directed to a case where a data transfer between the nonvolatile memory 400 and the volatile memory 401 or the internal memory 8 is executed page by page. When a page is transferred, if the information processing device 65 appropriately recognizes an access destination in the nonvolatile memory 400, the information processing device 65 can operate even if mapping is not made between the nonvolatile memory 400 and the memory addresses. Specifically, in access to the nonvolatile memory 400, a translation destination physical address held by a page table is changed to a data block identifier of the flash memory, based on a DRAM/flash (D/F) flag described later. The nonvolatile memory 400 is accessed based on the data block identifier obtained as a result of this change.

For simplifying the description below, a case where mapping is made between the nonvolatile memory 400 and the memory addresses will be described as an example.

(Operations in the Plurality of Data Protection Types)

Figure 44:
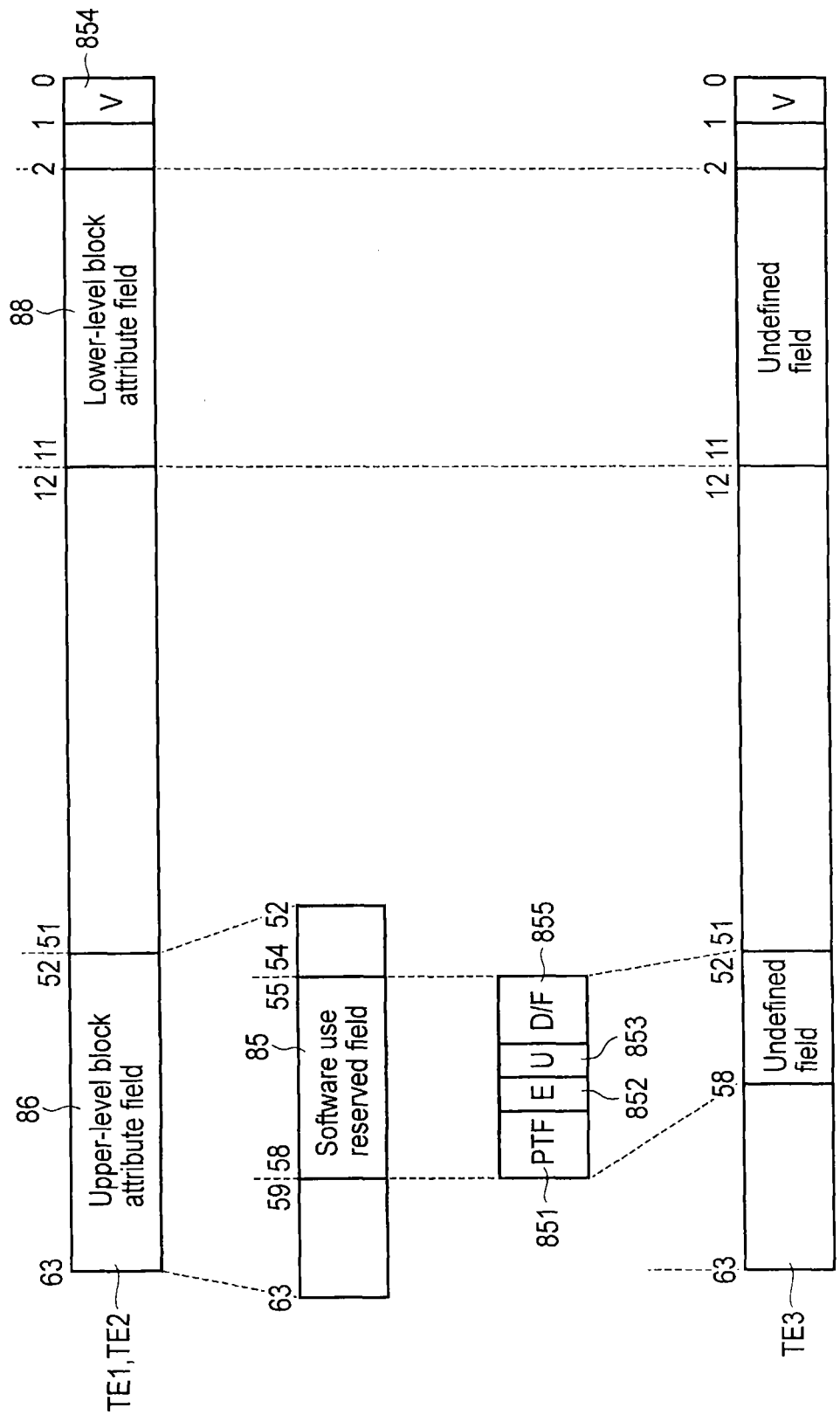
FIG. 44 is a data structure diagram showing an example of a field format of a page table entry according to the ninth embodiment.

FIG. 44 is a data structure diagram showing an example of a field format of a page table entry according to the present embodiment. FIG. 44 shows a modification of the page table entry of FIG. 33.

For instance, the software use reserved field 85 includes the data protection type field 851, the encryption field 852, the use-state field 853, and the D/F flag 855.

The D/F flag 855 designates whether subsequent reference data is stored in either the volatile memory 401 or the internal memory 8, or whether it is stored in the nonvolatile memory 400.

For example, if D is set in the D/F flag 855, it designates that subsequent reference data is stored in either the volatile memory 401 or the internal memory 8. If F is set in the D/F flag 855, it designates that subsequent reference data is stored in the nonvolatile memory 400.

FIG. 45 is a state transition diagram showing an example of a copy state and verification state of data in each data protection type, according to the present embodiment. In FIG. 45, subsequent reference data is stored in the nonvolatile memory 400, the volatile memory 401 or the memory 8.

FIG. 46 is a view showing an example of a relationship between states of the data protection type field 851 in a page table entry, states of the D/F flag 855, states of the valid/invalid flag 854, states of subsequent reference data, and symbols designating states of the subsequent reference data, according to data protection types.

Portions different from those of the above-described second and eighth embodiments will now be described.

In the each-time verification, data transits between state ND6 to state ND8. State ND6 to state ND8 differ in a data storage position, a state of verification execution, and MAC value calculation, etc.

In the each-time verification, if subsequent reference data of state ND6 is stored in the nonvolatile memory 400, the subsequent reference data is certainly verified and then stored in the internal memory 8. In this case, if a protection by an encryption is set, the subsequent reference data is both verified and decrypted. Data reference by the instruction execution unit 45 is performed on subsequent reference data of state ND7 (designating already verified data in the internal memory 8). If the subsequent reference data of state ND7 is read from the internal memory 8 and written to the external memory 7 during operation, a MAC value of the subsequent reference data is calculated. In this case, if the protection by the encryption is set, the subsequent reference data is encrypted and is stored in the volatile memory 401, and the subsequent reference data stored in the volatile memory 401 set to state ND8 (designating unverified data in the volatile memory 401). If subsequent reference data is referred to again, the subsequent reference data of state ND8 is read from the volatile memory 401 and verified. In this case, if the protection by the encryption is set, the subsequent reference data is decrypted and is stored in the in the internal memory 8, and the subsequent reference data stored in the internal memory 8 set to state ND7. The subsequent reference data of state ND7 is referred to by the instruction execution unit 45.

When subsequent reference data is stored in the internal memory 8 in power down, a MAC value of the subsequent reference data in the internal memory 8 is calculated. In this case, when protection by encryption is set, the subsequent reference data is decrypted. Then, the subsequent reference data is stored in the nonvolatile memory 400, and the subsequent reference data stored in the nonvolatile memory 400 becomes state ND6 (designating unverified data in the nonvolatile memory 400).

When subsequent reference data is stored in the volatile memory 401 in power down, the subsequent reference data stored in the volatile memory 401 is transferred to the nonvolatile memory 400, and the subsequent reference data is stored in the nonvolatile memory 400. Then, the subsequent reference data stored in the nonvolatile memory 400 becomes state ND6 (designating unverified data in the nonvolatile memory 400). When subsequent reference data is read from the internal memory 8 and written to the volatile memory 401, MAC value calculation and encryption of subsequent reference data are already executed. Accordingly, when the subsequent reference data is transferred from the volatile memory 401 to the nonvolatile memory 400, neither of MAC value calculation and encryption of the subsequent reference data is needed.

In the one-time verification, data transits between state ND9 and state ND10. States ND9 and ND10 differ in states according to storage positions of data images, verification execution, MAC value calculation, or the like. In the one-time verification, when subsequent reference data assumes state ND9 (designating unverified data in the nonvolatile memory 400), the subsequent reference data is verified. In this case, when protection by encryption is set, the subsequent reference data is decrypted. The subsequent reference data is stored in the volatile memory 401. Then, the subsequent reference data stored in the volatile memory 401 is set to state ND10 (designating verified data in the volatile memory 401). In data reference by the instruction execution unit 45, data copy from the volatile memory 401 to the internal memory 8 is not performed. The data reference by the instruction execution unit 45 is executed for the subsequent reference of state ND10. When the subsequent reference data of state ND10 is read from the volatile memory 401 and written to the nonvolatile memory 400, a MAC value of the subsequent reference data is calculated. In this case, if protection by encryption is set, the subsequent reference data is encrypted. The subsequent reference data of state ND9 is stored in the nonvolatile memory 400. Then, the subsequent reference data stored in the nonvolatile memory 400 is set to state ND9 (designating unverified data in the nonvolatile memory 400) is stored in the nonvolatile memory 400. MAC value calculation of subsequent reference data stored in the volatile memory 401 and writing from the volatile memory 401 to the nonvolatile memory 400, are performed until subsequent power down.

In the no verification, data transits between state ND11 and state ND12. States ND11 and ND12 differ in data storage positions. In the no verification, if subsequent reference data is set to state ND11 (nonvolatile memory 400), the subsequent reference data is transferred to the volatile memory 401. The subsequent reference data in the volatile memory 401 is set to state ND12 (volatile memory 401). In the data reference by the instruction execution unit 45, data copy from the volatile memory 401 to the internal memory 8 is not performed. The data reference by the instruction execution unit 45 is performed on the subsequent reference data of state ND12. When the subsequent reference data of state ND12 is transferred from the volatile memory 401 to the nonvolatile memory 400, the subsequent reference data is stored in the nonvolatile memory 400. Then, the subsequent reference data stored in the nonvolatile memory 400 becomes state ND11. Transfer of the subsequent reference data from the volatile memory 401 to the nonvolatile memory 400 is performed by subsequent power down.

Also in the present embodiment, data writing, MAC value calculation and data re-encryption may be executed only when data is updated, as in the above-described eighth embodiment.

Also in the present embodiment, a page table is verified every time, as in the eighth embodiment. Therefore, to simplify the description, in the present embodiment, only data verification will be described, and a page table verification will be omitted. Further, the matters similar to those of the above-described embodiments will be omitted.

(Verification Transfer Processing)

Each page table entry of data as a read target includes one of the following states upon power on:

Each-time verification (ETV): D/F flag=F: valid/invalid flag=0 (state ND6)

One-time verification (OTV): D/F flag=F: valid/invalid flag=0 (state ND9)

No verification (NOV): D/F flag=F: valid/invalid flag=0 (state ND11)

Figure 47:
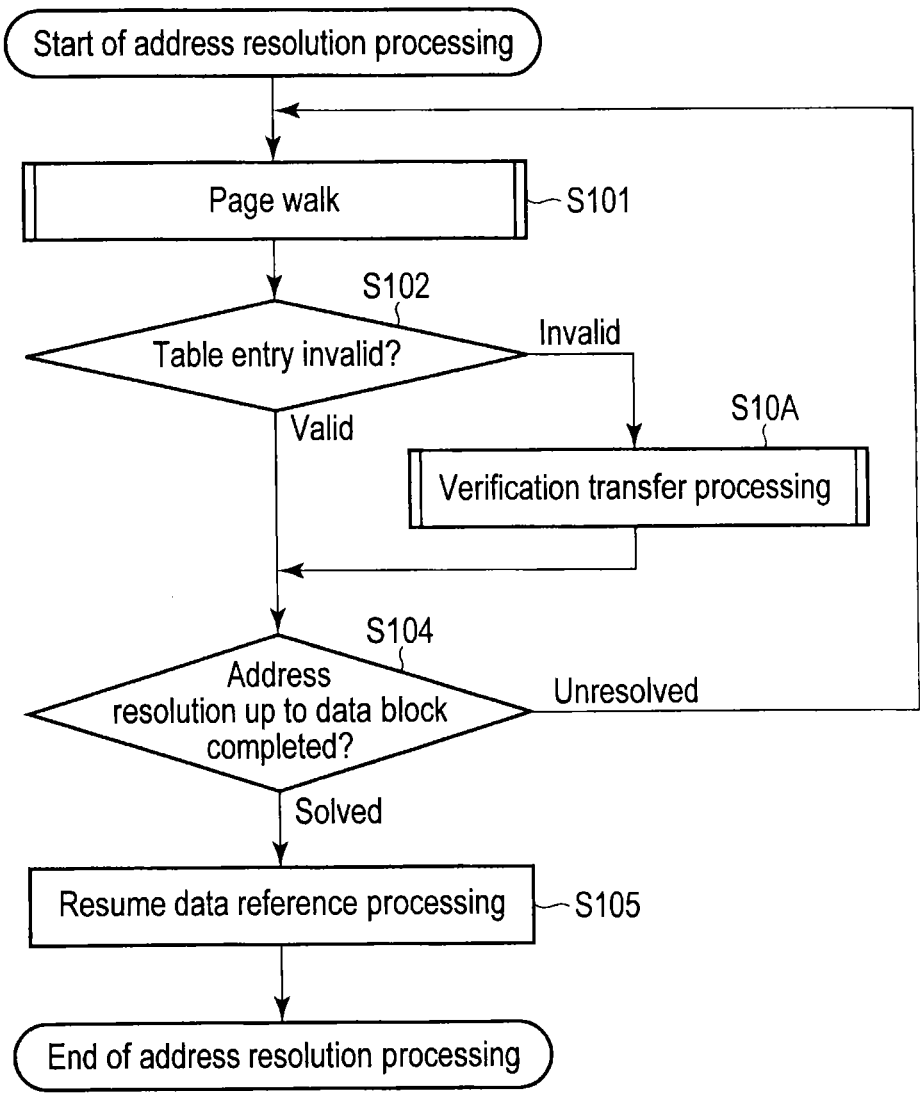
FIG. 47 is a flowchart showing an example of address resolution processing according to the ninth embodiment.

FIG. 47 is a flowchart showing an example of address resolution processing according to the present embodiment.

If it is determined in step S102 that a table entry is invalid, control is transferred from the MMU 46 to the secure VMM 68, and the secure VMM 68 executes, in step S10A, verification transfer processing described later referring to FIG. 48. After that, the address resolution processing proceeds to step S104.

Figure 48:
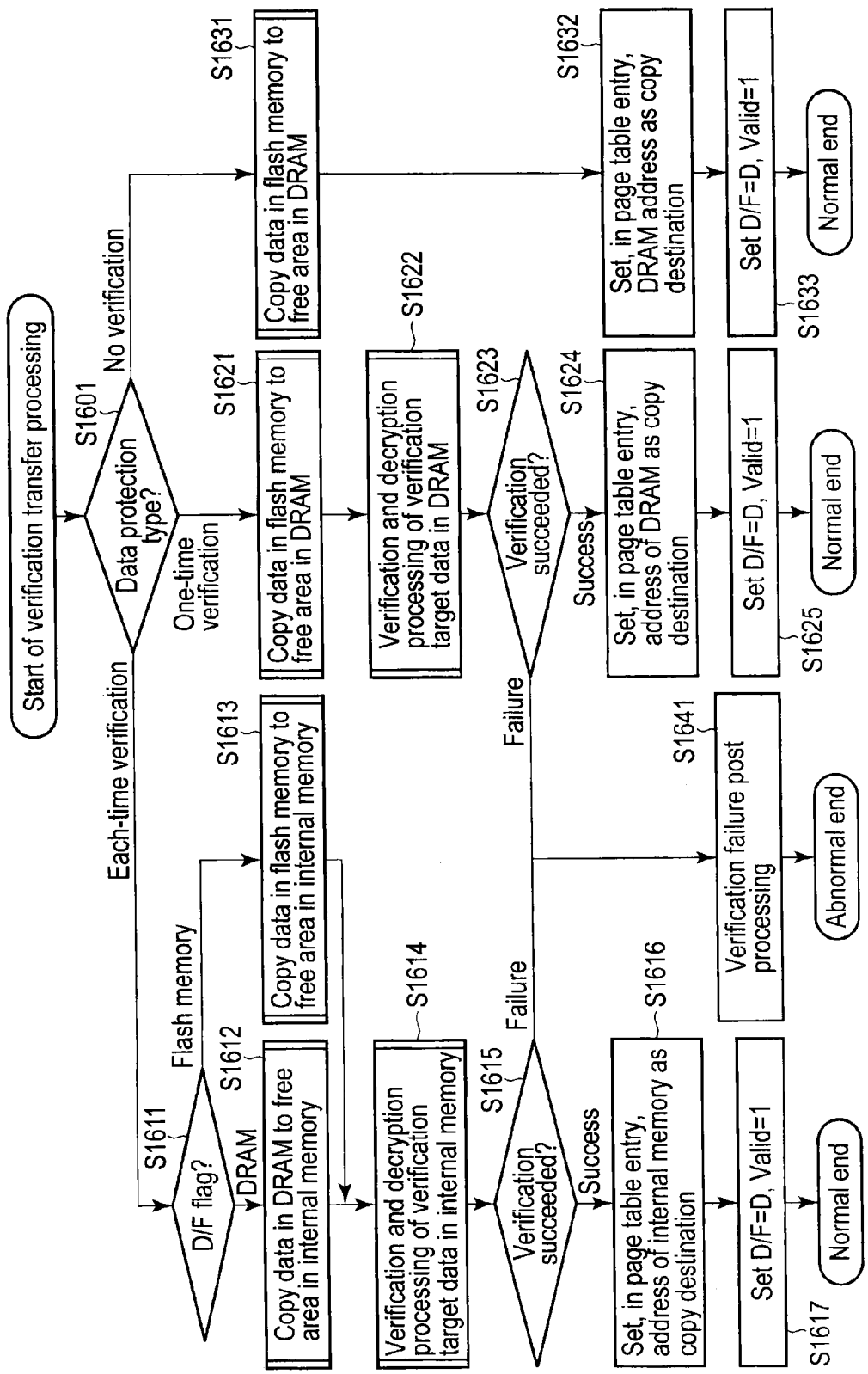
FIG. 48 is a flowchart showing an example of verification transfer processing corresponding to the data protection types according to the ninth embodiment.

FIG. 48 is a flowchart showing an example of verification transfer processing corresponding to the data protection types according to the present embodiment. Processing of FIG. 48 is called out as the verification transfer processing in step S10A of the address resolution processing of FIG. 47.

In FIG. 48, although the nonvolatile memory 400 is referred to as a flash memory, and the volatile memory 401 is referred to as a DRAM, they are not limited to them as aforementioned. The same can be said of the figures referred to below.

In step S1601, the secure VMM 68 determines a data protection type, based on information set in a page table entry which refers to data. If the data protection type is the each-time verification, the verification transfer processing proceeds to step S1611. If the data protection type is the one-time verification, the verification transfer processing proceeds to step S1621. If the data protection type is the no verification, the verification transfer processing proceeds to step S1613.

If the data protection type is the each-time verification, the secure VMM 68 determines, in step S1611, whether the D/F flag 255 designates a DRAM or a flash memory.

If the D/F flag 255 designates the DRAM, the secure VMM 68 copies, in step S1612, target data in the DRAM to an empty area in the internal memory 8.

If the D/F flag 255 designates the flash memory, the secure VMM 68 copies, in step S1612, target data in the flash memory to an empty area in the internal memory 8.

In step S1614, the secure VMM 68 performs verification and decryption processing on verification target data in the internal memory 8.

In step S1615, the secure VMM 68 determines whether the verification is successful.

If the verification is successful, the secure VMM 68 sets, in a page table entry in step S1616, an address in the internal memory 8 as a data copy destination.

In step S1617, the secure VMM 68 sets D in the D/F flag 855 of the page table entry, and sets 1 in the valid/invalid flag 854. Then, the verification transfer processing is terminated.

If the verification is in failure, the verification transfer processing proceeds to step S1641.

In step S1641, the secure VMM 68 performs verification failure post processing. Then, the verification transfer processing is terminated.

If the data protection type is the one-time verification, the secure VMM 68 copies, in step S1621, target data in the flash memory to an empty area in the DRAM.

In step S1622, the secure VMM68 performs verification and decryption processing of verification target data in the DRAM.

In step S1623, the secure VMM 68 determines whether the verification is successful.

If the verification is in failure, the verification transfer processing proceeds to the above-mentioned step S1641.

In contrast, if the verification is successful, the secure VMM 68 sets, in a page table entry in step S1624, an address in the DRAM as a copy destination of target data.

In step S1625, the secure VMM 68 sets D in the D/F flag 855 of the page table entry, and sets 1 in the valid/invalid flag 854. Then, the verification transfer processing is terminated.

If the data protection type is the no verification, the secure VMM 68 copies, in step S1631, target data in the flash memory to an empty area in the DRAM.

In step S1632, the secure VMM 68 sets, in a page table entry, an address in the DRAM as a copy destination of target data.

In step S1633, the secure VMM 68 sets D in the D/F flag 855 of the page table entry, and sets 1 in the valid/invalid flag 854. Then, the verification transfer processing is terminated.

(Flush Processing)

Flush processing according to the present embodiment includes two types of processing, i.e., flush processing of flushing data from the internal memory 8 to the volatile memory 401 or the nonvolatile memory 400, and flush processing of flushing data from the volatile memory 401 to the nonvolatile memory 400. The flush processing of flushing data from the volatile memory 401 to the nonvolatile memory 400 is basically the same as flush processing before power down shown in FIG. 51 and described later, and is therefore not be described. A description will be given only of the flush processing of flushing data from the internal memory 8 during operation to the volatile memory 401. This flush processing from the internal memory 8 to the volatile memory 401 is executes for data as a target of the each-time verification.

Figure 49:
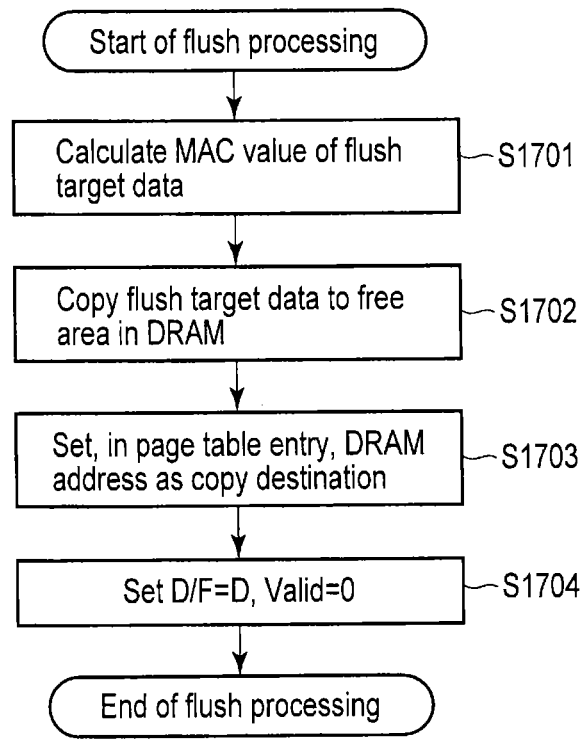
FIG. 49 is a flowchart showing an example of flush processing of flushing data from the internal memory during operation to a volatile memory according to the ninth embodiment.

FIG. 49 is a flowchart showing an example of the flush processing of flushing data from the internal memory 8 during operation to the volatile memory 401 according to the present embodiment.

In step S1701, the secure VMM 68 calculates the MAC value of data as a flush target.

In step S1702, the secure VMM 68 copies the flush target data to an empty area of the DRAM.

In step S1703, the secure VMM 68 sets, in a page table entry, an address in the DRAM as a copy destination of the flush target data.

In step S1704, the secure VMM 68 sets D and 0 in the D/F flag 855 and the valid/invalid flag 854 of the page table entry, respectively. Then, the flush processing is terminated.

(Power Down Pre-Processing)

Figure 50:
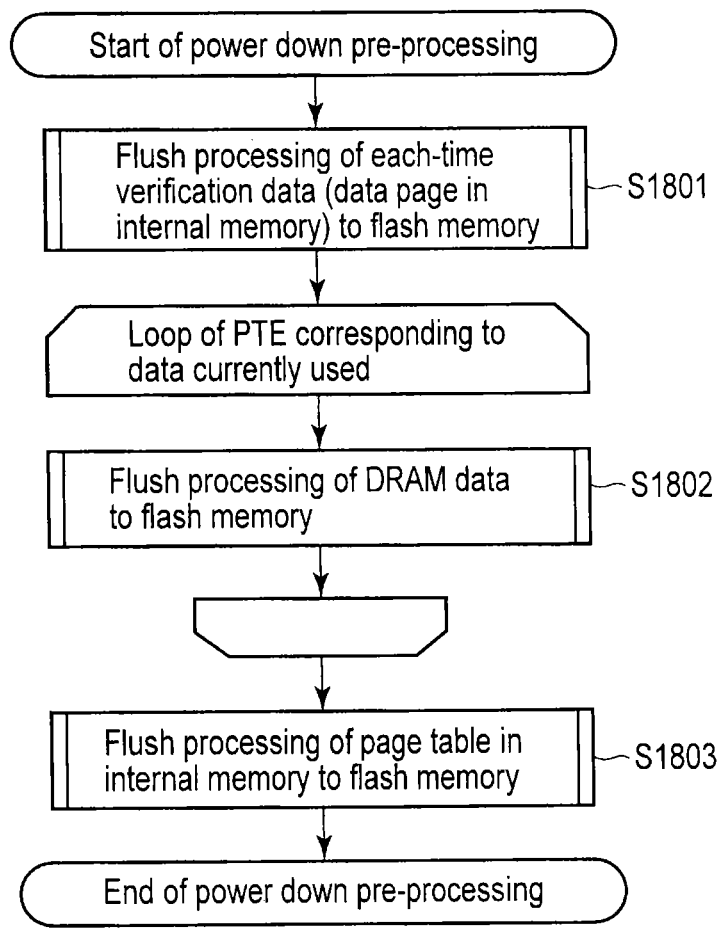
FIG. 50 is a flowchart showing an example of power down pre-processing according to the ninth embodiment.

FIG. 50 is a flowchart showing an example of power down pre-processing according to the present embodiment.

In step S1801, the secure VMM 68 performs flush processing of flushing data, to a flash memory, data which is stored in the internal memory 8 and for which each-time verification is set.

Subsequently, step S1802 is repeated for a page table entry in each higher-level page table that refers to the data in which "in use" is set.

In step S1802, the secure VMM 68 performs the flush processing of flushing data in the DRAM to the flash memory.

By thus executing step S1801, and repeating step S1802 for all higher-level page tables that refers to data for which "in use" is set, write processing for data of a guest OS in the internal memory 8 and the DRAM is completed.

Subsequently, in step S1803, the secure VMM 68 performs flush processing for copying a page table in the internal memory 8 from the internal memory 8 to the flash memory. Then, the flush processing is terminated.

Figure 51:
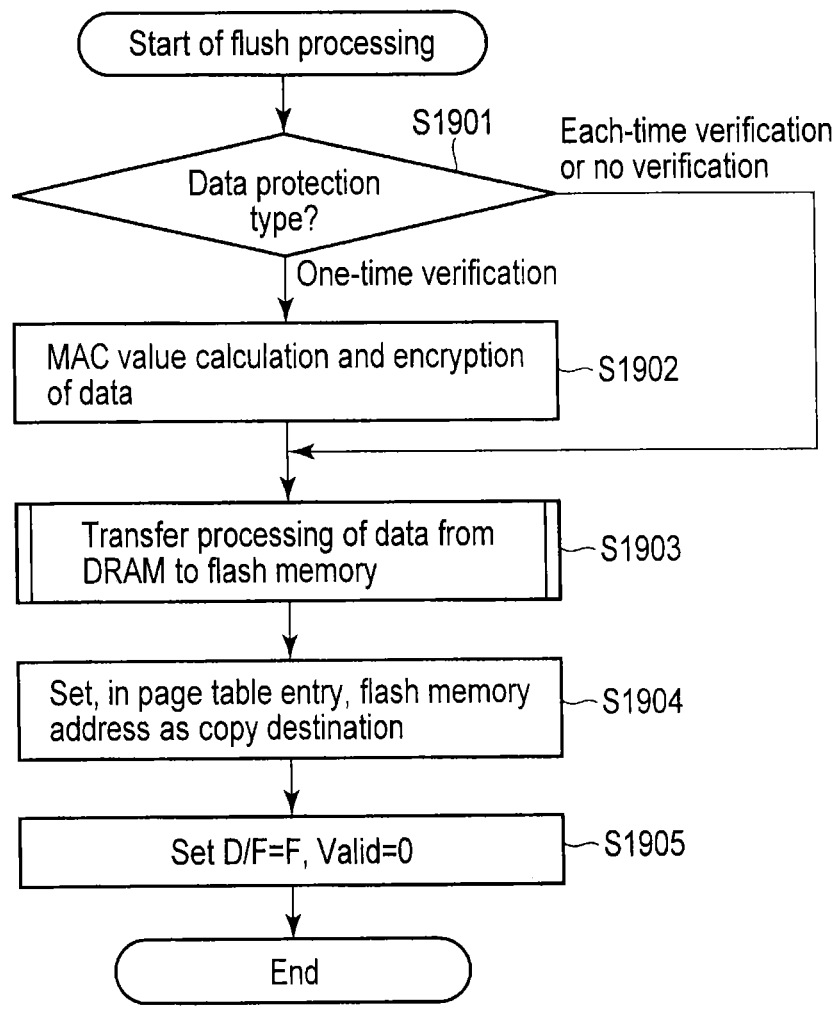
FIG. 51 is a flowchart showing an example of flush processing of flushing from the volatile memory to the nonvolatile memory according to the ninth embodiment.

FIG. 51 is a flowchart showing an example of flush processing of flushing from the volatile memory 401 to the nonvolatile memory 400 according to the present embodiment.

In step S1901, the secure VMM 68 determines a data protection type, based on information set in a page table entry which refers to data.

If the data protection type is the one-time verification, the secure VMM68 performs, in step S1902, MAC value calculation and encryption processing of data. The MAC value calculation and the encryption processing of step S1902 in the case of the one-time verification may be performed by the secure DMA controller 52 in parallel with data transfer.

If the data protection type is the each-time verification or the no verification, the flush processing proceeds to step S1903. In the each-time verification, the MAC value calculation and the encryption processing are performed when data is flushed from the internal memory 8. Further, in the no verification, neither of the MAC value calculation and the encryption processing of data is necessary.

Regardless of whether the data protection type is the each-time verification, the one-time verification or the no verification, the secure VMM 68 performs, in step S1903, processing of transferring (copying) data from the DRAM to the flash memory.

In step S1904, the secure VMM 68 sets, in the page table entry, an address in the flash memory as a data copy destination.

In step S1905, the secure VMM 68 sets F and 0 in the D/F flag 855 and the valid/invalid flag 854 of the page table entry, respectively. Then the flush processing is terminated.

In the above-described present embodiment, the nonvolatile memory 400 formed of, for example, a relatively inexpensive flash memory, and the nonvolatile memory 401 formed of, for example, a DRAM, are used, instead of an expensive nonvolatile random access memory, such as an MRAM, and one of the three protection types is executed on data. Therefore, this embodiment enables an overhead of the processor 66 to be reduced, and a manufacturing cost to be reduced.

In the above-described eighth and ninth embodiments, each-time verification may be applied to a certain OS, and one-time or no verification may be applied to another OS. For example, verification may be executed on data associated with the secure OS 56, and may not be executed on data associated with the non-secure OS 57.

Alternatively, in the eighth and ninth embodiments, each-time verification may be applied to part of data associated with the certain OS, and one-time or no verification may be applied to the other part of the data. For instance, it is assumed that the secure OS 56 and the non-secure OS 57 have a shared data area where both of them can access data, and that data is verified when the secure OS 56 reads the data, and a verifier is not written when the non-secure OS 57 writes the data. In this case, if the secure OS 56 reads, from the shared data area, data that was written by the non-secure OS 57, verification fails because no verifier is calculated for the data read by the secure OS 56. In contrast, in the eighth and ninth embodiments, for example, the each-time verification is applied to verification target data for the secure OS 56, and the no verification is applied to verification unnecessary data included in the data for the secure OS 56 and shared by the non-secure OS 57. This structure prevents data written in the shared data area by the non-secure OS 57 from involving verification failure when the secure OS 56 reads this data.

Tenth Embodiment

In a present embodiment, specific examples of an encryption and falsification verification used for the above-described first to ninth embodiments will be described. The present embodiment describes details of a cipher system XTS-AES. Further, the present embodiment describes a cipher parameter called Tweak used for preventing a replay attack for each address and version of a page table or data. For instance, the replay attack can be eliminated by combining an encryption by XTS-AES with falsification verification using a hash value. In the present embodiment, MAC value calculation for falsification verification, which utilizes the encryption by XTS-AES, is also described.

AES is a cipher system which is standardized as IEEE P1619, and is applied to random access data in, for example, a disk device. AES has parameters called Tweak and Sequence Number. Even if the same plaintext is encrypted using the same secret key, if different parameters are used, totally different ciphertexts will be generated. It is not necessary to make the parameters secret. Therefore, even if combination of a plaintext and a ciphertext based on a certain parameter is known to an attacker, data secrecy of the ciphertext based on other parameter is kept.

FIG. 52 is a conceptual diagram showing an example of XTS-AES.

XTS-AES is a cipher system in which a block of plaintext data {P0, P1, . . . , Pm} formed of 128 or 256 bits is encrypted to thereby obtain a ciphertext {C0, C1, . . . , Cm} of the same size.

XTS-AES is expressed by C=XTS-AES (Key, P, i, j).

Key is a secret key and needs to be kept secret.

For example, Key may be of 256 bits.

P is a plaintext, and the number of bits thereof is assumed to be arbitrary.

i is Tweak and does not require secrecy. For example, i may be of 128 bits.

j is Sequence Number and does not require secrecy. For example, j may be of 128 bits.

C is a ciphertext, and has the same number of bits as P.

In the present embodiment, different secret keys are used for different guests OS. Therefore, it is sufficient if a countermeasure against a replay attack is made on page elements (page table and data page) within the same OS in association with time (corresponding to the number of times of storage to a non-secure storage) and space (corresponding to memory addresses).

In the present embodiment, the structural elements of a guest OS include a page table and a verification tree associated with the page table, as well as the data page. In order to reduce an overhead of key management, it is desirable to execute falsification verification and encryption of the page table and the verification tree, based on the same secret key as that of data.

FIG. 53 is a view showing an example of Tweak and Sequence Number i corresponds to Tweak. Individual Tweak values that do not overlap between a data page and a page table are assigned to a common page index. The common page index includes two elements. A first element is a page address index. Regarding a data page, it is assumed that the page address index designates an intermediate physical address before address translation. Regarding a page table, it is assumed that the page address index designates an intermediate physical address, before address translation, of one of data pages associated with the page table. When each address is of 64 bits, a low-level address of 12 bits in a page (4096 bytes) is not necessary. Therefore, 52 bits are used as the page address index.

A second element is a level. If only a page address index is used, Tweak collides between a data page and the page table. The level is an index used to prevent this collision. For example, the level is a 3-bit index designating a hierarchy class of the data page and the page table.

Information wherein the page address index and the level are combined is the common page index. Using the common page index, falsification verification and encryption of the data page and the page table can be executed by the same cipher system.

Remaining bits of Tweak are used as a counter designating the number of times of data storage. In the present embodiment, 73 bits are secured for the counter.

j corresponds to Sequence Number. In general, Sequence Number is used as a sequence number counter for cipher blocks (16 bytes) in a data page or a page table. In the case of a data page or page table of 4 K bytes, 8 bits are allocated as a sequence number counter. In the case of a data page or page table of 2 megabytes, 20 bits are allocated as a sequence number counter. The remaining field of Sequence Number may be used auxiliary as a counter for counting the number of rewrites in the data page or the page table.

FIG. 54 is a conceptual diagram showing an example of MAC value calculation and verification processing when there is no "protection by encryption" for a page table.

In FIG. 54, it is assumed that PT|CTR as a falsification verification target is combination of a page table PT and a counter CTR. A hash value H(PT|CTR) based on SHA-256 is calculated for the falsification verification target PT|CTR as the combination, and is encrypted using the above-mentioned parameters Key, i and j, thereby calculating a MAC value. The verification target PT|CTR and the MAC value are used for verification. However, since the MAC value is associated with a counter for a one-level higher page table as described above, the verification target PT|CTR and the MAC value are stored in areas to which separate addresses are allocated.

The verification is an operation opposite to the MAC value calculation. The hash value H(PT|CTR) is calculated based on SHA-256 for the verification target PT|CTR. The MAC value is decrypted based on XTS-AES. The hash value H(PT|CTR) calculated based on SHA-256 is compared with the hash value H(PT|CTR) decrypted based on XTS-AES. If they are matched each other, falsification verification is determined to be succeeded.

FIG. 55 is a conceptual diagram showing an example of MAC value calculation and verification processing when there is "protection by encryption" for a page data.

In FIG. 55, it is assumed that a falsification verification target PD is only page data. A hash value H(PD) based on SHA-256 is calculated for the verification target PD, and encryption is performed on combination of the verification target PD and the hash value H(PD), using the above-mentioned parameters Key, i and j, thereby calculating ciphertext C and a MAC value. The ciphertext C and the MAC value are used for verification. The ciphertext C and the MAC value are stored in areas to which separate addresses are allocated, as in the above.

The verification is an operation opposite to the encryption and the MAC value calculation. The ciphertext C and the MAC value are decrypted based on XTS-AES, thereby obtaining a verification target PD as plaintext page data, and an expectation value of the hash value H(PD). Based on SHA-256, the hash value H(PD) is calculated for the verification target PD. The hash value H(PD) calculated based on SHA-256 is compared with the expectation value of the hash value H(PD). If they are matched each other, falsification verification is determined to be succeeded.

In the above-described embodiment, a greater part of the secret keys used for data and page table protection and the parameters used for an encryption can be used in common.

Moreover, efficient falsification verification and encryption can be performed using the standard cipher system XTS-AES installed in many cipher accelerators.

In each of the above-mentioned embodiments, various types of processing, such as an encryption, decryption and verification, may be realized by software or hardware. When the encryption, decryption and verification are realized by hardware, they can be executed at high speed.

In each of the above-mentioned embodiments, since a counter value and address are encrypted, illegitimate acquisition of the counter value and address is prevented.

In each of the above-mentioned embodiments, it may be individually determined data or page table whether verification should be executed, and whether an encryption should be executed.

For instance, the verification may be executed for the page table, the encryption may not be executed for the page table, the verification may not be executed for the data, and the encryption may be executed for the data.

For instance, the verification may be executed for the page table, the encryption may not be executed for the page table, both of the verification and encryption may be executed for the data.

For instance, both the verification and encryption may be executed for the page table, and at least one of the verification and encryption may be executed for the data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory management device comprising a processor, the processor configured to:
    execute reading and writing for a first storage device, the first storage device storing a table tree including a parent table and a child table, and a verifier tree including a parent verifier associated with the parent table and a child verifier associated with the child table, the parent verifier being used for verifying the child table and the child verifier;
    translate a first address into a second address based on a secure table tree which is a part of the table tree and is stored in a secure second storage device, the secure second storage device storing a secure verifier tree which is a part of the verifier tree;
    calculate verification information, when a first child table included in the table tree and needed for translating the first address into the second address is not included in the secure table tree, based on the first child table in the table tree and a first child verifier included in the verifier tree and associated with the first child table;
    execute verification, based on the verification information and a first parent verifier included in the secure verifier tree and associated with a first parent table referring to the first child table; and
    incorporate the first child table and the first child verifier into the secure table tree and the secure verifier tree, respectively, when a result of the verification designates validity.

2. The memory management device of claim 1, wherein the processor sets, in an invalid state, an entry designating the first child table and included in the first parent table in the secure table tree, when the secure table tree does not include the first child table, and sets, in a valid state, the entry in the secure table tree when the secure table tree includes the first child table.

3. The memory management device of claim 1, wherein
    the processor calculates data verification information, based on data stored in the first storage device, when the second address stored in an entry in the first child table included in the secure table tree designates the data stored in the first storage device;
    the processor executes data verification based on the data verification information and the first child verifier in the secure verifier tree; and
    the processor stores the data in an area designated by a third address in the second storage device, and updates the second address stored in the entry in the first child table to the third address, when a result of the data verification designates validity.

4. The memory management device of claim 3, wherein the processor calculates the data verification information for verifying the data, based on the second address stored in the entry in the first child table.

5. The memory management device of claim 3, wherein the processor encrypts the data, and calculates the verification information by encrypting a hash value corresponding to the data.

6. The memory management device of claim 1, wherein
    the processor calculates data verification information based on data, when the data stored in the second storage device is stored in the first storage device;
    the processor stores the data into an area designated by a third address in the first storage device; and
    the processor updates, to the third address, the second address stored in an entry in the first child table included in the secure table tree, and updates, to the data verification information, the first child verifier stored in the secure verifier tree.

7. The memory management device of claim 6, wherein the processor calculates the data verification information for verifying the data, based on the third address stored in the entry in the first child table.

8. The memory management device of claim 1, wherein the processor is further configured to encrypt data transferred from the second storage device to the first storage device, and decrypt data transferred from the first storage device to the second storage device.

9. The memory management device of claim 1, wherein
    the processor operates in virtual machine monitor environment;
    the secure table tree is used for translating, into the second address, an intermediate physical address to be referred to by a guest operation system (OS) controlled by a virtual machine monitor.

10. The memory management device of claim 9, wherein the processor is further configured to enable a part of the secure table tree managed by the virtual machine monitor to be used by the guest OS.

11. The memory management device of claim 9, wherein the virtual machine monitor manages a plurality of guest OSs including a first guest OS and a second guest OS, a plurality of secure table trees including a first secure table tree and a second secure table tree, and a plurality of secure verifier trees including a first secure verifier tree and a second secure verifier tree, and
    the processor is further configured to execute address translation during execution of the first guest OS, using the first secure table tree and the first secure verifier tree which are corresponded to the first guest OS, and execute address translation during execution of the second guest OS, using the second secure table tree and the second secure verifier tree which are corresponded to the second guest OS.

12. The memory management device of claim 9, wherein the processor calculates a verifier of data stored in the second storage device, using the intermediate physical address, and calculates a verifier of a table included in the secure table tree, using a physical address of the table.

13. The memory management device of claim 1, wherein the processor is further configured to:
generate signature information based on a highest-level verifier in the secure verifier tree; and
transmit the signature information to an external device.

14. The memory management device of claim 1, wherein
the processor determines a data protection type set in at least one of the secure table tree and the secure verification tree;
if the data protection type is a first type,
the processor calculates data verification information based on data stored in the first storage device, when the second address stored in an entry in the first child table included in the secure table tree designates the data stored in the first storage device,
the processor executes data verification, based on the data verification information and the first child verifier in the secure verifier tree,
the processor stores the data in an area designated by a third address in the second storage device, and updates, to the third address, the second address stored in the entry in the first child table, when a result of the data verification designates validity, and
the processor translates the first address into the third address; and
if the data protection type is a no-verification type,
the processor does not calculate the data verification information,
the processor does not execute the data verification,
the processor does not update the second address stored in the entry in the first child table, and
the processor translates the first address into the second address.

15. The memory management device of claim 14, wherein
if the data protection type is a second type,
the processor calculates, at least one time which is less than times of data reference for the data in the first storage device, the data verification information, based on the data stored in the first storage device and designated by the second address stored in an entry in the first child table included in the secure table tree,
the processor executes the data verification, based on the data verification information and the first child verifier in the secure verifier tree, and
the processor translates the first address into the second address when a result of the data verification designates validity.

16. The memory management device of claim 1, wherein
the first storage device includes a nonvolatile memory and a volatile memory;
the processor determines a data protection type set in at least one of the secure table tree and the secure verifier tree; and
if the data protection type is a first type,
the processor calculates data verification information based on data stored in the nonvolatile memory, when the second address stored in an entry in the first child table included in the secure table tree designates the data stored in the nonvolatile memory,
the processor executes data verification, based on the data verification information and the first child verifier in the secure verifier tree,
the processor stores the data in an area designated by a third address in the second storage device, and updates, to the third address, the second address stored in the entry in the first child table, when a result of the data verification designates validity, and
the processor translates the first address into the third address; and
if the data protection type is a no-verification type,
the processor does not calculate the data verification information,
the processor does not execute the data verification,
the processor stores the data in an area designated by a fourth address in the volatile memory, and updates, to the fourth address, the second address stored in the entry in the first child table, and
the processor translates the first address into the fourth address.

17. The memory management device of claim 16, wherein
if the data protection type is a second type,
the processor calculates, at least one time which is less than times of data reference for the data in the first storage device, the data verification information, based on the data stored in the nonvolatile memory and designated by the second address stored in an entry in the first child table included in the secure table tree,
the processor executes the data verification, based on the data verification information and the first child verifier in the secure verifier tree,
the processor stores the data in an area designated by a fifth address in the volatile memory, and updates, to the fifth address, the second address stored in the entry in the first child table, when a result of the data verification designates validity, and
the processor translates the first address into the fifth address.

18. The memory management device of claim 1, wherein the processor encrypts neither of the first child table and the first child verifier, and calculates the verification information by encrypting a hash value corresponding to the first child table and the first child verifier.

19. A non-transitory computer readable recording medium storing a program which is executed by a computer, the program configured to:
execute reading and writing for a first storage device, the first storage device storing a table tree including a parent table and a child table, and a verifier tree including a parent verifier associated with the parent table and a child verifier associated with the child table, the parent verifier being used for verifying the child table and the child verifier;
translate a first address into a second address based on a secure table tree which is a part of the table tree and is stored in a secure second storage device, the secure second storage device storing a secure verifier tree which is a part of the verifier tree;
calculate verification information, when a first child table included in the table tree and needed for translating the first address into the second address is not included in the secure table tree, based on the first child table in the table tree and a first child verifier included in the verifier tree and associated with the first child table;

execute verification, based on the verification information and a first parent verifier included in the secure verifier tree and associated with a first parent table referring to the first child table; and incorporate the first child table and the first child verifier into the secure table tree and the secure verifier tree, respectively, when a result of the verification designates validity.

20. A memory management device comprising:
a nonvolatile first storage device;
a volatile second storage device, and
a processor, wherein
the nonvolatile first storage device stores a table tree and a verifier tree,
  the table tree defines reference relationship from a first address to the data, and
  the verifier tree includes verifiers corresponding to respective data unit and respective table unit in the table tree, and the verifier tree has a same graph structure as at least part of the table tree;
the processor reads, from the first storage device, a first table needed for address translation for the data, and a first verifier associated with the first table;
the processor executes verification for the first table and the first verifier read from the first storage device;
the volatile second storage device stores the first table and the first verifier when a result of the verification designates validity;
the processor translates the first address into a second address designating the data, based on a verified table tree stored in the second storage device, when a reference request of the data is received.

* * * * *